United States Patent
Nagata et al.

(10) Patent No.: US 6,795,042 B1
(45) Date of Patent: Sep. 21, 2004

(54) IMAGE DISPLAY APPARATUS

(75) Inventors: Tetsuo Nagata, Hachioji (JP);
Takayoshi Togino, Koganei (JP);
Akihiro Sakurai, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/558,631

(22) Filed: Apr. 26, 2000

(30) Foreign Application Priority Data

| | | |
|---|---|---|
| Jan. 6, 2000 | (JP) | 2000-000638 |
| Jan. 6, 2000 | (JP) | 2000-000778 |
| Feb. 25, 2000 | (JP) | 2000-048750 |
| Mar. 30, 2000 | (JP) | 2000-093233 |

(51) Int. Cl.$^7$ ............................................. G09G 5/00
(52) U.S. Cl. ................... 345/8; 345/9; 345/15; 345/32; 345/84; 348/54; 348/59; 353/81; 353/82; 353/98; 359/630; 359/634; 359/637; 359/638; 359/639; 359/640
(58) Field of Search ............................. 345/8, 15, 32, 345/84, 9; 359/630, 634, 637, 640, 639, 638; 348/54, 59; 353/81, 82, 98

(56) References Cited

U.S. PATENT DOCUMENTS

| | | | | |
|---|---|---|---|---|
| 5,907,150 | A | * | 5/1999 | Sadana ......................... 250/214 |
| 6,081,371 | A | * | 6/2000 | Shioda et al. ................. 359/372 |
| 6,185,045 | B1 | * | 2/2001 | Hanano ......................... 359/631 |
| 6,281,533 | B1 | * | 8/2001 | Miyagawa et al. ........... 257/290 |
| 6,309,068 | B1 | * | 10/2001 | Kohayakawa ................ 351/221 |
| 6,324,001 | B2 | * | 11/2001 | Tabata .......................... 359/462 |
| 6,342,871 | B1 | * | 1/2002 | Takeyama ........................ 345/7 |
| 6,342,971 | B1 | * | 1/2002 | Hashizume et al. ........... 359/634 |
| 6,351,338 | B2 | * | 2/2002 | Nanba .......................... 359/834 |
| 6,670,080 | B2 | * | 12/2003 | Sugita et al. ................... 430/5 |

FOREIGN PATENT DOCUMENTS

| | | |
|---|---|---|
| JP | 5-176260 | 7/1993 |
| JP | 6-110013 | 4/1994 |
| JP | 7-287185 | 10/1995 |
| JP | 7-318851 | 12/1995 |
| JP | 9-61748 | 3/1997 |
| JP | 9-181998 | 7/1997 |
| JP | 9-181999 | 7/1997 |
| JP | 10-282421 | 10/1998 |

* cited by examiner

*Primary Examiner*—Xiao Wu
*Assistant Examiner*—Abbas Abdulselam
(74) *Attorney, Agent, or Firm*—Pillsbury Winthrop LLP

(57) ABSTRACT

The present invention relates to an image display apparatus, e.g. a head-mounted image display apparatus, in which an image from a single image display device is led to two eyes without using a half-mirror, thereby allowing observation of a bright image. The image display apparatus has an optical path distributing mirror 1 for distributing the image of a single display device 10 to an optical path for a right eye and an optical path for a left eye, and an ocular prism 2R for the right eye and an ocular prism 2L for the left eye, which are placed on the right- and left-hand sides, respectively, of the optical path distributing mirror 1. In the optical path for the right eye, display light from the display device 3 is reflected by a reflecting surface 1R of the optical path distributing mirror 1 and passes through a first surface 21R of the decentered prism member 2R to enter the prism, in which the light is totally reflected by a second surface 22R, which serves also as a fourth surface 24R, and back-reflected by a third surface 23R to exit from the prism through the fourth surface 24R. The light is led to an exit pupil 4R for the right eye to project an enlarged image of the display device 3 into the right eye. The same is true in the optical path for the left eye.

58 Claims, 28 Drawing Sheets

IMAGE DISPLAY APPARATUS

The claims of this application benefit of Japanese Application Nos. 2000-000638, 2000-000778, 2000-048750 and 2000-093233 filed in Japan on Jan. 6, 2000, Jan. 6, 2000, Feb. 25, 2000 and Mar. 30, 2000 respectively, the contents of which are incorporated by this reference.

BACKGROUND OF THE INVENTION

The present invention relates to image display apparatus and, more particularly, to a head- or face-mounted image display apparatus that can be retained on the observer's head or face.

Image display apparatus designed to observe an image of a single image display device with two eyes have heretofore been known in Japanese Patent Application Unexamined Publication Number [hereinafter referred to as "JP(A)"] 5-176260, 9-61748, 9-181998 and 9-181999.

An illuminating method for an image display apparatus designed to observe an image of a single image display device with two eyes has been known, for example, in JP(A) 7-318851.

Among them, the image display apparatus of JP(A) 5-176260 splits and folds light rays by a prism in the shape of an isosceles triangular prism and a mirror. Therefore, various aberrations are corrected by a lens placed in front of the pupil. This makes it difficult to correct aberrations, and at the same time, causes the apparatus to become large in size. In JP(A) 9-61748, display light from an LCD (liquid crystal display device) is split by using a half-mirror so as to be observed with two eyes. Because the display light is distributed to the left and right eyeballs, the image for observation becomes weak and dark. In JP(A) 9-181998 and 9-181999, because prisms are integrated, the prism structure is very large in size and requires a great deal of time and cost when it is produced by injection molding. In addition, correction of decentration aberrations is insufficient.

Regarding an illuminating method for use in a case where a display image from a single display device is observed with two eyes, when an arrangement such as that disclosed in JP(A) 7-318851 is adopted, because images led to the left and right eyes are in reversed relation to each other, the display image needs to be electrically switched for the left and right by the display device or other device.

SUMMARY OF THE INVENTION

The present invention was made in view of the above-described problems with the prior art, and an object of the present invention is to provide an image display apparatus, e.g. a head-mounted image display apparatus, in which an image from a single image display device is led to two eyes without using a half-mirror, thereby allowing observation of a bright image, and in which a power is given to an optical path distributing means placed at the middle between the two eyes to facilitate the correction of various aberrations. In addition, an object of the present invention is to provide an illuminating method which is the most suitable for observation of a single panel (single image display device) with two eyes, and which can be used without the need to switch the display image for the left and right.

An image display apparatus according to the present invention provided to attain the above-described object has an image display device for displaying an image to be observed by an observer, an optical path distributing mirror for distributing the image to an optical path for a right eye and an optical path for a left eye, an ocular prism for the right eye that is placed on the right-hand side of the optical path distributing mirror, and an ocular prism for the left eye that is placed on the left-hand side of the optical path distributing mirror.

The optical path distributing mirror has a mirror surface placed to face the image display device to reflect a display light beam emanating from the image display device so as to distribute the display light beam to the ocular prism for the right eye and the prism for the left eye. The mirror surface has a rotationally asymmetric curved surface configuration that corrects decentration aberrations.

The ocular prism for the right eye has a first surface through which the light beam of the optical path for the right eye reflected by the optical path distributing mirror enters the prism, a second surface which reflects the light beam of the optical path for the right eye within the prism, and a third surface through which the light beam of the optical path for the right eye exits from the prism.

The ocular prism for the left eye has a first surface through which the light beam of the optical path for the left eye reflected by the optical path distributing mirror enters the prism, a second surface which reflects the light beam of the optical path for the left eye within the prism, and a third surface through which the light beam of the optical path for the left eye exits from the prism.

At least the second surface of the ocular prism for the right eye, which is a reflecting surface, and the second surface of the ocular prism for the left eye, which is a reflecting surface, have a rotationally asymmetric curved surface configuration that corrects decentration aberrations.

Another image display apparatus according to the present invention has an image display device for displaying an image to be observed by an observer, an optical path distributing prism for distributing the image to an optical path for a right eye and an optical path for a left eye, an ocular prism for the right eye that is placed on the right-hand side of the optical path distributing prism, and an ocular prism for the left eye that is placed on the left-hand side of the optical path distributing prism.

The optical path distributing prism has at least a first surface placed to face the image display device so that a display light beam emanating from the image display device enters the prism through the first surface, a second-first surface which reflects the optical path for the right eye entering through the first surface, a second-second surface which reflects the optical path for the left eye entering through the first surface, a third-first surface through which the light beam of the optical path for the right eye exits from the prism, and a third-second surface through which the light beam of the optical path for the left eye exits from the prism.

To form a relay image for the right eye from the image displayed by the image display device in the optical path for the right eye and to form a relay image for the left eye from the image displayed by the image display device in the optical path for the left eye, the optical path distributing prism is arranged so that at least the second-first surface and the second-second surface have a curved surface configuration that gives a power to the light beam, and the second-first surface and the second-second surface have the same surface configuration.

The ocular prism for the right eye has a first surface through which the light beam of the optical path for the right eye exiting from the third-first surface of the optical path distributing prism enters the prism, a second surface which reflects the light beam of the optical path for the right eye within the prism, and a third surface through which the light beam of the optical path for the right eye exits from the prism.

The ocular prism for the left eye has a first surface through which the light beam of the optical path for the left eye exiting from the third-second surface of the optical path distributing prism enters the prism, a second surface which reflects the light beam of the optical path for the left eye within the prism, and a third surface through which the light beam of the optical path for the left eye exits from the prism.

At least the second surface of the ocular prism for the right eye, which is a reflecting surface, and the second surface of the ocular prism for the left eye, which is a reflecting surface, have a rotationally asymmetric curved surface configuration that corrects decentration aberrations.

With the above-described arrangement, the present invention can provide an image display apparatus, e.g. a head-mounted image display apparatus, in which an image from a single image display device is led to two eyes without using a half-mirror, thereby allowing observation of a bright image, and the correction of various aberrations is facilitated by placing an optical path distributing mirror or an optical path distributing prism at the middle between the two eyes. Further, it is possible to obtain an illuminating arrangement which is the most suitable for observation of a single panel with two eyes, and which can be used in the above-described arrangement without the need to switch the display image for the left and right.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The image display apparatus according to the present invention will be described below by way of examples. FIGS. 1 to 15 are ray path diagrams respectively showing image display apparatus according to Examples 1 to 16 of the present invention.

Figure 1:
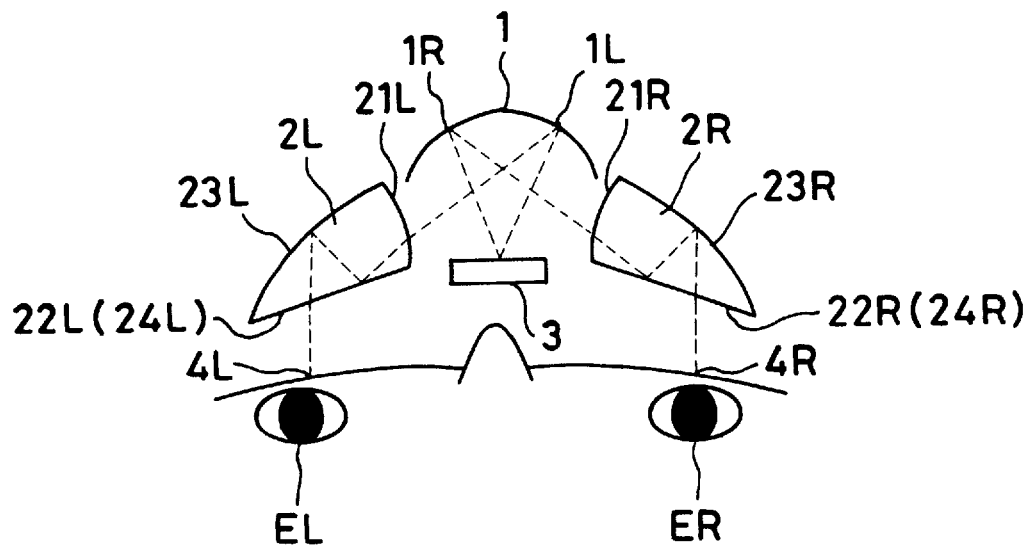
FIG. 1 is a ray path diagram of an image display apparatus according to Example 1 of the present invention.

In Example 1 shown in FIG. 1, a right eye of an observer is denoted by ER, and a left eye of the observer is denoted by EL. An image display device of an image display apparatus is denoted by reference numeral 3. An exit pupil for the right eye is denoted by 4R, and an exit pupil for the left eye is denoted by 4L. A decentered prism member placed in front of the right eye as an optical system for the right eye is denoted by 2R, and a decentered prism member placed in front of the left eye as an optical system for the left eye is denoted by 2L. In addition, an optical path distributing mirror placed at the middle between the two eyes is denoted by 1. The decentered prism members 2R and 2L are made of a transparent medium having a refractive index larger than 1. In the following description, surfaces stated to be reflecting surfaces are mirror surfaces formed by providing mirror coatings on the relevant surfaces of the decentered prism members except totally reflecting surfaces.

Example 1 is arranged as shown in FIG. 1, which shows a horizontal section (YZ-section) thereof. The optical path distributing mirror 1 at the middle between the two eyes has a reflecting surface 1R for a right optical path and a reflecting surface 1L for a left optical path, which have symmetric configurations with respect to a plane of symmetry between the two eyes (i.e. a plane passing through the center of a line segment connecting the respective centers of the exit pupil 4R for the right eye and the exit pupil 4L for the left eye at right angles to the line segment).

The decentered prism member 2R, which constitutes an optical system for the right eye, and the decentered prism member 2L, which constitutes an optical system for the left eye, have the same configuration and are placed in symmetry with respect to the plane of symmetry between the two eyes. The decentered prism member 2R and the decentered prism member 2L each have, in order in which rays pass, a first surface 21R (21L), a second surface 22R (22L), a third surface 23R (23L), and a fourth surface 24R (24L). The second surface 22R (22L) and the fourth surface 24R (24L) are the identical surface. The identical surface serves as both a totally reflecting surface and a transmitting surface.

The image display device 3 is placed to face the optical path distributing mirror 1 on the observer side of the latter. The exit pupils 4R and 4L are located approximately in the same plane, facing the fourth surfaces 24R and 24L of the decentered prism members 2R and 2L, respectively. The surfaces 21R to 24R, 21L to 24L, 1R and 1L of the decentered prism members 2R and 2L and the optical path distributing mirror 1 are formed from free-form surfaces expressed by equation (a), which will be described later. Each of the free-form surfaces can be replaced with a spherical surface including a plane surface, an aspherical surface, an anamorphic surface, or an anamorphic aspherical surface.

In the above-described arrangement, the left and right optical paths, which are shown by the dashed lines, are symmetric with respect to the plane of symmetry between the two eyes. Therefore, the optical path for the right eye will be described representatively. Display light from a single image display device 3 common to the two eyes is, first, incident on the reflecting surface 1R of the optical path distributing mirror 1 and reflected by the reflecting surface 1R so as to enter the decentered prism member 2R. The incident light passes through the first surface 21R to enter the prism and is incident on the second surface 22R at an incident angle not less than the critical angle, thereby being totally reflected by the second surface 22R. The reflected light is incident on the third surface 23R and back-reflected thereby so as to be incident on the fourth surface 24R at an incident angle less than the critical angle. The incident light is refracted by the fourth surface 24R to exit from the decentered prism member 2R. Then, the light is led to the exit pupil 4R for the right eye to project an enlarged image of the image display device 3 into the observer's right eye. It should be noted that no intermediate image is formed in the optical path from the image display device 3 to the exit pupil 4R. The optical path for the left eye is in symmetric relation to the optical path for the right eye with respect to the plane of symmetry between the two eyes as in the case of the arrangement of the optical system for the right eye.

With the above-described arrangement, in both the left and right optical paths, display light from the image display device 3 is led to the eyeball after undergoing three reflections. Therefore, images led to the left and right eyes are not in mirror-image relation to each other. Accordingly, it is possible to see images of the same orientation with the left and right eyes. Moreover, because the image of the image display device 3 is projected via reflecting and transmitting surfaces which are decentered or tilted with respect to the optical axis and at least one of which has a positive power, it is possible to project an image favorably corrected for various aberrations, e.g. curvature of field and chromatic aberration. In addition, because one surface of the optical path distributing mirror 1 is used to distribute display light to the left and right optical paths, the production is easier than in the case of a prism having a multiplicity of surfaces, and the weight of the display apparatus can be reduced, advantageously. Furthermore, because the image display device 3 is located on the observer side, the whole display apparatus does not project forward to a considerable extent. In addition, it is possible to lead a display image from a single common image display device 3 to the two eyes as a bright image because the apparatus does not employ a half-mirror as is used in JP(A) 9-61748. In addition, by using free-form surfaces for the reflecting surfaces 1R and 1L of the optical path distributing mirror 1, it becomes possible to correct decentration aberrations very favorably.

Further, the decentered prism members 2R and 2L are placed at positions that are in plane symmetry with each other and have the same configuration. It is only necessary to prepare two decentered prism members 2R and 2L having the same configuration and to place them at respective positions that are in plane symmetry with respect to the optical path distributing mirror 1 at the middle between the two eyes.

Figure 2:
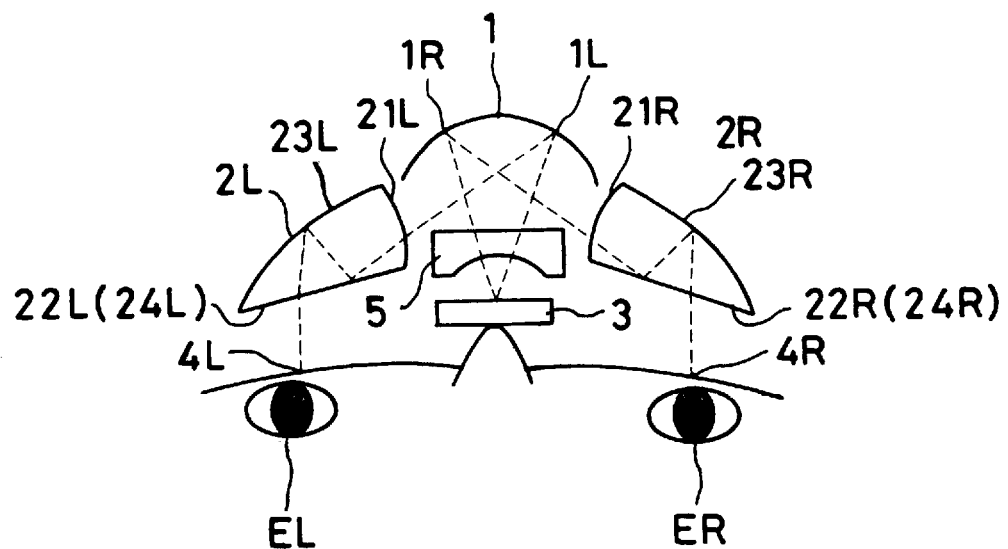
FIG. 2 is a ray path diagram of an image display apparatus according to Example 2 of the present invention.

FIG. 2 shows a horizontal section (YZ-section) of Example 2. Example 2 has a common negative lens 5 inserted in the optical path from the image display device 3 to the reflecting surface 1R for the right optical path and the reflecting surface 1L for the left optical path of the optical path distributing mirror 1 in the arrangement of Example 1. The arrangement of the rest of Example 2 and the optical paths therein are the same as in Example 1. No intermediate image is formed as in the case of Example 1. A diffractive optical element or a lenticular lens may be used in place of or in addition to the negative lens 5. By inserting the negative lens 5 or the like between the image display device 3 and the optical path distributing mirror 1, aberrations can be corrected even more favorably. The use of a diffractive optical element or a lenticular lens allows the left and right optical paths to be divided from each other even more easily.

Figure 3:
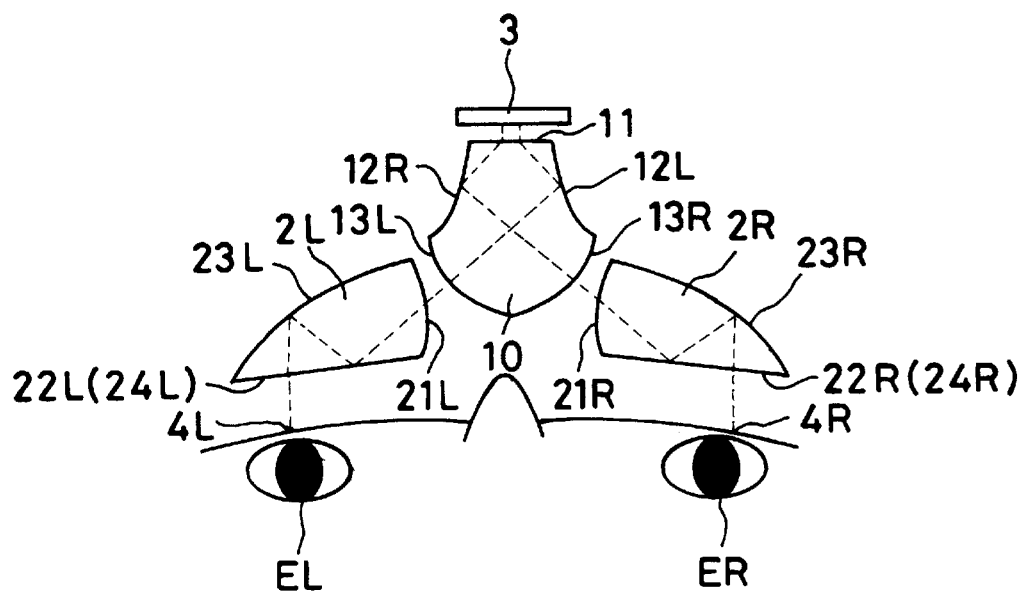
FIG. 3 is a ray path diagram of an image display apparatus according to Example 3 of the present invention.

FIG. 3 shows a horizontal section (YZ-section) of Example 3. Example 3 uses an optical path distributing prism 10 formed from a decentered prism member with five surfaces in place of the optical path distributing mirror 1 placed at the middle between the two eyes in Examples 1 and 2. The decentered prism members 2L and 2R for the left and right eyes are the same as those in Examples 1 and 2.

The optical path distributing prism 10 at the middle between the two eyes has a symmetric configuration with respect to the plane of symmetry between the two eyes. The optical path distributing prism 10 has five surfaces: a first surface 11 as a transmitting surface located on the observer side of the image display device 3; a second surface 12R as a reflecting surface for the right optical path and a second surface 12L as a reflecting surface for the left optical path, which are located at both sides of the first surface 11 on the observer side thereof; and a transmitting surface 13L for the left optical path and a transmitting surface 13R for the right optical path, which are located on the observer sides of the second surfaces 12R and 12L. The first surface 11 has a symmetric configuration with respect to the plane of symmetry between the two eyes. The second surfaces 12R and 12L have configurations that are symmetric with respect to the plane of symmetry between the two eyes. The third surfaces 13L and 13R have configurations that are symmetric with respect to the plane of symmetry between the two eyes. The image display device 3 is placed to face the first surface 11 of the optical path distributing prism 10 on the side of the optical path distributing prism 10 remote from the observer.

In the above-described arrangement, the left and right optical paths, which are shown by the dashed lines, are symmetric with respect to the plane of symmetry between the two eyes. Therefore, the optical path for the right eye will be described representatively. Display light from a single image display device 3 common to the two eyes is, first, incident on the first surface 11 of the optical path distributing prism 10. The incident light is incident on the second surface 12R as a reflecting surface for the right optical path and reflected by the second surface 12R. The reflected light passes through the transmitting surface 13R for the right optical path and enters the decentered prism member 2R. The incident light passes through the first surface 21R to enter the prism. The light is incident on the second surface 22R at an incident angle not less than the critical angle and thus totally reflected by the second surface 22R. The reflected light is incident on the third surface 23R and back-reflected thereby so as to be incident on the fourth surface 24R at an incident angle less than the critical angle. The incident light is refracted by the fourth surface 24R to exit from the decentered prism member 2R. Then, the light is led to the exit pupil 4R for the right eye to project an enlarged image of the image display device 3 into the observer's right eye. In this case, an intermediate image is formed once in the optical path from the image display device 3 to the exit pupil 4R. The optical path for the left eye is in symmetric relation to the optical path for the right eye with respect to the plane of symmetry between the two eyes as in the case of the arrangement of the optical system for the right eye.

With the above-described arrangement, in both the left and right optical paths, display light from the image display device 3 is led to the eyeball after undergoing three reflections. Therefore, images led to the left and right eyes are not in mirror-image relation to each other. Accordingly, it is possible to see images of the same orientation with the left and right eyes. Moreover, because the image of the image display device 3 is projected via reflecting and transmitting surfaces which are decentered or tilted with respect to the optical axis and at least one of which has a positive power, it is possible to project an image favorably corrected for various aberrations, e.g. curvature of field and chromatic aberration. In a case where no intermediate image is formed, it is difficult to ensure the required back focus, and a wide field angle cannot be obtained. In the case of this example, however, because an intermediate image is formed once, it is possible to correct aberrations favorably even at a wide field angle. In addition, because the exit surfaces and reflecting surfaces of the optical path distributing prism 10 are not surfaces shared between them, decentration aberrations can be corrected favorably. Because the reflecting surfaces 12R and 12L of the optical path distributing prism 10 do not use total reflection, it is possible to reduce the angle of incidence on the surfaces and to relax the requirement for the surface manufacturing accuracy. Furthermore, because the image display device 3 is located away from the observer, it does not interfere with the observer's nose. In addition, it is possible to lead a display image from a single common image display device 3 to the two eyes as a bright image because the apparatus does not employ a half-mirror as is used in JP(A) 9-61748. In addition, by using free-form surfaces for the reflecting surfaces 12R and 12L of the optical path distributing prism 10, it becomes possible to correct decentration aberrations very favorably.

Further, in both the left and right optical paths, the greater part of the optical path passes through the decentered prism members 10 and 2R (2L), which are filled with a transparent medium having a refractive index larger than 1, and the optical path is folded therein. Therefore, the whole ocular optical system can be made compact. Furthermore, the decentered prism members 2R and 2L are placed at positions that are in plane symmetry with each other and have the same configuration. It is only necessary to prepare two decentered prism members 2R and 2L having the same configuration and to place them at respective positions that are in plane symmetry with respect to the decentered prism member 10 at the middle between the two eyes.

Figure 4:
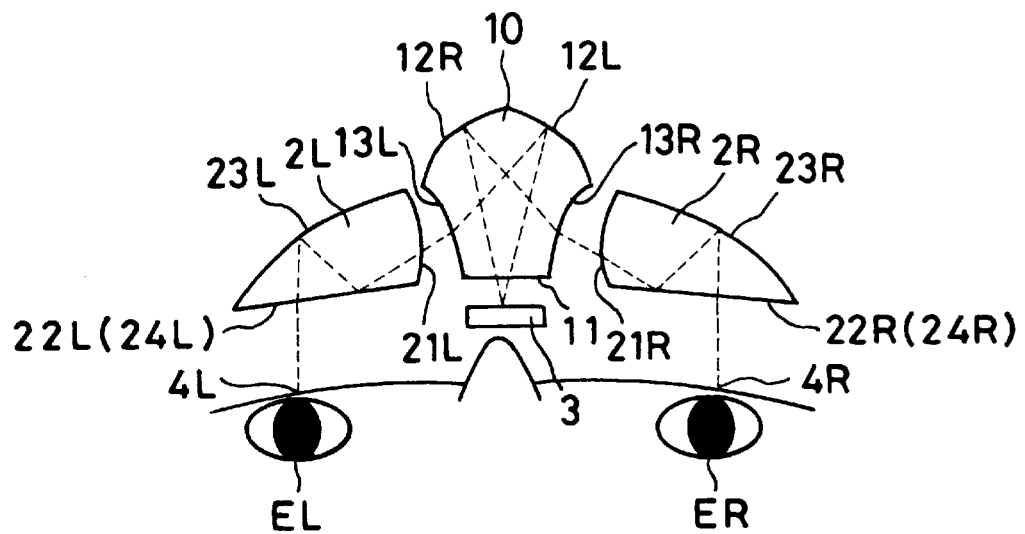
FIG. 4 is a ray path diagram of an image display apparatus according to Example 4 of the present invention.

FIG. 4 shows a horizontal section (YZ-section) of Example 4. Example 4 uses an optical path distributing prism 10 formed from a decentered prism member with five surfaces in place of the optical path distributing mirror 1 placed at the middle between the two eyes in Examples 1 and 2. The decentered prism members 2L and 2R for the left and right eyes are the same as those in Examples 1 and 2. A major difference from Example 3 is in the placement of the image display device 3. In Example 4, the image display device 3 is disposed on the observer side of the optical path distributing prism 10.

The optical path distributing prism 10 at the middle between the two eyes has a symmetric configuration with respect to the plane of symmetry between the two eyes. The optical path distributing prism 10 has five surfaces: a first surface 11 as a transmitting surface located on the side of the image display device 3 remote from the observer; a third surface 13R as a transmitting surface for the right optical path and a third surface 13L as a transmitting surface for the left optical path, which are located at both sides of the first surface 11 on the side thereof remote from the observer; and a second surface 12L as a reflecting surface for the left optical path and a second surface 12R as a reflecting surface for the right optical path, which are located on respective sides of the third surfaces 13R and 13L remote from the observer. The first surface 11 has a symmetric configuration with respect to the plane of symmetry between the two eyes. The third surfaces 13R and 13L and the second surfaces 12L and 12R have configurations that are symmetric with respect to the plane of symmetry between the two eyes. The image display device 3 is placed to face the first surface 11 of the optical path distributing prism 10 on the observer side of the optical path distributing prism 10.

In the above-described arrangement, the left and right optical paths, which are shown by the dashed lines, are symmetric with respect to the plane of symmetry between the two eyes. Therefore, the optical path for the right eye will be described representatively. Display light from a single image display device 3 common to the two eyes is, first, incident on the first surface 11 of the optical path distributing prism 10. The incident light is incident on the second surface 12R as a reflecting surface for the right optical path and reflected by the second surface 12R. The reflected light passes through the transmitting surface 13R for the right optical path and enters the decentered prism member 2R. The incident light passes through the first surface 21R to enter the prism. The light is incident on the second surface 22R at an incident angle not less than the critical angle and thus totally reflected by the second surface 22R. The reflected light is incident on the third surface 23R and back-reflected thereby so as to be incident on the fourth surface 24R at an incident angle less than the critical angle. The incident light is refracted by the fourth surface 24R to exit from the decentered prism member 2R. Then, the light is led to the exit pupil 4R for the right eye to project an enlarged image of the image display device 3 into the observer's right eye. In this case, an intermediate image is formed once in the optical path from the image display device 3 to the exit pupil 4R. The optical path for the left eye is in symmetric relation to the optical path for the right eye with respect to the plane of symmetry between the two eyes as in the case of the arrangement of the optical system for the right eye.

With the above-described arrangement, in both the left and right optical paths, display light from the image display device 3 is led to the eyeball after undergoing three reflections. Therefore, images led to the left and right eyes are not in mirror-image relation to each other. Accordingly, it is possible to see images of the same orientation with the left and right eyes. Moreover, because the image of the image display device 3 is projected via reflecting and transmitting surfaces which are decentered or tilted with respect to the optical axis and at least one of which has a positive power, it is possible to project an image favorably corrected for various aberrations, e.g. curvature of field and chromatic aberration. In a case where no intermediate image is formed, it is difficult to ensure the required back focus, and a wide field angle cannot be obtained. In the case of this example, however, because an intermediate image is formed once, it is possible to correct aberrations favorably even at a wide field angle. In addition, because the exit surfaces and reflecting surfaces of the optical path distributing prism 10 are not surfaces shared between them, decentration aberrations can be corrected favorably. Because the reflecting surfaces 12R and 12L of the optical path distributing prism 10 do not use total reflection, it is possible to reduce the angle of incidence on the surfaces and to relax the requirement for the surface manufacturing accuracy. Furthermore, because the image display device 3 is located on the observer side, the whole display apparatus does not project forward to a considerable extent. In addition, it is possible to lead a display image from a single common image display device 3 to the two eyes as a bright image because the apparatus does not employ a half-mirror as is used in JP(A) 9-61748. In addition, by using free-form surfaces for the reflecting surfaces 12R and 12L of the optical path distributing prism 10, it becomes possible to correct decentration aberrations very favorably.

Further, in both the left and right optical paths, the greater part of the optical path passes through the decentered prism members 10 and 2R (2L), which are filled with a transparent medium having a refractive index larger than 1, and the optical path is folded therein. Therefore, the whole ocular optical system can be made compact. Furthermore, the decentered prism members 2R and 2L are placed at positions that are in plane symmetry with each other and have the same configuration. It is only necessary to prepare two decentered prism members 2R and 2L having the same configuration and to place them at respective positions that are in plane symmetry with respect to the decentered prism member 10 at the middle between the two eyes.

Figure 5:
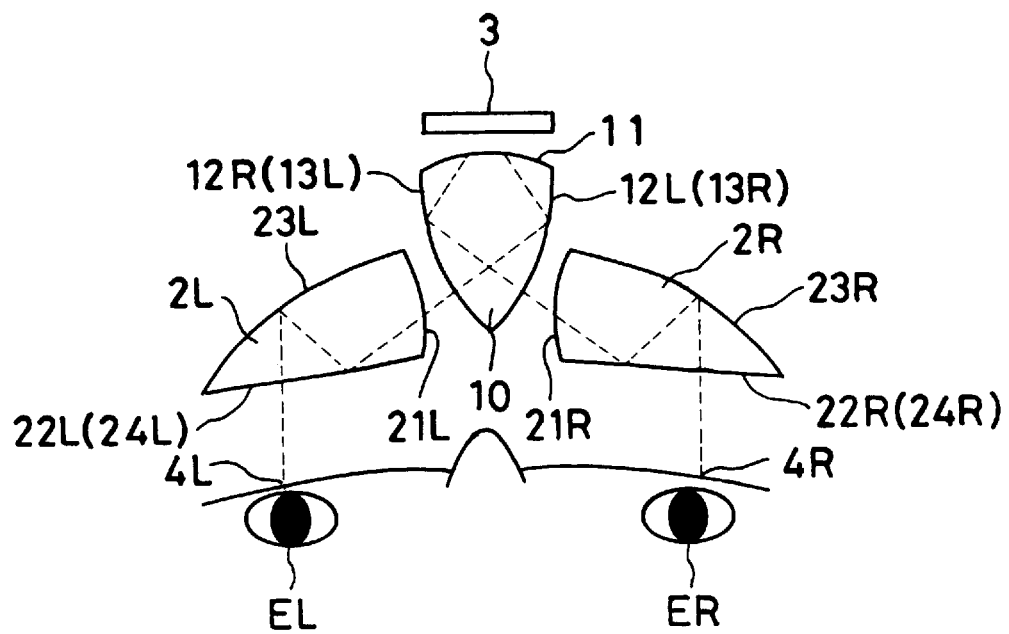
FIG. 5 is a ray path diagram of an image display apparatus according to Example 5 of the present invention.

FIG. 5 shows a horizontal section (YZ-section) of Example 5. Example 5 uses an optical path distributing prism 10 formed from a decentered prism member with three surfaces in place of the optical path distributing prism 10 formed from a decentered prism member with five surfaces in Examples 3 and 4. The decentered prism members 2L and 2R for the left and right eyes are the same as those in Examples 1 to 4.

The optical path distributing prism 10 at the middle between the two eyes has a symmetric configuration with respect to the plane of symmetry between the two eyes. The optical path distributing prism 10 has three surfaces: a first surface 11 as a transmitting surface located on the observer side of the image display device 3; a second surface 12R as a reflecting surface for the right optical path and a second surface 12L as a reflecting surface for the left optical path, which are located at both sides of the first surface 11 on the observer side thereof and function as totally reflecting surfaces; a transmitting surface 13L for the left optical path, which is the identical with the second surface 12R as a reflecting surface for the right optical path; and a transmitting surface 13R for the right optical path, which is the identical with the second surface 12L as a reflecting surface for the left optical path. The first surface 11 has a symmetric configuration with respect to the plane of symmetry between the two eyes. The second surfaces 12R (13L) and 12L (13R) have configurations that are symmetric with respect to the plane of symmetry between the two eyes. The image display device 3 is placed to face the first surface 11 of the optical path distributing prism 10 on the side of the optical path distributing prism 10 remote from the observer.

In the above-described arrangement, the left and right optical paths, which are shown by the dashed lines, are symmetric with respect to the plane of symmetry between the two eyes. Therefore, the optical path for the right eye will be described representatively. Display light from a single image display device 3 common to the two eyes is, first, incident on the first surface 11 of the optical path distributing prism 10. The incident light is incident on the second surface 12R as a reflecting surface for the right optical path and totally reflected by the second surface 12R. The reflected light passes through the transmitting surface 13R (12L) for the right optical path and enters the decentered prism member 2R. The incident light passes through the first surface 21R to enter the prism. The light is incident on the second surface 22R at an incident angle not less than the critical angle and thus totally reflected by the second surface 22R. The reflected light is incident on the third surface 23R and back-reflected thereby so as to be incident on the fourth surface 24R at an incident angle less than the critical angle. The incident light is refracted by the fourth surface 24R to exit from the decentered prism member 2R. Then, the light is led to the exit pupil 4R for the right eye to project an enlarged image of the image display device 3 into the observer's right eye. In this case, an intermediate image is formed once in the optical path from the image display device 3 to the exit pupil 4R. The optical path for the left eye is in symmetric relation to the optical path for the right eye with respect to the plane of symmetry between the two eyes as in the case of the arrangement of the optical system for the right eye.

With the above-described arrangement, in both the left and right optical paths, display light from the image display device 3 is led to the eyeball after undergoing three reflections. Therefore, images led to the left and right eyes are not in mirror-image relation to each other. Accordingly, it is possible to see images of the same orientation with the left and right eyes. Moreover, because the image of the image display device 3 is projected via reflecting and transmitting surfaces which are decentered or tilted with respect to the optical axis and at least one of which has a positive power, it is possible to project an image favorably corrected for various aberrations, e.g. curvature of field and chromatic aberration. In a case where no intermediate image is formed, it is difficult to ensure the required back focus, and a wide field angle cannot be obtained. In the case of this example, however, because an intermediate image is formed once, it is possible to correct aberrations favorably even at a wide field angle. In addition, because the exit surfaces of the optical path distributing prism 10 are also used as reflecting surfaces, the number of effective surfaces of the optical path distributing prism 10 is only three. Therefore, the production is very easy. Furthermore, because the image display device 3 is located away from the observer, it does not interfere with the observer's nose. In addition, it is possible to lead a display image from a single common image display device 3 to the two eyes as a bright image because the apparatus does not employ a half-mirror as is used in JP(A) 9-61748. In addition, by using free-form surfaces for the reflecting surfaces 12R and 12L of the optical path distributing prism 10, it becomes possible to correct decentration aberrations very favorably.

Further, in both the left and right optical paths, the greater part of the optical path passes through the decentered prism members 10 and 2R (2L), which are filled with a transparent medium having a refractive index larger than 1, and the optical path is folded therein. Therefore, the whole ocular optical system can be made compact. Furthermore, the decentered prism members 2R and 2L are placed at positions that are in plane symmetry with each other and have the same configuration. It is only necessary to prepare two decentered prism members 2R and 2L having the same configuration and to place them at respective positions that are in plane symmetry with respect to the decentered prism member 10 at the middle between the two eyes.

Figure 6:
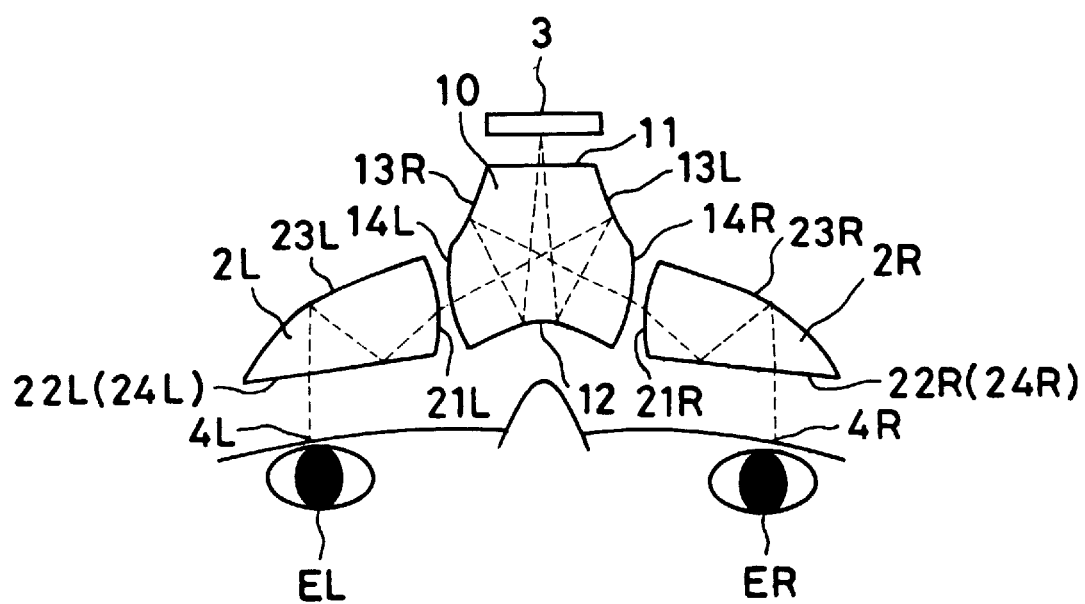
FIG. 6 is a ray path diagram of an image display apparatus according to Example 6 of the present invention.

FIG. 6 shows a horizontal section (YZ-section) of Example 6. Example 6 uses an optical path distributing prism 10 formed from a decentered prism member with six surfaces in place of the optical path distributing prism 10 formed from a decentered prism member with five surfaces in Examples 3 and 4. The decentered prism members 2L and 2R for the left and right eyes are the same as those in Examples 1 to 5.

The optical path distributing prism 10 at the middle between the two eyes has a symmetric configuration with respect to the plane of symmetry between the two eyes. The optical path distributing prism 10 has six surfaces: a first surface 11 as a transmitting surface located on the observer side of the image display device 3; a second surface 12R as a reflecting surface facing the first surface 11 and also facing the observer; a third surface 13R as a reflecting surface for the right optical path and a third surface 13L as a reflecting surface for the left optical path, which are located at both sides of the first surface 11 on the observer side thereof; and a fourth surface 14L as a transmitting surface for the left optical path and a fourth surface 14R as a transmitting surface for the right optical path, which are located on both sides between the second surface 12 and the third surfaces 13R and 13L. The first surface 11 and the second surface 12 each have a symmetric configuration with respect to the plane of symmetry between the two eyes. The third surfaces 13R and 13L and the fourth surfaces 14L and 14R have configurations that are symmetric with respect to the plane of symmetry between the two eyes. The image display device 3 is placed to face the first surface 11 of the optical path distributing prism 10 on the side of the optical path distributing prism 10 remote from the observer.

In the above-described arrangement, the left and right optical paths, which are shown by the dashed lines, are symmetric with respect to the plane of symmetry between the two eyes. Therefore, the optical path for the right eye will be described representatively. Display light from a single image display device 3 common to the two eyes is, first, incident on the first surface 11 of the optical path distributing prism 10, which is common to the left and right. The incident light is reflected by the second surface 12, which is common to the left and right. The reflected light is incident on the third surface 13R as a reflecting surface for the right optical path and reflected by the third surface 13R. The reflected light passes through the transmitting surface 14R for the right optical path and enters the decentered prism member 2R. The incident light passes through the first surface 21R to enter the prism. The light is incident on the second surface 22R at an incident angle not less than the critical angle and thus totally reflected by the second surface 22R. The reflected light is incident on the third surface 23R and back-reflected thereby so as to be incident on the fourth surface 24R at an incident angle less than the critical angle. The incident light is refracted by the fourth surface 24R to exit from the decentered prism member 2R. Then, the light is led to the exit pupil 4R for the right eye to project an enlarged image of the image display device 3 into the observer's right eye. In this case, an intermediate image is formed once in the optical path from the image display device 3 to the exit pupil 4R. The optical path for the left eye is in symmetric relation to the optical path for the right eye with respect to the plane of symmetry between the two eyes as in the case of the arrangement of the optical system for the right eye.

With the above-described arrangement, in both the left and right optical paths, display light from the image display device 3 is led to the eyeball after undergoing four reflections. Therefore, images led to the left and right eyes are not in mirror-image relation to each other. Accordingly, it is possible to see images of the same orientation with the left and right eyes. Moreover, because the image of the image display device 3 is projected via reflecting and transmitting surfaces which are decentered or tilted with respect to the optical axis and at least one of which has a positive power, it is possible to project an image favorably corrected for various aberrations, e.g. curvature of field and chromatic aberration. In a case where no intermediate image is formed, it is difficult to ensure the required back focus, and a wide field angle cannot be obtained. In the case of this example, however, because an intermediate image is formed once, it is possible to correct aberrations favorably even at a wide field angle. In addition, because the optical path distributing prism 10 is arranged to reflect light twice therein, it is possible to correct decentration aberrations very favorably. Furthermore, because the image display device 3 is located away from the observer, it does not interfere with the observer's nose. In addition, it is possible to lead a display image from a single common image display device 3 to the two eyes as a bright image because the apparatus does not employ a half-mirror as is used in JP(A) 9-61748. In addition, by using free-form surfaces for the reflecting surfaces 12, 13R and 13L of the optical path distributing prism 10, it becomes possible to correct decentration aberrations very favorably.

Further, in both the left and right optical paths, the greater part of the optical path passes through the decentered prism members 10 and 2R (2L), which are filled with a transparent medium having a refractive index larger than 1, and the optical path is folded therein. Therefore, the whole ocular optical system can be made compact. Furthermore, the decentered prism members 2R and 2L are placed at positions that are in plane symmetry with each other and have the same configuration. It is only necessary to prepare two decentered prism members 2R and 2L having the same configuration and to place them at respective positions that are in plane symmetry with respect to the decentered prism member 10 at the middle between the two eyes.

Figure 7:
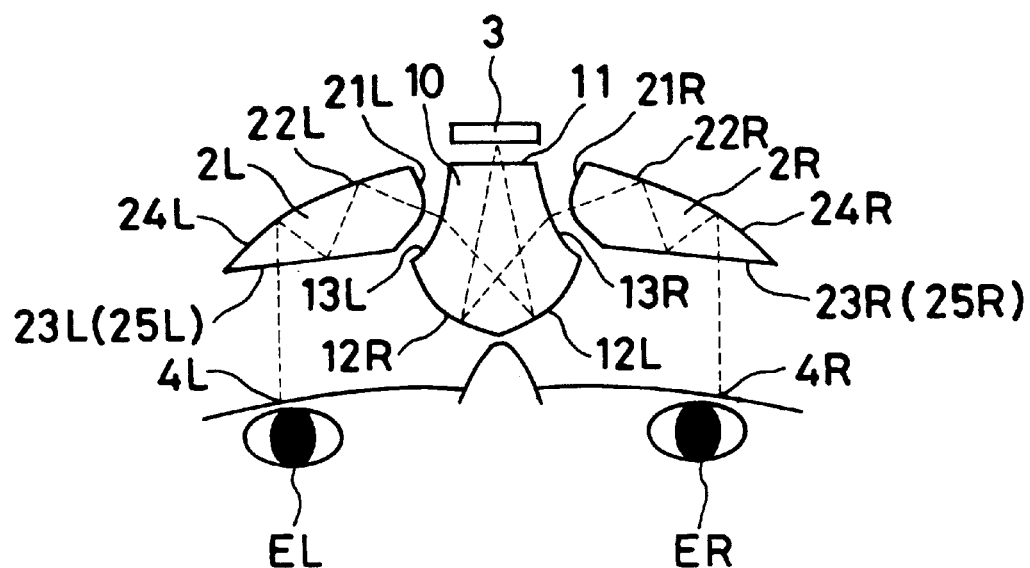
FIG. 7 is a ray path diagram of an image display apparatus according to Example 7 of the present invention.

FIG. 7 shows a horizontal section (YZ-section) of Example 7. In Example 7, a decentered prism member 2R constituting an optical system for the right eye and a decentered prism member 2L constituting an optical system for the left eye have the same configuration and are placed in symmetry with respect to the plane of symmetry between the two eyes. The decentered prism member 2R and the decentered prism member 2L each have, in order in which rays pass, a first surface 21R (21L), a second surface 22R (22L), a third surface 23R (23L), a fourth surface 24R (24L), and a fifth surface 25R (25L). The third surface 23R (23L) and the fifth surface 25R (25L) are the identical surface. The identical surface serves as both a totally reflecting surface and a transmitting surface.

The optical path distributing prism 10 at the middle between the two eyes has a symmetric configuration with respect to the plane of symmetry between the two eyes as in the case of Example 4 (FIG. 4). The optical path distributing prism 10 has five surfaces: a first surface 11 as a transmitting surface located on the observer side of the image display device 3; a third surface 13R as a transmitting surface for the right optical path and a third surface 13L as a transmitting surface for the left optical path, which are located at both sides of the first surface 11 on the observer side thereof; and a second surface 12L as a reflecting surface for the left optical path and a second surface 12R as a reflecting surface for the right optical path, which are located on the observer sides of the third surfaces 13R and 13L, respectively. The first surface 11 has a symmetric configuration with respect to the plane of symmetry between the two eyes. The third surfaces 13R and 13L and the second surfaces 12L and 12R have configurations that are symmetric with respect to the plane of symmetry between the two eyes. The image display device 3 is placed to face the first surface 11 of the optical path distributing prism 10 on the side of the optical path distributing prism 10 remote from the observer.

In the above-described arrangement, the left and right optical paths, which are shown by the dashed lines, are symmetric with respect to the plane of symmetry between the two eyes. Therefore, the optical path for the right eye will be described representatively. Display light from a single image display device 3 common to the two eyes is, first, incident on the first surface 11 of the optical path distributing prism 10. The incident light is incident on the second surface 12R as a reflecting surface for the right optical path and reflected by the second surface 12R. The reflected light passes through the transmitting surface 13R for the right optical path and enters the decentered prism member 2R. The incident light passes through the first surface 21R to enter the prism. The light is reflected by the second surface 22R, and the reflected light is incident on the third surface 23R at an incident angle not less than the critical angle and thus totally reflected by the third surface 23R. The reflected light is incident on the fourth surface 24R and back-reflected thereby so as to be incident on the fifth surface 25R at an incident angle less than the critical angle. The incident light is refracted by the fifth surface 25R to exit from the decentered prism member 2R. Then, the light is led to the exit pupil 4R for the right eye to project an enlarged image of the image display device 3 into the observer's right eye. In this case, an intermediate image is formed once in the optical path from the image display device 3 to the exit pupil 4R. The optical path for the left eye is in symmetric relation to the optical path for the right eye with respect to the plane of symmetry between the two eyes as in the case of the arrangement of the optical system for the right eye.

With the above-described arrangement, in both the left and right optical paths, display light from the image display device 3 is led to the eyeball after undergoing four reflections. Therefore, images led to the left and right eyes are not in mirror-image relation to each other. Accordingly, it is possible to see images of the same orientation with the left and right eyes. Moreover, because the image of the image display device 3 is projected via reflecting and transmitting surfaces which are decentered or tilted with respect to the optical axis and at least one of which has a positive power, it is possible to project an image favorably corrected for various aberrations, e.g. curvature of field and chromatic aberration. In a case where no intermediate image is formed, it is difficult to ensure the required back focus, and a wide field angle cannot be obtained. In the case of this example, however, because an intermediate image is formed once, it is possible to correct aberrations favorably even at a wide field angle. In addition, because the exit surfaces and reflecting surfaces of the optical path distributing prism 10 are not surfaces shared between them, decentration aberrations can be corrected favorably. Because the reflecting surfaces 12R and 12L of the optical path distributing prism 10 do not use total reflection, it is possible to reduce the angle of incidence on the surfaces and to relax the requirement for the surface manufacturing accuracy. Furthermore, because the image display device 3 is located away from the observer, it does not interfere with the observer's nose. In addition, it is possible to lead a display image from a single common image display device 3 to the two eyes as a bright image because the apparatus does not employ a half-mirror as is used in JP(A) 9-61748. In addition, by using free-form surfaces for the reflecting surfaces 12R and 12L of the optical path distributing prism 10, it becomes possible to correct decentration aberrations very favorably.

Further, in both the left and right optical paths, the greater part of the optical path passes through the decentered prism members 10 and 2R (2L), which are filled with a transparent medium having a refractive index larger than 1, and the optical path is folded therein. Therefore, the whole ocular optical system can be made compact. Furthermore, the decentered prism members 2R and 2L are placed at positions that are in plane symmetry with each other and have the same configuration. It is only necessary to prepare two decentered prism members 2R and 2L having the same configuration and to place them at respective positions that are in plane symmetry with respect to the decentered prism member 10 at the middle between the two eyes.

Figure 8:
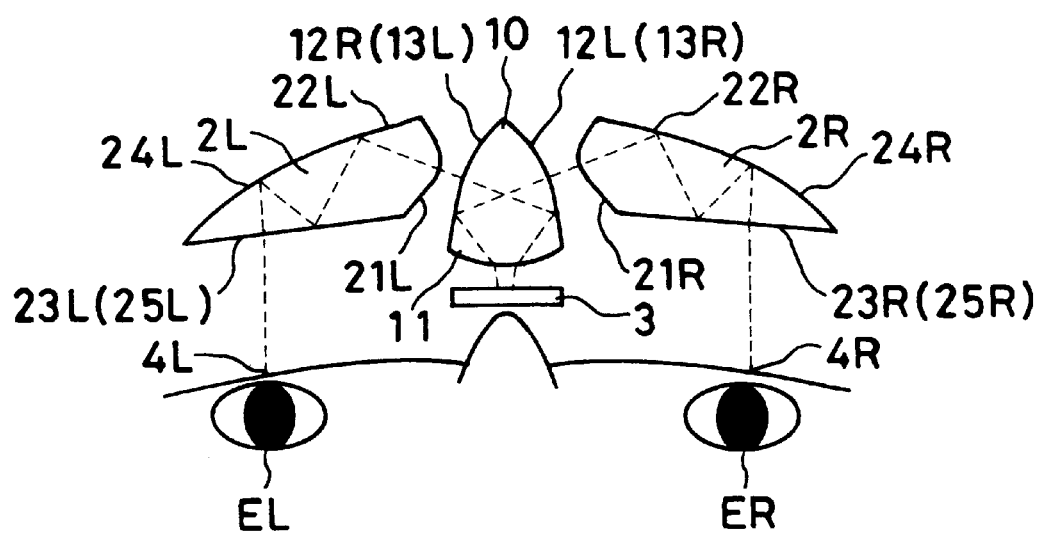
FIG. 8 is a ray path diagram of an image display apparatus according to Example 8 of the present invention.

FIG. 8 shows a horizontal section (YZ-section) of Example 8. Example 8 uses an optical path distributing prism 10 formed from a decentered prism member with three surfaces as in the case of Example 5 (FIG. 5), in place of the optical path distributing prism 10 formed from a decentered prism member with five surfaces in Example 7. The decentered prism members 2L and 2R for the left and right eyes are the same as those in Example 7.

The optical path distributing prism 10 at the middle between the two eyes has a symmetric configuration with respect to the plane of symmetry between the two eyes as in the case of Example 5 (FIG. 5). The optical path distributing prism 10 has three surfaces: a first surface 11 as a transmitting surface located on the side of the image display device 3 remote from the observer; a second surface 12R as a reflecting surface for the right optical path and a second surface 12L as a reflecting surface for the left optical path, which are located at both sides of the first surface 11 on the observer side thereof and function as totally reflecting surfaces; a transmitting surface 13L for the left optical path, which is the identical with the second surface 12R as a reflecting surface for the right optical path; and a transmitting surface 13R for the right optical path, which is the identical with the second surface 12L as a reflecting surface for the left optical path. The first surface 11 has a symmetric configuration with respect to the plane of symmetry between the two eyes. The second surfaces 12R (13L) and 12L (13R) have configurations that are symmetric with respect to the plane of symmetry between the two eyes. The image display device 3 is placed to face the first surface 11 of the optical path distributing prism 10 on the observer side of the optical path distributing prism 10.

In the above-described arrangement, the left and right optical paths, which are shown by the dashed lines, are symmetric with respect to the plane of symmetry between the two eyes. Therefore, the optical path for the right eye will be described representatively. Display light from a single image display device 3 common to the two eyes is, first, incident on the first surface 11 of the optical path distributing prism 10. The incident light is incident on the second surface 12R as a reflecting surface for the right optical path and totally reflected by the second surface 12R. The reflected light passes through the transmitting surface 13R (12L) for the right optical path and enters the decentered prism member 2R. The incident light passes through the first surface 21R to enter the prism. The light is reflected by the second surface 22R, and the reflected light is incident on the third surface 23R at an incident angle not less than the critical angle and thus totally reflected by the third surface 23R. The reflected light is incident on the fourth surface 24R and back-reflected thereby so as to be incident on the fifth surface 25R at an incident angle less than the critical angle. The incident light is refracted by the fifth surface 25R to exit from the decentered prism member 2R. Then, the light is led to the exit pupil 4R for the right eye to project an enlarged image of the image display device 3 into the observer's right eye. In this case, an intermediate image is formed once in the optical path from the image display device 3 to the exit pupil 4R. The optical path for the left eye is in symmetric relation to the optical path for the right eye with respect to the plane of symmetry between the two eyes as in the case of the arrangement of the optical system for the right eye.

With the above-described arrangement, in both the left and right optical paths, display light from the image display device 3 is led to the eyeball after undergoing four reflections. Therefore, images led to the left and right eyes are not in mirror-image relation to each other. Accordingly, it is possible to see images of the same orientation with the left and right eyes. Moreover, because the image of the image display device 3 is projected via reflecting and transmitting surfaces which are decentered or tilted with respect to the optical axis and at least one of which has a positive power, it is possible to project an image favorably corrected for various aberrations, e.g. curvature of field and chromatic aberration. In a case where no intermediate image is formed, it is difficult to ensure the required back focus, and a wide field angle cannot be obtained. In the case of this example, however, because an intermediate image is formed once, it is possible to correct aberrations favorably even at a wide field angle. In addition, because the exit surfaces of the optical path distributing prism 10 are also used as reflecting surfaces, the number of effective surfaces of the optical path distributing prism 10 is only three. Therefore, the production is very easy.

Furthermore, because the image display device 3 is located on the observer side, the whole display apparatus does not project forward to a considerable extent. In addition, it is possible to lead a display image from a single common image display device 3 to the two eyes as a bright image because the apparatus does not employ a half-mirror as is used in JP(A) 9-61748. In addition, by using free-form surfaces for the reflecting surfaces 12R and 12L of the optical path distributing prism 10, it becomes possible to correct decentration aberrations very favorably.

Further, in both the left and right optical paths, the greater part of the optical path passes through the decentered prism members 10 and 2R (2L), which are filled with a transparent medium having a refractive index larger than 1, and the optical path is folded therein. Therefore, the whole ocular optical system can be made compact. Furthermore, the decentered prism members 2R and 2L are placed at positions that are in plane symmetry with each other and have the same configuration. It is only necessary to prepare two decentered prism members 2R and 2L having the same configuration and to place them at respective positions that are in plane symmetry with respect to the decentered prism member 10 at the middle between the two eyes.

Figure 9:
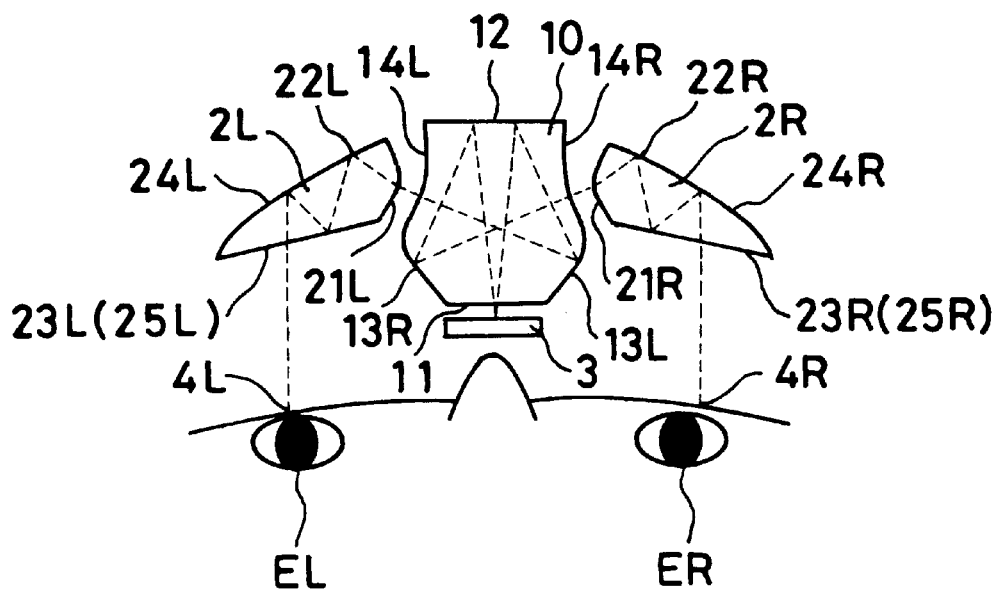
FIG. 9 is a ray path diagram of an image display apparatus according to Example 9 of the present invention.

FIG. 9 shows a horizontal section (YZ-section) of Example 9. Example 9 uses an optical path distributing prism 10 formed from a decentered prism member with six surfaces as in the case of Example 6 (FIG. 6) in place of the optical path distributing prism 10 formed from a decentered prism member with five surfaces in Example 7. The decentered prism members 2L and 2R for the left and right eyes are the same as those in Example 7.

The optical path distributing prism 10 at the middle between the two eyes has a symmetric configuration with respect to the plane of symmetry between the two eyes as in the case of Example 6 (FIG. 6). The optical path distributing prism 10 has six surfaces: a first surface 11 as a transmitting surface located on the side of the image display device 3 remote from the observer; a second surface 12R as a reflecting surface facing the first surface 11 on the side of the first surface 11 remote from the observer; a third surface 13R as a reflecting surface for the right optical path and a third surface 13L as a reflecting surface for the left optical path, which are located at both sides of the first surface 11 on the side thereof remote from the observer; and a fourth surface 14L as a transmitting surface for the left optical path and a fourth surface 14R as a transmitting surface for the right optical path, which are located on both sides between the second surface 12 and the third surfaces 13R and 13L. The first surface 11 and the second surface 12 each have a symmetric configuration with respect to the plane of symmetry between the two eyes. The third surfaces 13R and 13L and the fourth surfaces 14L and 14R have configurations that are symmetric with respect to the plane of symmetry between the two eyes. The image display device 3 is placed to face the first surface 11 of the optical path distributing prism 10 on the observer side of the optical path distributing prism 10.

In the above-described arrangement, the left and right optical paths, which are shown by the dashed lines, are symmetric with respect to the plane of symmetry between the two eyes. Therefore, the optical path for the right eye will be described representatively. Display light from a single image display device 3 common to the two eyes is, first, incident on the first surface 11 of the optical path distributing prism 10, which is common to the left and right. The incident light is reflected by the second surface 12, which is common to the left and right. The reflected light is incident on the third surface 13R as a reflecting surface for the right optical path and reflected by the third surface 13R. The reflected light passes through the transmitting surface 14R for the right optical path and enters the decentered prism member 2R. The incident light passes through the first surface 21R to enter the prism. The light is reflected by the second surface 22R, and the reflected light is incident on the third surface 23R at an incident angle not less than the critical angle and thus totally reflected by the third surface 23R. The reflected light is incident on the fourth surface 24R and back-reflected thereby so as to be incident on the fifth surface 25R at an incident angle less than the critical angle. The incident light is refracted by the fifth surface 25R to exit from the decentered prism member 2R. Then, the light is led to the exit pupil 4R for the right eye to project an enlarged image of the image display device 3 into the observer's right eye. In this case, an intermediate image is formed once in the optical path from the image display device 3 to the exit pupil 4R. The optical path for the left eye is in symmetric relation to the optical path for the right eye with respect to the plane of symmetry between the two eyes as in the case of the arrangement of the optical system for the right eye.

With the above-described arrangement, in both the left and right optical paths, display light from the image display device 3 is led to the eyeball after undergoing five reflections. Therefore, images led to the left and right eyes are not in mirror-image relation to each other. Accordingly, it is possible to see images of the same orientation with the left and right eyes. Moreover, because the image of the image display device 3 is projected via reflecting and transmitting surfaces which are decentered or tilted with respect to the optical axis and at least one of which has a positive power, it is possible to project an image favorably corrected for various aberrations, e.g. curvature of field and chromatic aberration. In a case where no intermediate image is formed, it is difficult to ensure the required back focus, and a wide field angle cannot be obtained. In the case of this example, however, because an intermediate image is formed once, it is possible to correct aberrations favorably even at a wide field angle. In addition, because the optical path distributing prism 10 is arranged to reflect light twice therein, it is possible to correct decentration aberrations very favorably. Furthermore, because the image display device 3 is located on the observer side, the whole display apparatus does not project forward to a considerable extent. In addition, it is possible to lead a display image from a single common image display device 3 to the two eyes as a bright image because the apparatus does not employ a half-mirror as is used in JP(A) 9-61748. In addition, by using free-form surfaces for the reflecting surfaces 12, 13R and 13L of the optical path distributing prism 10, it becomes possible to correct decentration aberrations very favorably.

Further, in both the left and right optical paths, the greater part of the optical path passes through the decentered prism members 10 and 2R (2L), which are filled with a transparent medium having a refractive index larger than 1, and the optical path is folded therein. Therefore, the whole ocular optical system can be made compact. Furthermore, the decentered prism members 2R and 2L are placed at positions that are in plane symmetry with each other and have the same configuration. It is only necessary to prepare two decentered prism members 2R and 2L having the same configuration and to place them at respective positions that are in plane symmetry with respect to the decentered prism member 10 at the middle between the two eyes.

Figure 10:
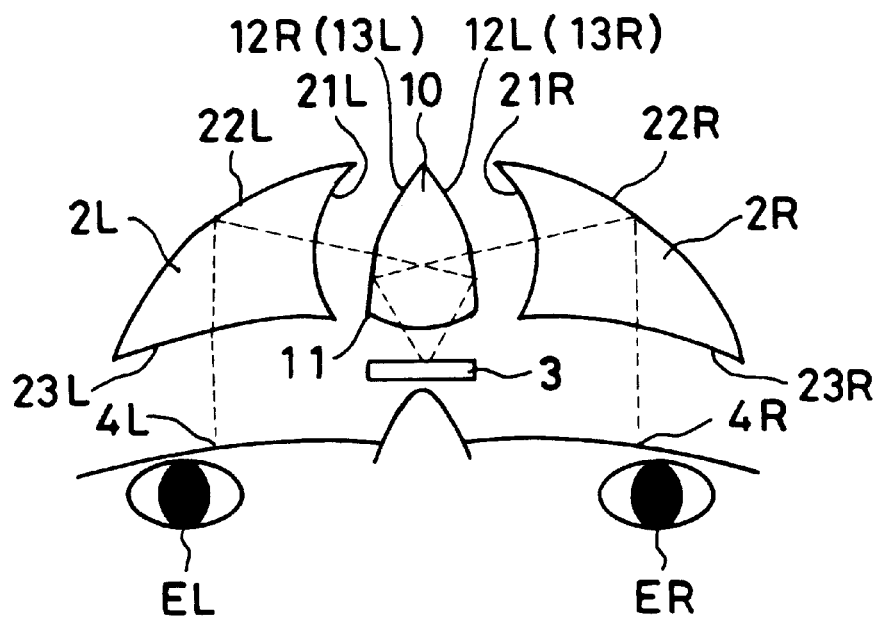
FIG. 10 is a ray path diagram of an image display apparatus according to Example 10 of the present invention.

FIG. 10 shows a horizontal section (YZ-section) of Example 10. In Example 10, a decentered prism member 2R for the right eye and a decentered prism member 2L for the left eye, which are formed from respective decentered prism members of the same configuration having three surfaces, are placed in symmetry with respect to the plane of symmetry between the two eyes, in place of the decentered prism member 2R for the right eye and the decentered prism member 2L for the left eye, which are formed from respective decentered prism members each having four surfaces in Example 8 (FIG. 8). The optical path distributing prism 10 is the same as in Example 8. Light entering the decentered prism member 2R through a first surface 21R thereof is reflected by a second surface 22R. The reflected light is refracted by a third surface 23R to exit from the decentered prism member 2R. Then, the light is led to the exit pupil 4R for the right eye to project an enlarged image of the image display device 3 into the observer's right eye. In this case, an intermediate image is formed once in the optical path from the image display device 3 to the exit pupil 4R. The optical path for the left eye is in symmetric relation to the optical path for the right eye with respect to the plane of symmetry between the two eyes as in the case of the arrangement of the optical system for the right eye. The rest of Example 10 is the same as that in Example 8.

Figure 11:
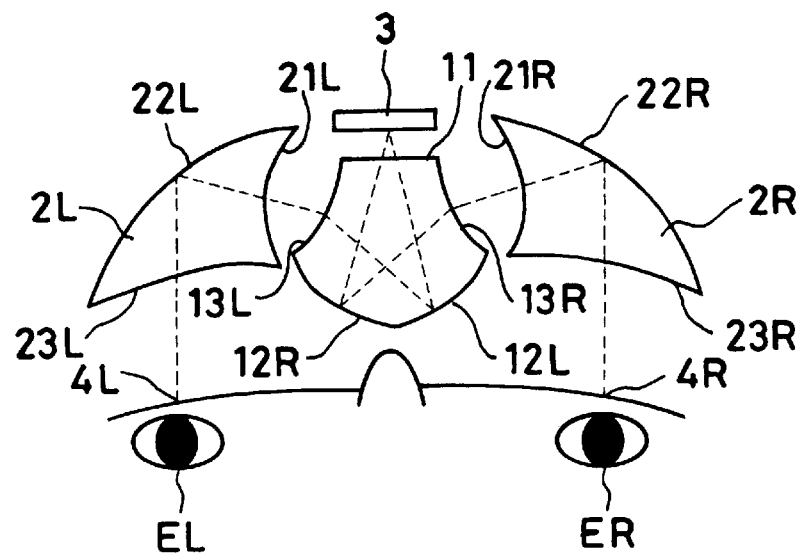
FIG. 11 is a ray path diagram of an image display apparatus according to Example 11 of the present invention.

FIG. 11 shows a horizontal section (YZ-section) of Example 11. In Example 11, a decentered prism member 2R for the right eye and a decentered prism member 2L for the left eye, which are formed from respective decentered prism members of the same configuration having three surfaces, are placed in symmetry with respect to the plane of symmetry between the two eyes, in place of the decentered prism member 2R for the right eye and the decentered prism member 2L for the left eye, which are formed from respective decentered prism members each having four surfaces in Example 7 (FIG. 7). The optical path distributing prism 10 is the same as in Example 7. Light entering the decentered prism member 2R through a first surface 21R thereof is reflected by a second surface 22R. The reflected light is refracted by a third surface 23R to exit from the decentered prism member 2R. Then, the light is led to the exit pupil 4R for the right eye to project an enlarged image of the image display device 3 into the observer's right eye. In this case, an intermediate image is formed once in the optical path from the image display device 3 to the exit pupil 4R. The optical path for the left eye is in symmetric relation to the optical path for the right eye with respect to the plane of symmetry between the two eyes as in the case of the arrangement of the optical system for the right eye. The rest of Example 11 is the same as that in Example 7.

Figure 12:
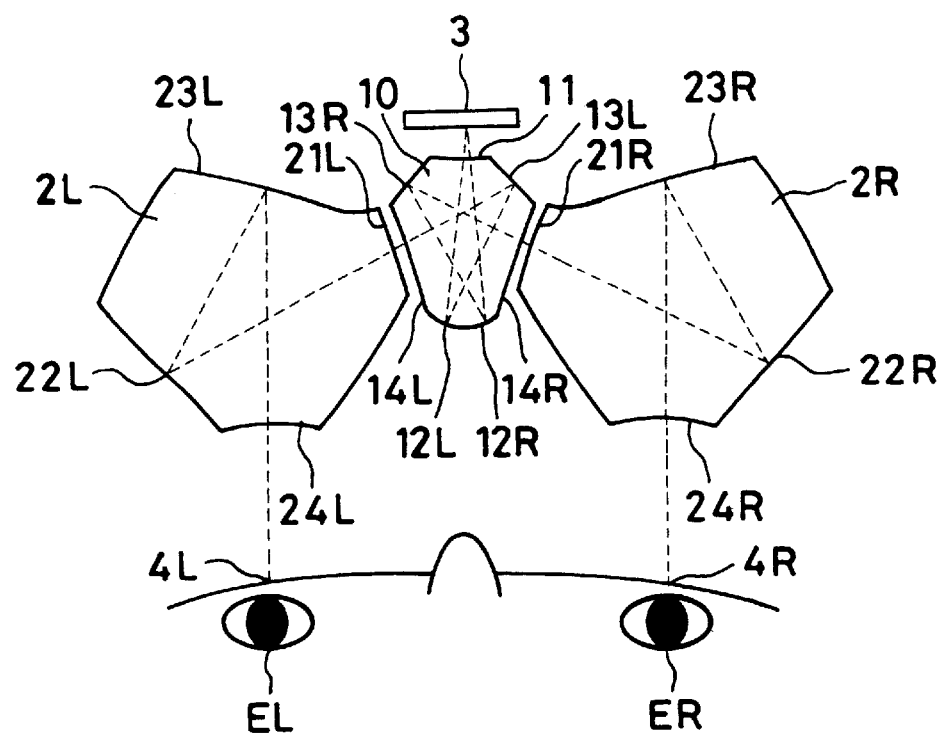
FIG. 12 is a ray path diagram of an image display apparatus according to Example 12 of the present invention.

FIG. 12 shows a horizontal section (YZ-section) of Example 12. Example 12 uses an optical path distributing prism 10 formed from a decentered prism member having seven surfaces. A decentered prism member 2R constituting an optical system for the right eye and a decentered prism member 2L constituting an optical system for the left eye have the same configuration and are placed in symmetry with respect to the plane of symmetry between the two eyes. The decentered prism member 2R and the decentered prism member 2L each have, in order in which rays pass, a first surface 21R (21L), a second surface 22R (22L), a third surface 23R (23L), and a fourth surface 24R (24L).

The optical path distributing prism 10 at the middle between the two eyes has a symmetric configuration with respect to the plane of symmetry between the two eyes. The optical path distributing prism 10 has seven surfaces: a first surface 11 as a transmitting surface located on the side remote from the observer; a third surface 13R as a reflecting surface for the right optical path and a third surface 13L as a reflecting surface for the left optical path, which are located at both sides of the first surface 11 on the side remote from the observer; a fourth surface 14L as a transmitting surface for the left optical path and a fourth surface 14R as a transmitting surface for the right optical path, which are located on the observer sides of the third surfaces 13R and 13L, respectively; and a second surface 12L as a reflecting surface for the left optical path and a second surface 12R as a reflecting surface for the right optical path, which are located on the observer sides of the fourth surfaces 14R and 14L. The first surface 11 has a symmetric configuration with respect to the plane of symmetry between the two eyes. The third surfaces 13R and 13L, the fourth surfaces 14L and 14R and the second surfaces 12L and 12R have configurations that are symmetric with respect to the plane of symmetry between the two eyes. The image display device 3 is placed to face the first surface 11 of the optical path distributing prism 10 on the side of the optical path distributing prism 10 remote from the observer.

In the above-described arrangement, the left and right optical paths, which are shown by the dashed lines, are symmetric with respect to the plane of symmetry between the two eyes. Therefore, the optical path for the right eye will be described representatively. Display light from a single image display device 3 common to the two eyes is, first, incident on the first surface 11 of the optical path distributing prism 10. The incident light is incident on the second surface 12R as a reflecting surface for the right optical path and reflected by the second surface 12R. The reflected light is incident on the third surface 13R as the subsequent reflecting surface for the right optical path and reflected by the third surface 13R. The reflected light passes through the transmitting surface 14R for the right optical path and enters the decentered prism member 2R. The incident light passes through the first surface 21R to enter the prism. The light is incident on the second surface 22R and back-reflected thereby. The reflected light is incident on the third surface 23R and back-reflected thereby. The reflected light is refracted by the fourth surface 24R to exit from the decentered prism member 2R. Then, the light is led to the exit pupil 4R for the right eye to project an enlarged image of the image display device 3 into the observer's right eye. In this case, an intermediate image is formed once in the optical path from the image display device 3 to the exit pupil 4R. The optical path for the left eye is in symmetric relation to the optical path for the right eye with respect to the plane of symmetry between the two eyes as in the case of the arrangement of the optical system for the right eye.

With the above-described arrangement, in both the left and right optical paths, display light from the image display device 3 is led to the eyeball after undergoing four reflections. Therefore, images led to the left and right eyes are not in mirror-image relation to each other. Accordingly, it is possible to see images of the same orientation with the left and right eyes. Moreover, because the image of the image display device 3 is projected via reflecting and transmitting surfaces which are decentered or tilted with respect to the optical axis and at least one of which has a positive power, it is possible to project an image favorably corrected for various aberrations, e.g. curvature of field and chromatic aberration. In a case where no intermediate image is formed, it is difficult to ensure the required back focus, and a wide field angle cannot be obtained. In the case of this example, however, because an intermediate image is formed once, it is possible to correct aberrations favorably even at a wide field angle. In addition, because the exit surfaces and reflecting surfaces of the optical path distributing prism 10 are not surfaces shared between them, decentration aberrations can be corrected favorably. Because the reflecting surfaces 12R, 12L, 13R and 13L of the optical path distributing prism 10 do not use total reflection, it is possible to reduce the angle of incidence on the surfaces and to relax the requirement for the surface manufacturing accuracy. Furthermore, because the image display device 3 is located away from the observer, it does not interfere with the observer's nose. In addition, it is possible to lead a display image from a single common image display device 3 to the two eyes as a bright image because the apparatus does not employ a half-mirror as is used in JP(A) 9-61748. In addition, by using free-form surfaces for the reflecting surfaces 12R, 12L, 13R and 13L of the optical path distributing prism 10, it becomes possible to correct decentration aberrations very favorably.

Further, in both the left and right optical paths, the greater part of the optical path passes through the decentered prism members 10 and 2R (2L), which are filled with a transparent medium having a refractive index larger than 1, and the optical path is folded therein. Therefore, the whole ocular optical system can be made compact. Furthermore, the decentered prism members 2R and 2L are placed at positions that are in plane symmetry with each other and have the same configuration. It is only necessary to prepare two decentered prism members 2R and 2L having the same configuration and to place them at respective positions that are in plane symmetry with respect to the decentered prism member 10 at the middle between the two eyes.

In this example, none of the optical path distributing prism 10 and the decentered prism members 2R and 2L use a totally reflecting surface. When a totally reflecting surface is used, the incident angle of light rays needs to be increased greatly in order to satisfy the condition for total reflection. However, when a power is given to a surface having a large incident angle, decentration aberrations occur to a considerable extent. Therefore, only a weak power can be given to such a surface. In this example, which does not use such a totally reflecting surface, however, powers can be distributed equally to various surfaces by utilizing ordinary reflection. Thus, it is possible to correct decentration aberrations very favorably. In addition, because the optical path is arranged to cross itself within each of the decentered prisms 10, 2R and 2L, it is possible to increase the optical path length of the ocular prism. Therefore, an intermediate image can be formed at a position within the ocular prism. Accordingly, it is possible to lengthen the overall distance from the intermediate image to the display device and to set a weak power for the optical path distributing prism 10. Consequently, it is possible to ensure favorable image-forming performance.

Figure 13:
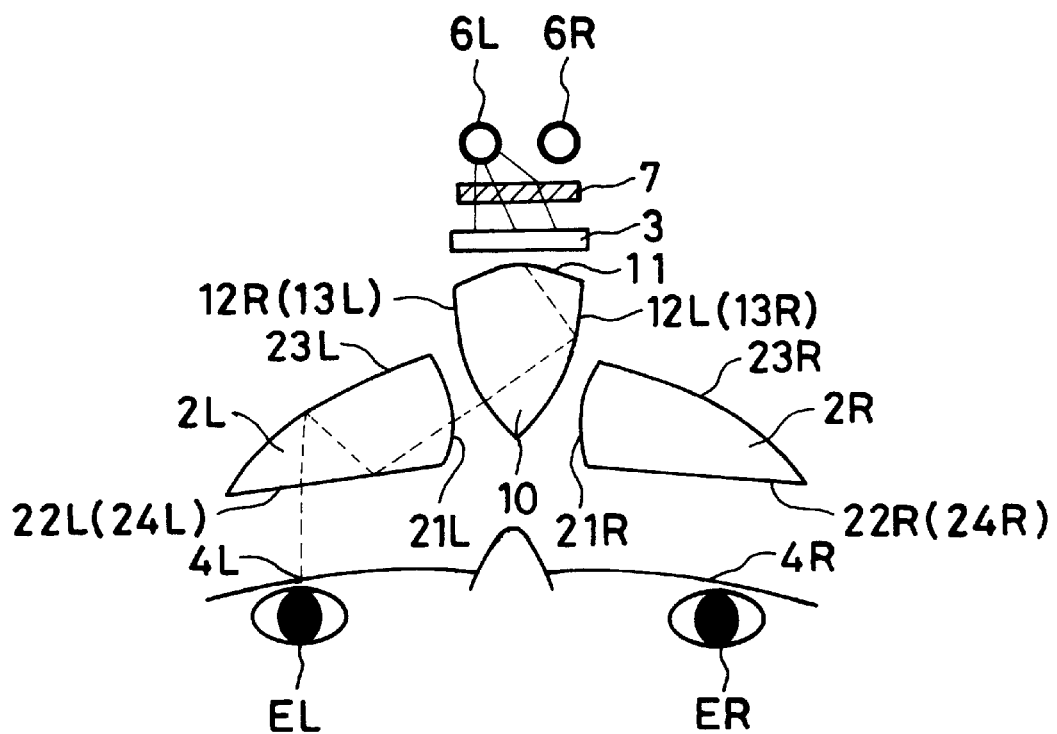
FIG. 13 is a ray path diagram of an image display apparatus according to Example 13 of the present invention.

Examples 13 to 15 are examples relating to an illuminating optical system for the image display device 3. Example 13 shown in FIG. 13 is an example in which a transmission type LCD (liquid crystal display device) is used as the image display device 3 in the arrangement of the left and right optical systems in Example 5 shown in FIG. 5, and illuminating light sources 6R and 6L for the right and left optical paths are placed at the back of the image display device 3 (on the side remote from the optical path distributing prism 10), and further a condensing Fresnel lens 7 is placed between the image display device 3 and the light sources 6R and 6L.

In this example, illuminating light from the illuminating light source 6L for the left optical path is incident on the image display device 3 after being condensed by the Fresnel lens 7. Display light from the image display device 3 reaches the observer's left eye EL through the optical path for the left eye in FIG. 5 and projects an enlarged image of the image display device 3. Illuminating light from the illuminating light source 6R for the right optical path is incident on the image display device 3 after being condensed by the Fresnel lens 7. Display light from the image display device 3 reaches the observer's left eye ER through the optical path for the right eye in FIG. 5 and projects an enlarged image of the image display device 3.

In this case, the left and right optical systems share the illuminating optical system 7 for the left and right eyes, which is used for a single image display device (LCD) 3 common to the left and right, and the optical path distributing prism 10. Thus, it is possible to reduce the number of optical members and also possible to obtain a compact, lightweight and bright display apparatus. It should be noted that, in this example, a half-mirror is not used in the illuminating optical system either, and it is therefore possible to display a very bright image.

Figure 14:
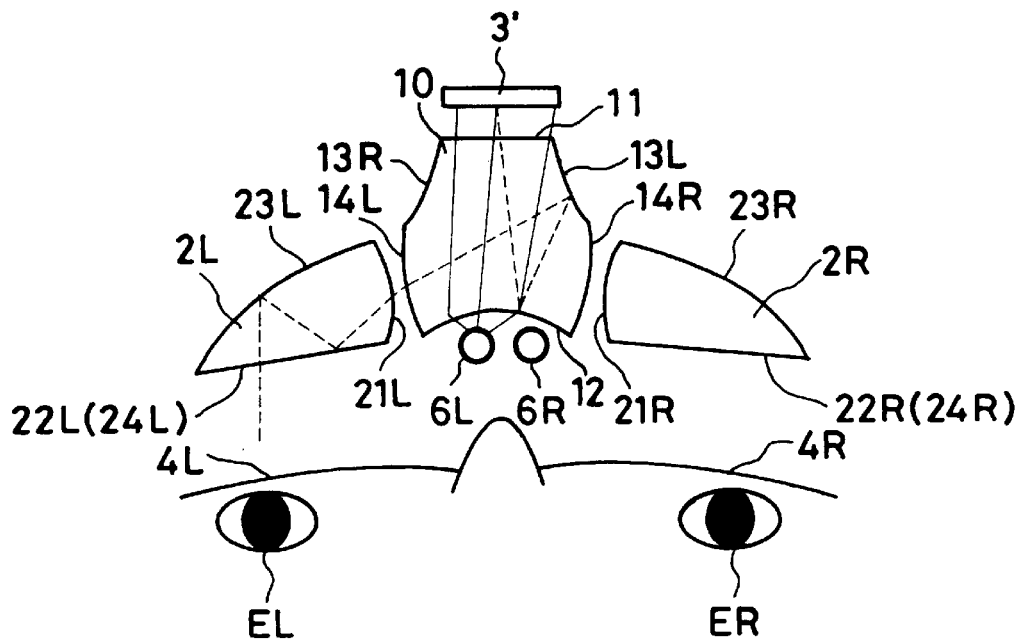
FIG. 14 is a ray path diagram of an image display apparatus according to Example 14 of the present invention.

Example 14 shown in FIG. 14 is an example in which a reflection type LCD (liquid crystal display device) 3' is used as the image display device 3 in the arrangement of the left and right optical systems in Example 6 shown in FIG. 6. In addition, illuminating light sources 6R and 6L for the right and left optical paths are placed so as to be capable of illuminating the reflection type LCD 3' across the optical path distributing prism 10, and the second surface 12 of the optical path distributing prism 10 is formed as a half-mirror surface or a mirror surface partly provided with holes for passing light, thereby illuminating the reflection type LCD 3' with illuminating light from the light sources 6R and 6L through the second surface 12 and the first surface 11.

In this example, illuminating light from the illuminating light source 6L for the left optical path passes through the half-mirror surface, which forms the second surface 12 of the optical path distributing prism 10, or through the holes of the mirror surface partly provided with holes for passing light, which forms the second surface 12 of the optical path distributing prism 10. Then, the illuminating light crosses the optical path distributing prism 10 and passes through the first surface 11 thereof so as to be incident on the display surface of the reflection type LCD 3'. Display light reflected from the display surface reaches the observer's left eye EL through the optical path for the left eye in FIG. 6 and projects an enlarged image of the image display device 3. Similarly, illuminating light from the illuminating light source 6R for the right optical path passes through the half-mirror surface, which forms the second surface 12 of the optical path distributing prism 10, or through the holes of the mirror surface partly provided with holes for passing light, which forms the second surface 12 of the optical path distributing prism 10. Then, the illuminating light crosses the optical path distributing prism 10 and passes through the first surface 11 thereof so as to be incident on the display surface of the reflection type LCD 3'. Display light reflected from the display surface reaches the observer's right eye ER through the optical path for the right eye in FIG. 6 and projects an enlarged image of the image display device 3.

In this case, the left and right optical systems share the illuminating optical system for the left and right eyes, which is used for a single reflection type LCD 3' common to the left and right, and the optical path distributing prism 10. Thus, it is possible to reduce the number of optical members and also possible to obtain a compact, lightweight and bright display apparatus. It should be noted that, in this example, the optical path distributing prism (also used as an illuminating prism) 10 has six effective surfaces, and it is therefore possible to illuminate the reflection type LCD 3' uniformly and to correct decentration aberrations even more favorably.

Figure 15:
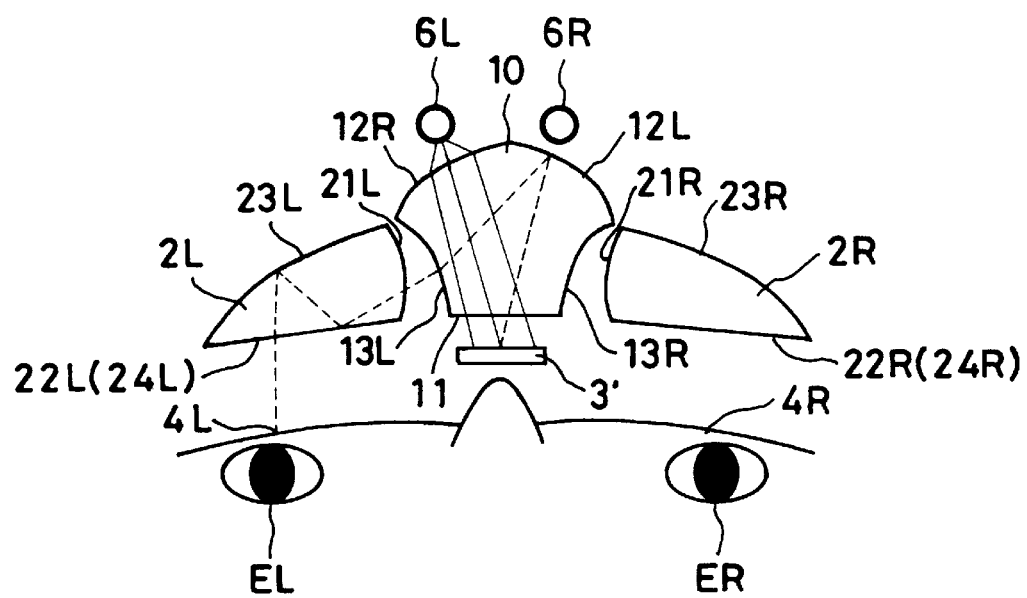
FIG. 15 is a ray path diagram of an image display apparatus according to Example 15 of the present invention.

Example 15 shown in FIG. 15 is an example in which a reflection type LCD 3' is used as the image display device 3 in the arrangement of the left and right optical systems in Example 4 shown in FIG. 4. In addition, illuminating light sources 6R and 6L for the left and right optical paths are placed so as to be capable of illuminating the reflection type LCD 3' across the optical path distributing prism 10, and the second surfaces 12L and 12R of the optical path distributing prism 10 for the left and right optical paths are formed as half-mirror surfaces or mirror surfaces partly provided with holes for passing light, thereby illuminating the reflection type LCD 3' with illuminating light from the light sources 6R and 6L through the second surfaces 12L and 12R and the first surface 11.

In this example, illuminating light from the illuminating light source 6L for the left optical path passes through the half-mirror surface, which forms the second surface 12R of the optical path distributing prism 10 for the optical path for the right eye, or through the holes of the mirror surface partly provided with holes for passing light, which forms the second surface 12R. Then, the illuminating light crosses the optical path distributing prism 10 and passes through the first surface 11 thereof so as to be incident on the display surface of the reflection type LCD 3'. Display light reflected from the display surface reaches the observer's left eye EL through the optical path for the left eye in FIG. 4 and projects an enlarged image of the image display device 3. Similarly, illuminating light from the illuminating light source 6R for the right optical path passes through the half-mirror surface, which forms the second surface 12L of the optical path distributing prism 10 for the optical path for the left eye, or through the holes of the mirror surface partly provided with holes for passing light, which forms the second surface 12L. Then, the illuminating light crosses the optical path distributing prism 10 and passes through the first surface 11 thereof so as to be incident on the display surface of the reflection type LCD 3'. Display light reflected from the display surface reaches the observer's right eye ER through the optical path for the right eye in FIG. 4 and projects an enlarged image of the image display device 3.

In this case, the left and right optical systems share the illuminating optical system for the left and right eyes, which is used for a single reflection type LCD 3' common to the left and right, and the optical path distributing prism 10. Thus, it is possible to reduce the number of optical members and also possible to obtain a compact, lightweight and bright display apparatus. It should be noted that, in this example, the left and right optical systems share the entrance and exit surfaces of the illuminating optical system while sharing the optical path distributing prism 10 and the illuminating optical system, thereby allowing the optical path distributing prism 10 to be reduced in both size and weight.

It should be noted that a transmission or reflection type image display device 3 can be illuminated not only in the examples shown in FIGS. 4 to 6 but also in the other examples described above by using illuminating light sources 6R and 6L for the right and left optical paths, placing a condensing Fresnel lens 7, or forming a reflecting surface as a half-mirror surface or a mirror surface partly provided with holes for passing light, as shown in FIGS. 13 to 15.

Incidentally, it is desirable to use surfaces with a rotationally asymmetric curved surface configuration that corrects decentration aberrations as the reflecting surfaces 1R and 1L of the optical path distributing mirror 1, the surfaces 11, 12, 12R, 12L, 13R, 13L, 14R and 14L of the optical path distributing prism 10, the surfaces 21R to 25R of the decentered prism member 2R of the ocular optical system for the right eye, and the surfaces 21L to 25L of the decentered prism member 2L of the ocular optical system for the right eye.

Basically, the decentered prism member 2R for the right eye, the decentered prism member 2L for the left eye, the optical path distributing prism 10 and the optical path distributing mirror 1 in the present invention are decentered optical systems. It is desirable that these decentered optical systems be arranged so as to include at least one optical surface with a rotationally asymmetric curved surface configuration that corrects decentration aberrations.

In a case where a decentered optical system is used, for example, as a viewing optical system of a head-mounted image display apparatus, it is necessary in order to eliminate a dead space and minimize the overall size of the apparatus to position an image display device and each optical surface constituting the decentered optical system so that the constituent elements are accommodated in the apparatus in as compact a form as possible. Consequently, the optical system must inevitably be decentered three-dimensionally, and this causes rotationally asymmetric aberration to occur. It is impossible to correct the rotationally asymmetric aberration by only a rotationally symmetric optical system. The best surface configuration for correcting the rotationally asymmetric aberration due to three-dimensional decentration is a rotationally asymmetric surface. Therefore, in the image display apparatus according to the present invention, it is desirable to use a rotationally asymmetric curved surface configuration that corrects decentration aberrations as the configuration of at least one surface, preferably at least one reflecting surface, among the reflecting surfaces 1R and 1L of the optical path distributing mirror 1, the surfaces 11, 12, 12R, 12L, 13R, 13L, 14R and 14L of the optical path distributing prism 10, the surfaces 21R to 25R of the decentered prism member 2R of the ocular optical system for the right eye and the surfaces 21L to 25L of the decentered prism member 2L of the ocular optical system for the right eye.

A free-form surface used in the present invention as a surface with a rotationally asymmetric curved surface configuration is defined by the following equation. The Z-axis of the defining equation is the axis of a free-form surface.

$$Z = cr^2 / [1 + \sqrt{\{1 - (1+k)c^2 r^2\}}] + \sum_{j=2}^{66} C_j X^m Y^n \tag{a}$$

In the equation (a), the first term is a spherical surface term, and the second term is a free-form surface term.

In the spherical surface term:

c: the curvature at the vertex k: a conic constant $r = \sqrt{(X^2 + Y^2)}$

The free-form surface term is given by $$\sum_{j=2}^{66} C_j X^m Y^n$$

$= C_2 X + C_3 Y +$ $C_4 X^2 + C_5 XY + C_6 Y^2 +$ $C_7 X^3 + C_8 X^2 Y + C_9 XY^2 + C_{10} Y^3 +$ $C_{11} X^4 + C_{12} X^3 Y + C_{13} X^2 Y^2 + C_{14} XY^3 +$ $C_{15} Y^4 + C_{21} Y^5 +$ $C_{22} X^6 + C_{23} X^5 Y + C_{24} X^4 Y^2 + C_{25} X^3 Y^3 +$ $C_{26} X^2 Y^4 + C_{27} XY^5 + C_{28} Y^6 +$ $C_{29} X^7 + C_{30} X^6 Y + C_{31} X^5 Y^2 + C_{32} X^4 Y^3 +$ $C_{33} X^3 Y^4 + C_{34} X^2 Y^5 + C_{35} XY^6 + C_{36} Y^7$ where $C_j$ (j is an integer of 2 or higher) are coefficients.

In general, the above-described free-form surface does not have planes of symmetry in both the XZ- and YZ-planes. However, a free-form surface having only one plane of symmetry parallel to the YZ-plane is obtained by making all terms of odd-numbered degrees with respect to X zero. A free-form surface having only one plane of symmetry parallel to the XZ-plane is obtained by making all terms of odd-numbered degrees with respect to Y zero.

In addition, free-form surfaces as the above-described surfaces with a rotationally asymmetric curved surface configuration may be defined by Zernike polynomials. That is, the configuration of a free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), A is the distance from the Z-axis in the XY-plane, and R is the azimuth angle about the Z-axis, which is expressed by the angle of rotation measured from the Z-axis.

$x = R \times \cos(A)$ $y = R \times \sin(A)$ $Z = D_2 +$ $D_3 R \cos(A) + D_4 R \sin(A) +$ $D_5 R^2 \cos(2A) + D_6(R^2-1) + D_7 R^2 \sin(2A) +$ $D_8 R^3 \cos(3A) + D_9(3R^3-2R)\cos(A) +$ $D_{10}(3R^3-2R)\sin(A) + D_{11} R^3 \sin(3A) +$ $D_{12} R^4 \cos(4A) + D_{13}(4R^4-3R^2)\cos(2A) +$ $D_{14}(6R^4-6R^2+1) + D_{15}(4R^4-3R^2)\sin(2A) +$ $D_{16} R^4 \sin(4A) +$ $D_{17} R^5 \cos(5A) + D_{18}(5R^5-4R^3)\cos(3A) +$ $D_{19}(10R^5-12R^3+3R)\cos(A) +$ $D_{20}(10R^5-12R^3+3R)\sin(A) +$ $D_{21}(5R^5-4R^3)\sin(3A) + D_{22} R^5 \sin(5A) +$ $D_{23} R^6 \cos(6A) + D_{24}(6R^6-5R^4)\cos(4A) +$ $D_{25}(15R^6-20R^4+6R^2)\cos(2A) +$ $D_{26}(20R^6-30R^4+12R^2-1) +$ $D_{27}(15R^6-20R^4+6R^2)\sin(2A) +$ $D_{28}(6R^6-5R^4)\sin(4A) + D_{29} R^6 \sin(6A)$ (b)

where $D_m$ (m is an integer of 2 or higher) are coefficients.

It should be noted that to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

The above defining equations are shown to exemplify surfaces with a rotationally asymmetric curved surface configuration. Therefore, the same advantageous effect can be obtained for any other defining equation that expresses such a rotationally asymmetric surface.

When a light ray connecting the center of the display image of the image display device and the center of the pupil is defined as an optical axis, it is desirable that the free-form surfaces of the optical path distributing mirror 1, the optical path distributing prism 10, the ocular prism member 2R for the right eye and the ocular prism member 2L for the right eye have only one plane of symmetry in a plane (YZ-plane) containing the optical axis in the folded optical path within each prism.

It should be noted that other examples of defining equations for free-form surfaces include the following defining equation (c):

$Z = \Sigma\Sigma C_{nm} XY$

Assuming that k=7 (polynomial of degree 7), for example, a free-form surface is expressed by an expanded form of the above equation as follows:

$Z = C_2 +$ $C_3 Y + C_4 |X| +$ $C_5 Y^2 + C_6 Y|X| + C_7 X^2 +$ $C_8 Y^3 + C_9 Y^2|X| + C_{10} YX^2 + C_{11}|X^3| +$ $C_{12} Y^4 + C_{13} Y^3|X| + C_{14} Y^2 X^2 +$ $C_{15} Y|X^3| + C_{16} X^4 +$ $C_{17} Y^5 + C_{18} Y^4|X| + C_{19} Y^3 X^2 +$ $C_{20} Y^2|X^3| + C_{21} YX^4 + C_{22}|X^5| +$ $C_{23} Y^6 + C_{24} Y^5|X| + C_{25} Y^4 X^2 + C_{26} Y^3|X^3| +$ $C_{27} Y^2 X^4 + C_{28} Y|X^5| + C_{29} X^6 +$ $C_{30} Y^7 + C_{31} Y^6|X| + C_{32} Y^5 X^2 + C_{33} Y^4|X^3| +$ $C_{34} Y^3 X^4 + C_{35} Y^2|X^5| + C_{36} YX^6 + C_{37}|X^7|$ (c)

It should be noted that the refracting surfaces of the ocular prisms 2L and 2R for the left and right eyes that are closest to the respective exit pupils (the surfaces 24L and 24R in Examples 1 to 6; the surfaces 25L and 25R in Examples 7 to 9; and the surfaces 23L and 23R in Examples 10 and 11) may be formed from rotationally symmetric aspherical surfaces. In this case, productivity improves. In addition, when the rotationally symmetric aspherical surface is used as a reference surface, positioning of other surfaces is facilitated.

Further, other known types of decentered prism members may be used as the decentered prism members 2L and 2R, which constitute the optical systems for the left and right eyes in the foregoing examples.

Next, image display apparatuses according to Examples 16 to 30 will be described as specific numerical examples of the present invention.

Figure 16:
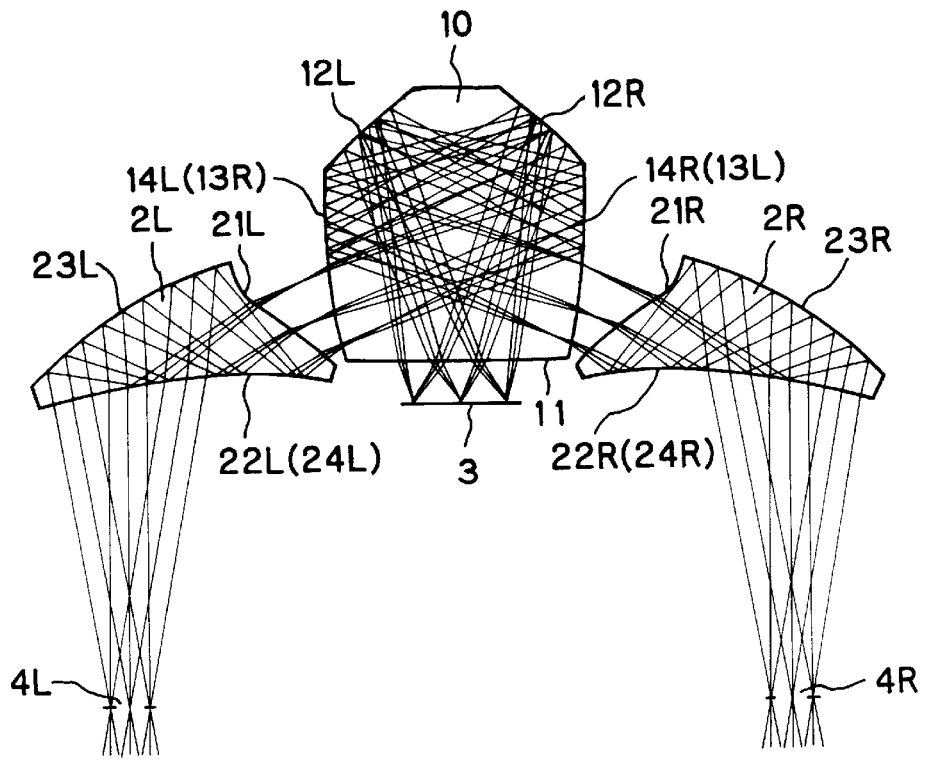
FIG. 16 is a diagram for describing an image display apparatus according to Example 16 of the present invention.
Figure 16:
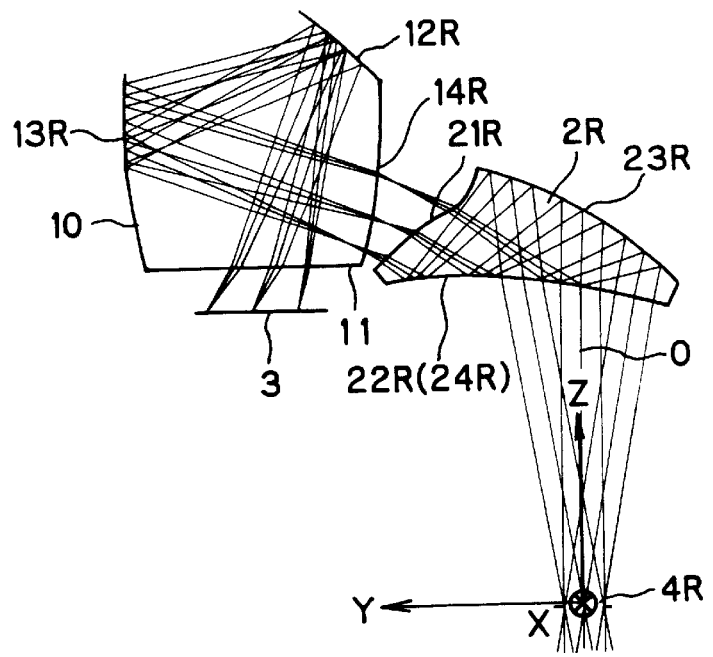

FIG. 16 is a diagram for describing the image display apparatus according to Example 16, in which: FIG. 16(a) is a horizontal sectional view (YZ-section) showing optical systems for two eyes; and FIG. 16(b) is a horizontal sectional view showing only the optical system for the right eye. Regarding the following Examples 17 to 28, horizontal sectional views of optical systems for two eyes, which are similar to FIG. 16(a), are shown in FIGS. 17 to 27.

In any of the examples, the optical systems have configurations that are symmetric with respect to the plane of symmetry between the two eyes as in the case of the above-described Examples 1 to 15. Therefore, only constituent parameters in the backward ray tracing of the optical system for the right eye as shown in FIG. 16(b) will be shown later. Regarding the constituent parameters in the backward ray tracing in Examples 16 to 28 (described later), as shown in FIG. 16(b), an axial principal ray (optical axis) O is defined by a light ray passing through the center of the exit pupil 4R of the optical system at right angles thereto and reaching the center of the image display device 3. In the backward ray tracing, the center of the pupil 4R is defined as the origin of decentered optical surfaces of a decentered optical system. A Z-axis is taken in the direction of the axial principal ray O, and the direction in which the Z-axis extends from the pupil 4R toward the final surface of the optical system (the first surface in the backward ray tracing: entrance surface; in FIG. 16(b), the fourth surface 24R) is defined as a positive direction of the Z-axis. A plane containing the Z-axis and the center of the image display device 3 is defined as a YZ-plane. An axis extending through the origin at right angles to the YZ-plane is defined as an X-axis, and the direction in which the X-axis extends from the obverse side toward the reverse side of the plane of the figure is defined as a positive direction of the X-axis. An axis that constitutes a right-handed orthogonal coordinate system in combination with the X- and Z-axes is defined as a Y-axis. In FIG. 16(b), this coordinate system is shown. Illustration of the coordinate system is omitted in FIGS. 17 to 27, which show Examples 17 to 28.

In Examples 16 to 30, decentration of each surface is made in the YZ-plane, and the one and only plane of symmetry of each rotationally asymmetric free-form surface is the YZ-plane.

Regarding decentered surfaces, each surface is given displacements in the X-, Y- and Z-axis directions (X, Y and Z, respectively) of the vertex position of the surface from the origin of the above-described coordinate system, and tilt angles (degrees) of the center axis of the surface [the Z-axis of the above equation (a) in regard to free-form surfaces; the Z-axis of the following equation (d) in the case of aspherical surfaces] with respect to the X-, Y- and Z-axes ($\alpha$, $\beta$ and $\gamma$, respectively). In this case, the positive $\alpha$ and $\beta$ mean counterclockwise rotation relative to the positive directions of the corresponding axes, and the positive $\gamma$ means clockwise rotation relative to the positive direction of the Z-axis.

Among optical functional surfaces constituting the optical system in each example, a specific surface and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

Aspherical surfaces are rotationally symmetric aspherical surfaces given by the following equation:

$$Z=(Y^2/R)/[1+\{+1-(1+K)Y^2/R^2\}^{1/2}]+AY^4+BY^6+CY^8+DY^{10}+\ldots \quad (d)$$

In the above equation, Z is an optical axis (axial principal ray) for which the direction of travel of light is defined as a positive direction, and Y is taken in a direction perpendicular to the optical axis. R is a paraxial curvature radius, K is a conic constant, and A, B, C, D . . . are 4th-, 6th-, 8th- and 10th-order aspherical coefficients, respectively. The Z-axis of this defining equation is the axis of the rotationally symmetric aspherical surface.

It should be noted that those terms concerning free-form surfaces and aspherical surfaces for which no data is shown are zero. The refractive index is expressed by the refractive index for the spectral d-line (wavelength: 587.56 nanometers). Lengths are given in millimeters.

In addition, other examples of defining equations for free-form surfaces include Zernike polynomials given by the above equation (b).

Although in the examples of the present invention the surface configuration is expressed by a free-form surface using the above equation (a), it should be noted that the same advantageous effect can be obtained by using the above equation (b) or (c), as a matter of course.

Referring back to FIG. 16(*a*), a major difference between Example 16 and Example 4 is in the optical path distributing prism 10. The optical path distributing prism 10 at the middle between the two eyes has a symmetric configuration with respect to the plane of symmetry between the two eyes. The optical path distributing prism 10 has five surfaces: a first surface 11 as a transmitting surface located on the side of the image display device 3 remote from the observer; a third surface 14R as a transmitting surface for the right optical path and a third surface 14L as a transmitting surface for the left optical path, which are located at both sides of the first surface 11 on the side remote from the observer; and a second surface 12R as a reflecting surface for the right optical path and a second surface 12L as a reflecting surface for the left optical path, which are located on the sides of the fourth surfaces 14R and 14L remote from the observer. The fourth surface 14R as a transmitting surface for the right optical path and the fourth surface 14L as a transmitting surface for the left optical path are identical with the third surface 13L as a reflecting surface for the left optical path and the third surface 13R as a reflecting surface for the right optical path, respectively. The identical surfaces each serve as both a transmitting surface and a totally reflecting surface. The first surface 11 has a symmetric configuration with respect to the plane of symmetry between the two eyes. The fourth surfaces 14R and 14L and the second surfaces 12R and 12L have configurations that are symmetric with respect to the plane of symmetry between the two eyes. The image display device 3 is placed to face the first surface 11 of the optical path distributing prism 10 on the observer side of the optical path distributing prism 10.

In the above-described arrangement, the left and right optical paths are symmetric with respect to the plane of symmetry between the two eyes. Therefore, the optical path for the right eye will be described representatively. Display light from a single image display device 3 common to the two eyes is, first, incident on the first surface 11 of the optical path distributing prism 10. The incident light is incident on the second surface 12R as a reflecting surface for the right optical path and reflected by the second surface 12R. Then, the reflected light is incident on the third surface 13R as a reflecting surface for the right optical path, which serves also as the transmitting surface 14L for the left optical path, and reflected by the third surface 13R. The reflected light passes through the transmitting surface 14R for the right optical path and enters the decentered prism member 2R. The incident light passes through the first surface 21R to enter the prism. The light is incident on the second surface 22R at an incident angle not less than the critical angle and thus totally reflected by the second surface 22R. The reflected light is incident on the third surface 23R and back-reflected thereby so as to be incident on the fourth surface 24R at an incident angle less than the critical angle. The incident light is refracted by the fourth surface 24R to exit from the decentered prism member 2R. Then, the light is led to the exit pupil 4R for the right eye to project an enlarged image of the image display device 3 into the observer's right eye. In this case, an intermediate image is formed once in the optical path from the image display device 3 to the exit pupil 4R. The optical path for the left eye is in symmetric relation to the optical path for the right eye with respect to the plane of symmetry between the two eyes as in the case of the arrangement of the optical system for the right eye.

Figure 17:
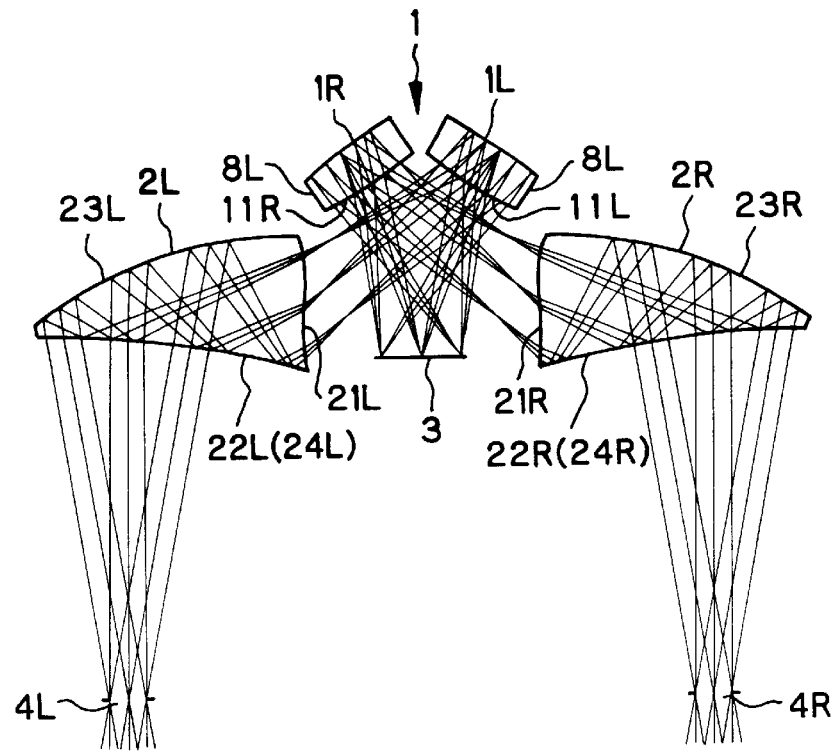
FIG. 17 is a horizontal sectional view showing optical systems for two eyes of an image display apparatus according to Example 17 of the present invention.

Example 17 shown in FIG. 17 is similar to Example 1 in FIG. 1 but different from Example 1 in the arrangement of the optical path distributing mirror 1 at the middle between the two eyes. In the case of this example, a reflecting surface 1R for the right optical path and a reflecting surface 1L for the left optical path, which have symmetric configurations with respect to the plane of symmetry between the two eyes, are formed from back-coated mirrors produced by coating the back surfaces of lenses 8R and 8L. The rest of Example 17 is the same as that in Example 1.

In the above-described arrangement, the left and right optical paths are symmetric with respect to the plane of symmetry between the two eyes. Therefore, the optical path for the right eye will be described representatively. Display light from a single image display device 3 common to the two eyes, first, enters the lens 8R for the right optical path, which constitutes the optical path distributing mirror 1, through the entrance surface 11L. The light is reflected by the reflecting surface 1R to exit from the entrance surface 11L and enters the decentered prism member 2R. The incident light passes through the first surface 21R to enter the prism. The light is incident on the second surface 22R at an incident angle not less than the critical angle and thus totally reflected by the second surface 22R. The reflected light is incident on the third surface 23R and back-reflected thereby so as to be incident on the fourth surface 24R at an incident angle less than the critical angle. The incident light is refracted by the fourth surface 24R to exit from the decentered prism member 2R. Then, the light is led to the exit pupil 4R for the right eye to project an enlarged image of the image display device 3 into the observer's right eye. It should be noted that no intermediate image is formed in the optical path from the image display device 3 to the exit pupil 4R. The optical path for the left eye is in symmetric relation to the optical path for the right eye with respect to the plane of symmetry between the two eyes as in the case of the arrangement of the optical system for the right eye.

Figure 18:
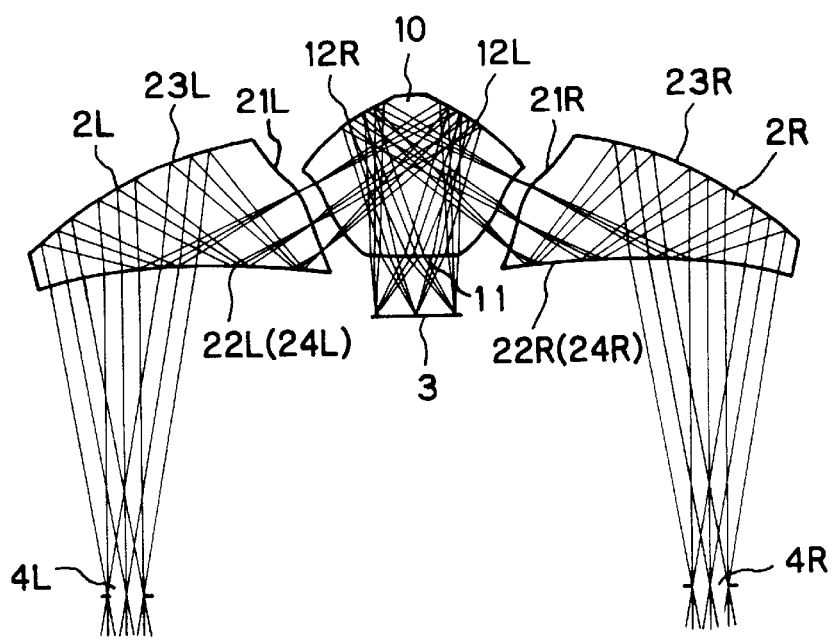
FIG. 18 is a horizontal sectional view showing optical systems for two eyes of an image display apparatus according to Example 18 of the present invention.

Example 18 shown in FIG. 18 is similar to Example 4 in FIG. 4.

Figure 19:
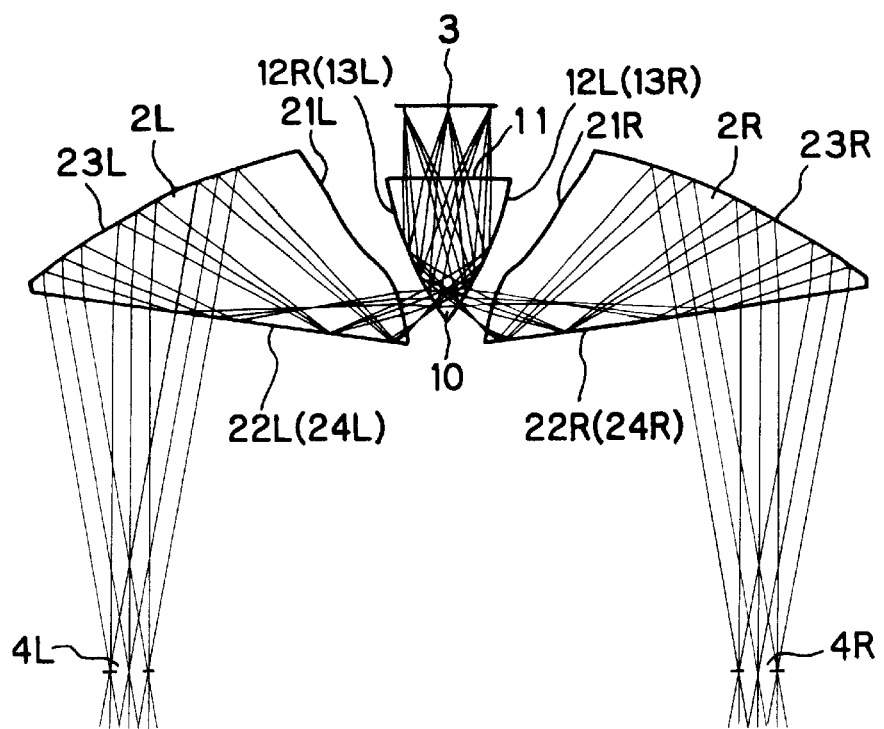
FIG. 19 is a horizontal sectional view showing optical systems for two eyes of an image display apparatus according to Example 19 of the present invention.

Example 19 shown in FIG. 19 is similar to Example 5 in FIG. 5.

Figure 20:
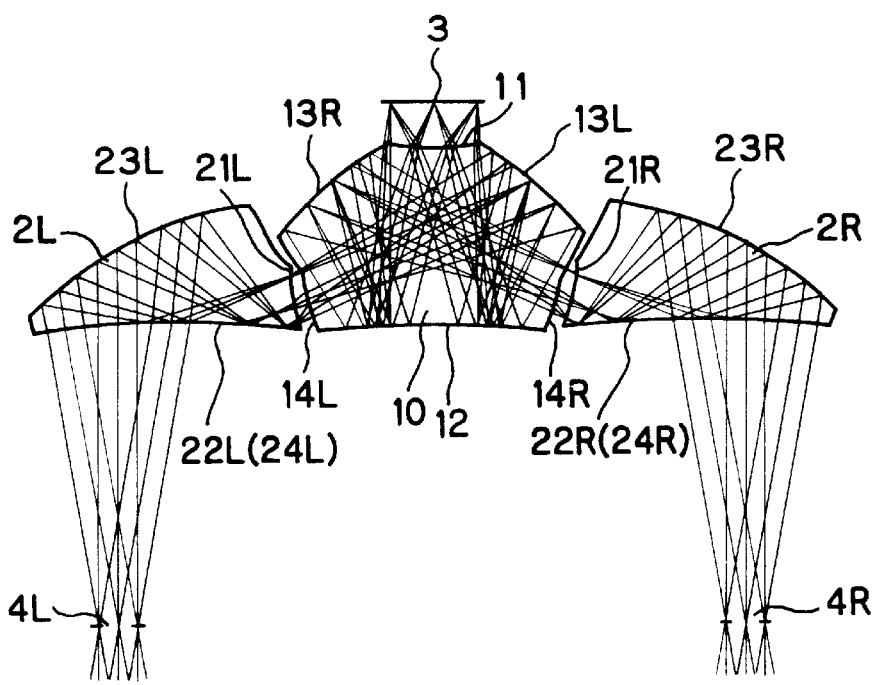
FIG. 20 is a horizontal sectional view showing optical systems for two eyes of an image display apparatus according to Example 20 of the present invention.

Example 20 shown in FIG. 20 is similar to Example 6 in FIG. 6.

Figure 21:
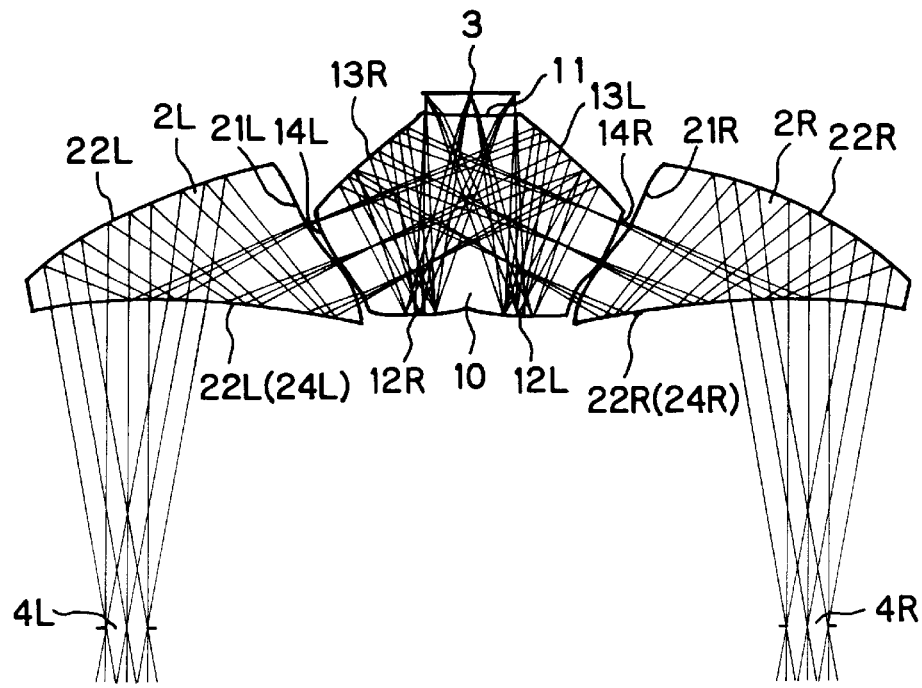
FIG. 21 is a horizontal sectional view showing optical systems for two eyes of an image display apparatus according to Example 21 of the present invention.

FIG. 21 shows Example 21. A major difference between Example 21 and Example 6 is in the optical path distributing prism 10. The optical path distributing prism 10 at the middle between the two eyes has a symmetric configuration with respect to the plane of symmetry between the two eyes. The optical path distributing prism 10 has seven surfaces: a first surface 11 as a transmitting surface located on the observer side of the image display device 3; a second surface 12R as a reflecting surface for the right optical path and a second surface 12L as a reflecting surface for the left optical path, which are reflecting surfaces facing the first surface 11 and also facing the observer; a third surface 13R as a reflecting surface for the right optical path and a third surface 13L as a reflecting surface for the left optical path, which are disposed at both sides of the first surface 11 on the observer side thereof; and a fourth surface 14L as a transmitting surface for the left optical path and a fourth surface 14R as a transmitting surface for the right optical path, which are disposed on both sides between the third surfaces 13R and 13L and the second surfaces 12R and 12L, respectively. The first surface 11 has a symmetric configuration with respect to the plane of symmetry between the two eyes. The second surfaces 12R and 12L, the third surfaces 13R and 13L and the fourth surfaces 14R and 14L have configurations that are symmetric with respect to the plane of symmetry between the two eyes. The image display device 3 is placed to face the first surface 11 of the optical path distributing prism 10 on the side of the optical path distributing prism 10 remote from the observer.

In the above-described arrangement, the left and right optical paths are symmetric with respect to the plane of symmetry between the two eyes. Therefore, the optical path for the right eye will be described representatively. Display light from a single image display device 3 common to the two eyes is, first, incident on the first surface 11 of the optical path distributing prism 10. The incident light is incident on the second surface 12R as a reflecting surface for the right optical path and reflected by the second surface 12R. Then, the reflected light is incident on the third surface 13R and reflected thereby. The reflected light passes through the transmitting surface 14R for the right optical path and enters the decentered prism member 2R. The incident light passes through the first surface 21R to enter the prism. The light is incident on the second surface 22R at an incident angle not less than the critical angle and thus totally reflected by the second surface 22R. The reflected light is incident on the third surface 23R and back-reflected thereby so as to be incident on the fourth surface 24R at an incident angle less than the critical angle. The incident light is refracted by the fourth surface 24R to exit from the decentered prism member 2R. Then, the light is led to the exit pupil 4R for the right eye to project an enlarged image of the image display device 3 into the observer's right eye. In this case, an intermediate image is formed once in the optical path from the image display device 3 to the exit pupil 4R. The optical path for the left eye is in symmetric relation to the optical path for the right eye with respect to the plane of symmetry between the two eyes as in the case of the arrangement of the optical system for the right eye.

Figure 22:
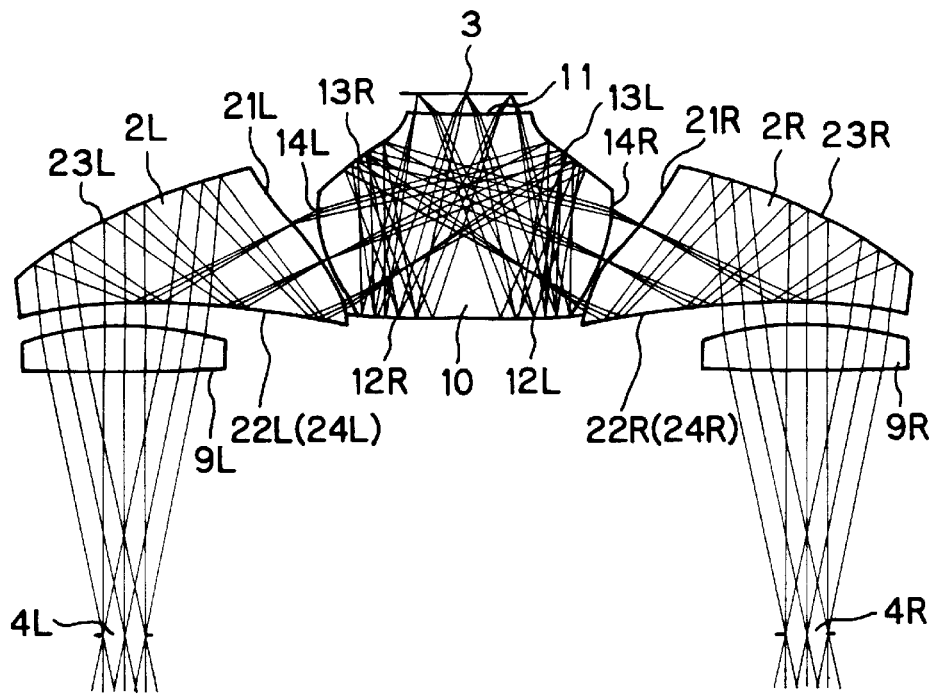
FIG. 22 is a horizontal sectional view showing optical systems for two eyes of an image display apparatus according to Example 22 of the present invention.

Example 22 shown in FIG. 22 is similar to Example 21 in FIG. 21 but different from Example 21 in that ocular lenses 9R and 9L are placed between the exit surfaces 24R and 24L of the decentered prism members 2R and 2L for the right and left eyes, which constitute ocular optical systems, and the exit pupils 4R and 4L for the right and left eyes, respectively.

Figure 23:
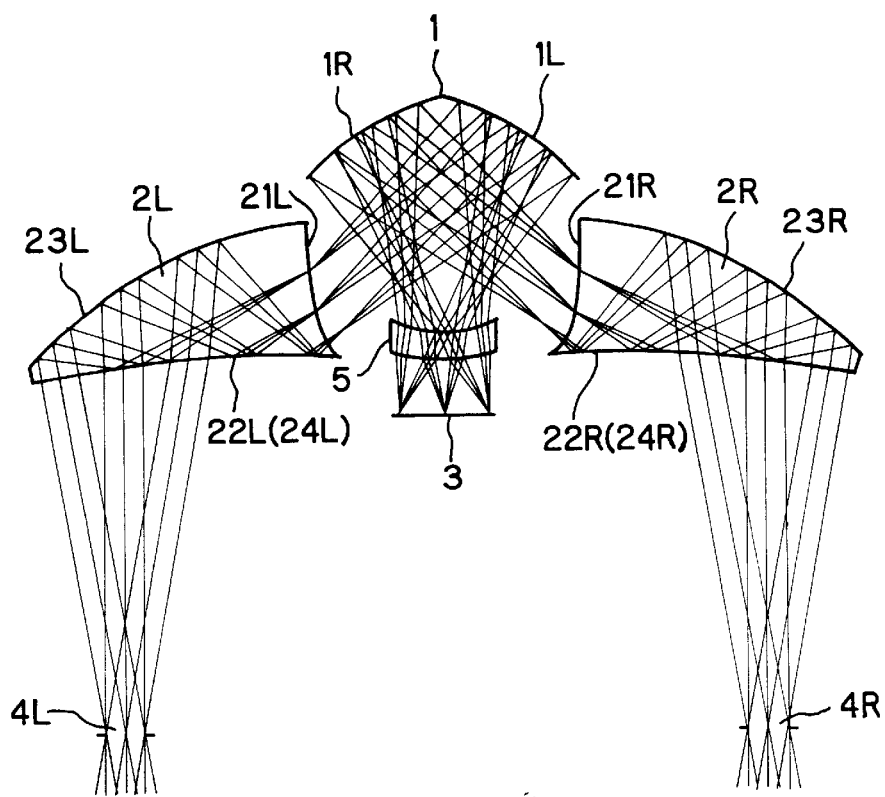
FIG. 23 is a horizontal sectional view showing optical systems for two eyes of an image display apparatus according to Example 23 of the present invention.

Example 23 shown in FIG. 23 is similar to Example 2 in FIG. 2.

Figure 24:
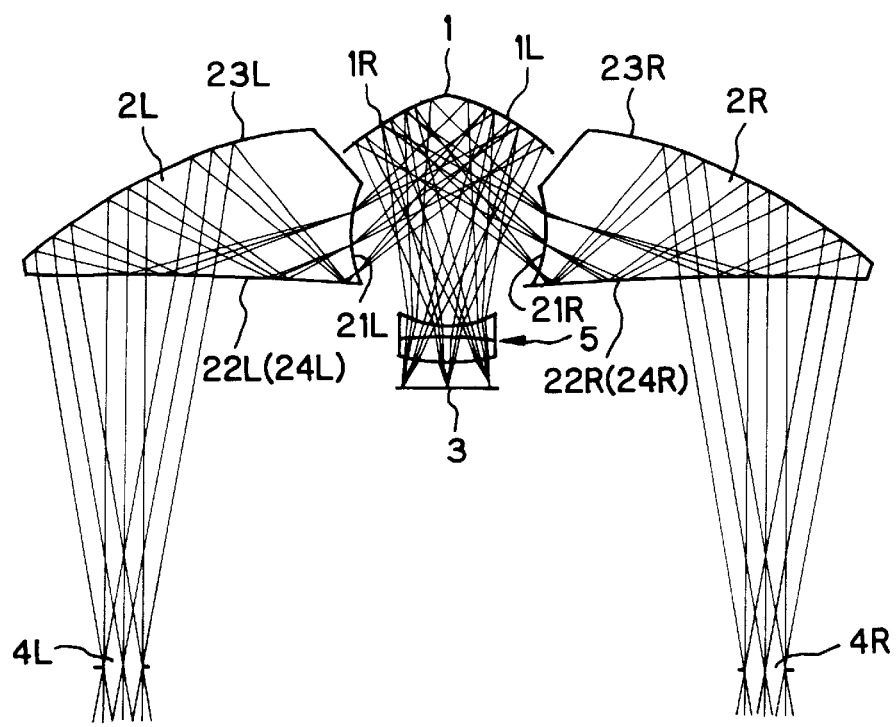
FIG. 24 is a horizontal sectional view showing optical systems for two eyes of an image display apparatus according to Example 24 of the present invention.

Example 24 shown in FIG. 24 is similar to Example 2 in FIG. 2 but different therefrom in that the negative lens 5 is formed from a cemented lens.

Figure 25:
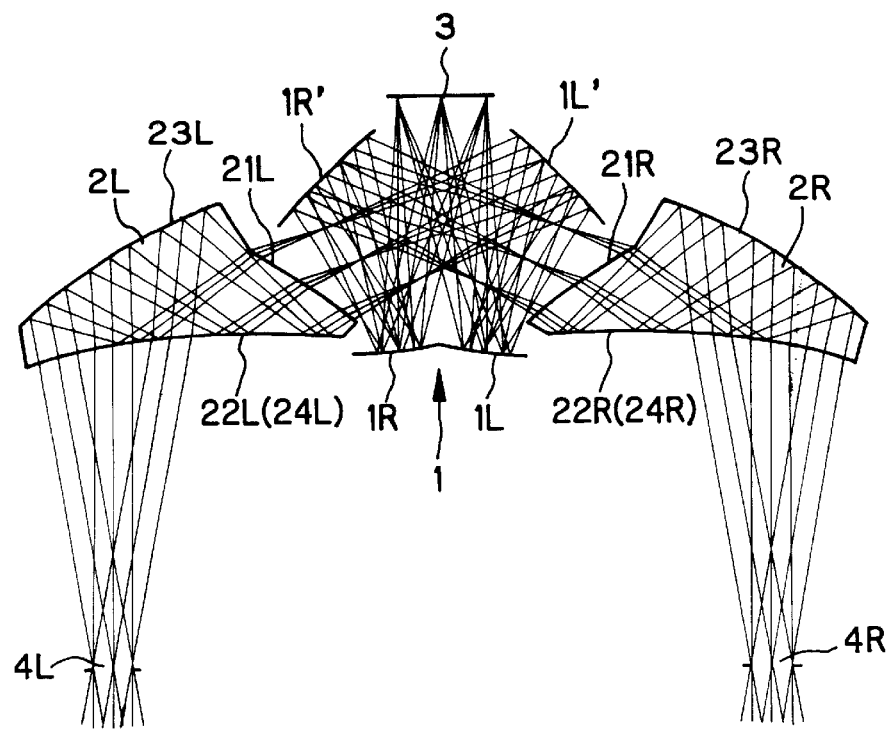
FIG. 25 is a horizontal sectional view showing optical systems for two eyes of an image display apparatus according to Example 25 of the present invention.

FIG. 25 shows Example 25. A major difference between Example 25 and Example 1 is as follows. The optical path distributing mirror 1 at the middle between the two eyes has four reflecting surfaces, i.e. a reflecting surface 1R for the right optical path and a reflecting surface 1L for the left optical path, which have symmetric configurations with respect to the plane of symmetry between the two eyes, and a second reflecting surface 1R' for the right optical path and a second reflecting surface 1L' for the left optical path, which face the reflecting surfaces 1R and 1L, respectively. The second reflecting surfaces 1R' and 1L' have configurations that are symmetric with respect to the plane of symmetry between the two eyes. Moreover, the image display device 3 is placed on the side of the optical path distributing mirror 1 remote from the observer.

In the above-described arrangement, the left and right optical paths are symmetric with respect to the plane of symmetry between the two eyes. Therefore, the optical path for the right eye will be described representatively. Display light from a single image display device 3 common to the two eyes is, first, incident on the reflecting surface 1R for the right optical path, which constitutes the optical path distributing mirror 1, and reflected by the reflecting surface 1R. Then, the light is incident on the second reflecting surface 1R' for the right optical path and reflected thereby so as to enter the decentered prism member 2R. The incident light passes through the first surface 21R to enter the prism. The light is incident on the second surface 22R at an incident angle not less than the critical angle and thus totally reflected by the second surface 22R. The reflected light is incident on the third surface 23R and back-reflected thereby so as to be incident on the fourth surface 24R at an incident angle less than the critical angle. The incident light is refracted by the fourth surface 24R to exit from the decentered prism member 2R. Then, the light is led to the exit pupil 4R for the right eye to project an enlarged image of the image display device 3 into the observer's right eye. In this case, an intermediate image is formed once in the optical path from the image display device 3 to the exit pupil 4R. The optical path for the left eye is in symmetric relation to the optical path for the right eye with respect to the plane of symmetry between the two eyes as in the case of the arrangement of the optical system for the right eye.

Figure 26:
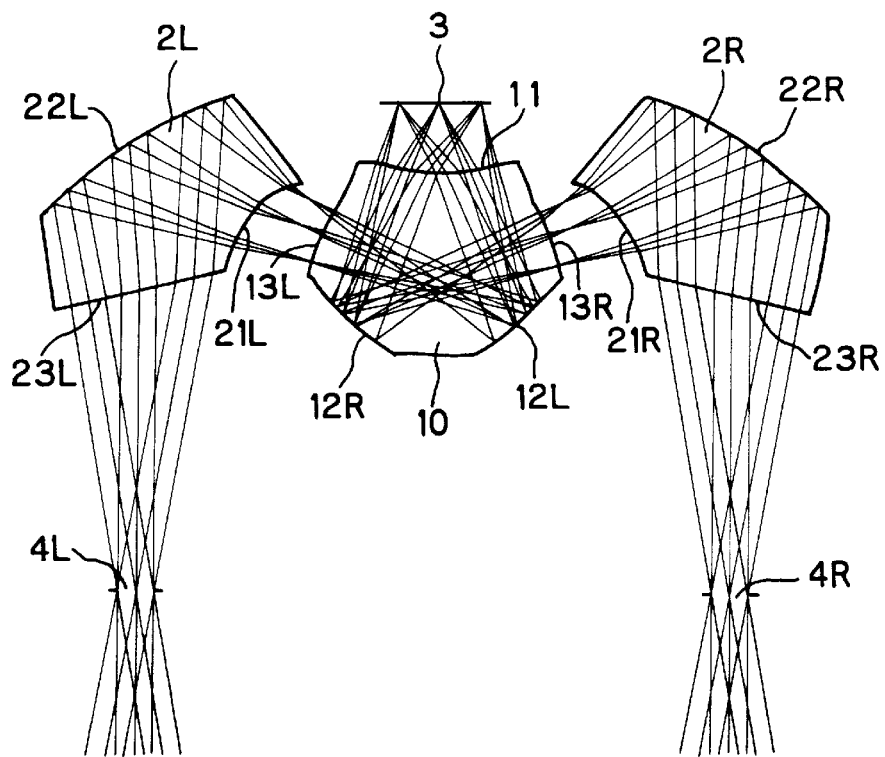
FIG. 26 is a horizontal sectional view showing optical systems for two eyes of an image display apparatus according to Example 26 of the present invention.

Example 26 shown in FIG. 26 is similar to Example 11 in FIG. 11.

Figure 27:
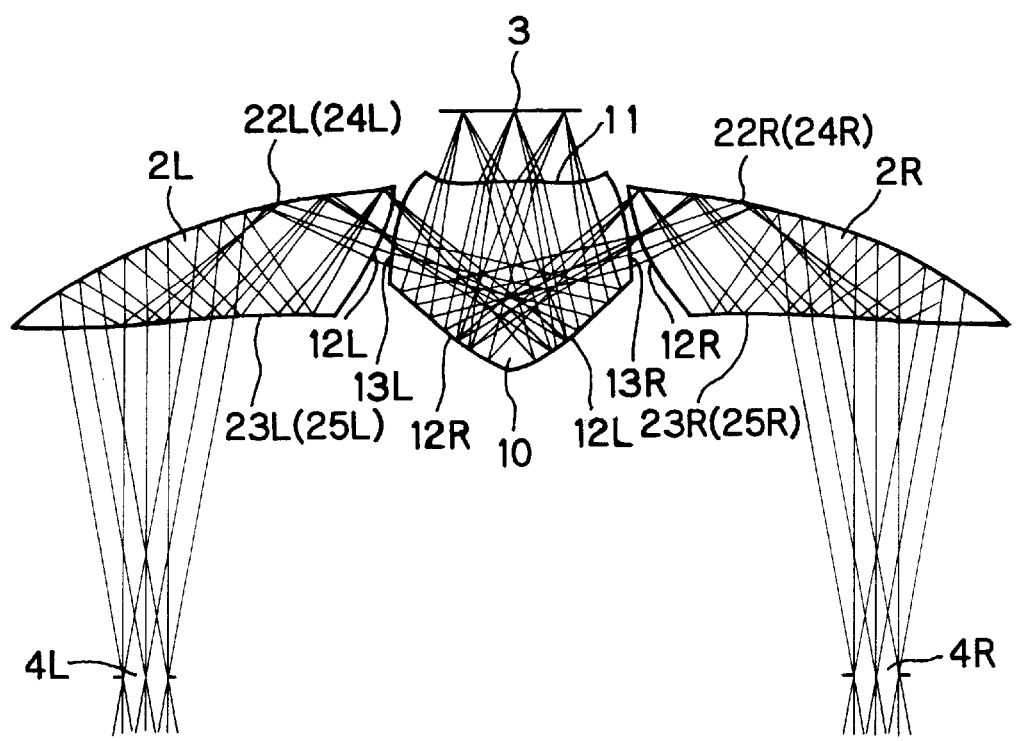
FIG. 27 is a horizontal sectional view showing optical systems for two eyes of an image display apparatus according to Example 27 of the present invention.

Example 27 shown in FIG. 27 is similar to Example 7 in FIG. 7. However, the second surfaces 22L and 22R and the fourth surfaces 24L and 24R of the decentered prism members 2L and 2R constituting the ocular optical systems for the right and left eyes are formed from the identical reflecting surfaces, respectively.

Figure 28:
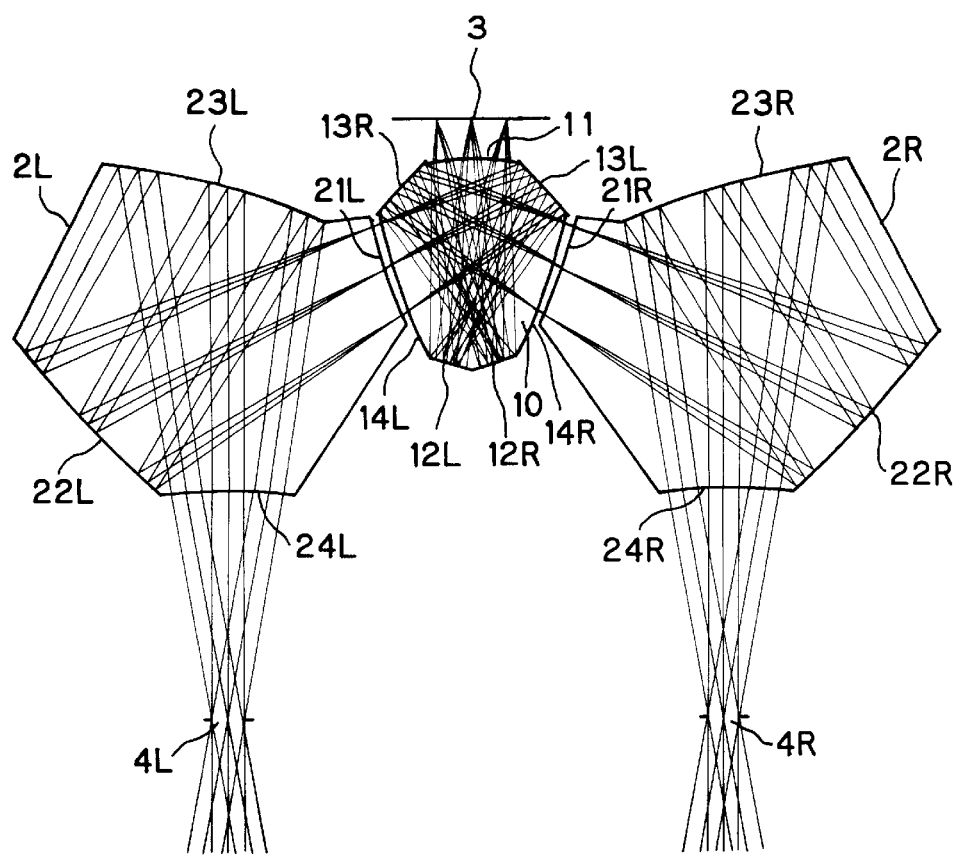
FIG. 28 is a horizontal sectional view showing optical systems for two eyes of an image display apparatus according to Example 28 of the present invention.

Example 28 shown in FIG. 28 is similar to Example 12 in FIG. 12.

Figure 29:
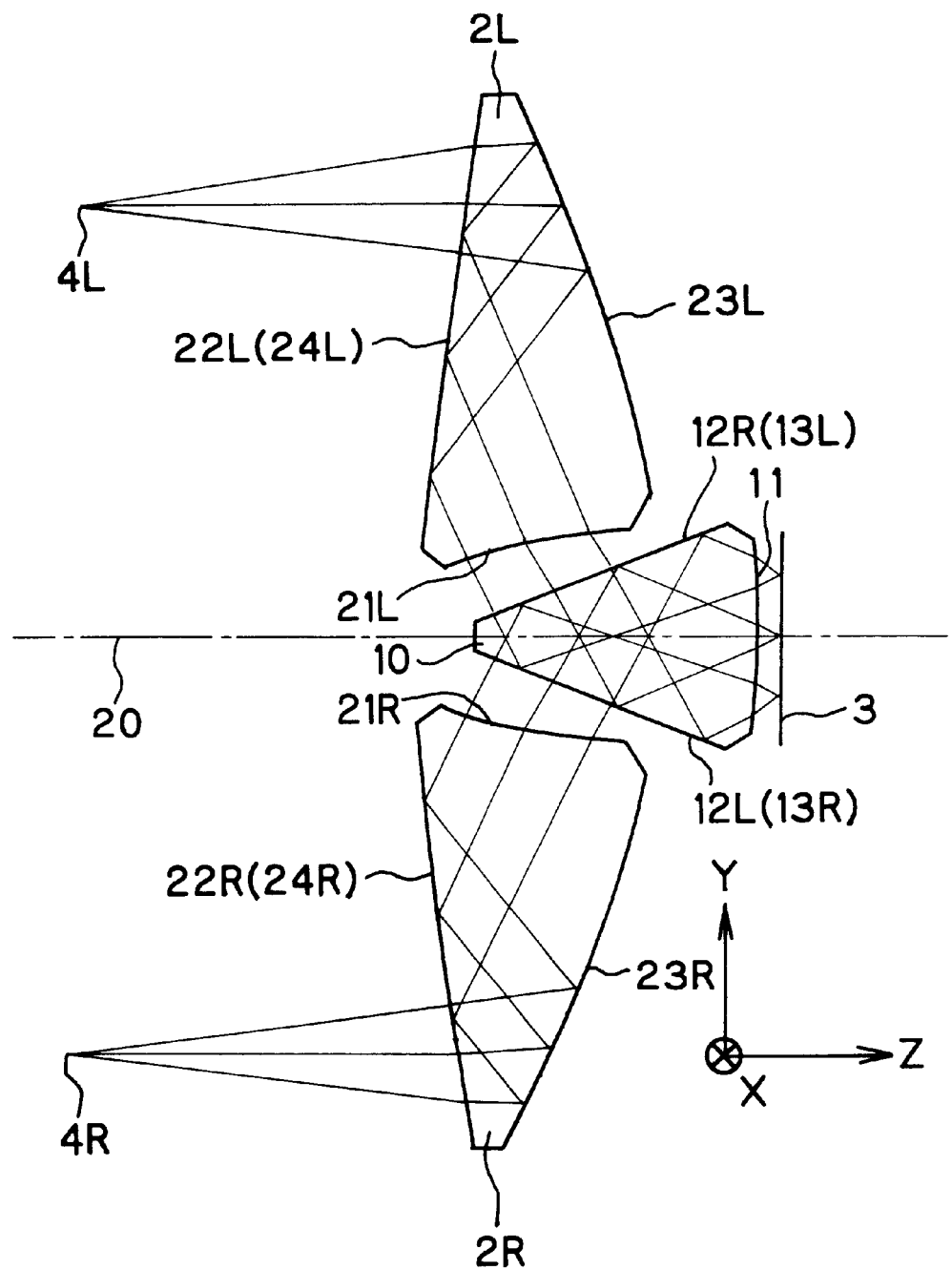
FIG. 29 is a ray path diagram of image display apparatus according to Examples 29 and 30 of the present invention.

FIG. 29 is a ray path diagram showing image display apparatus according to Examples 29 and 30 of the present invention. In FIG. 29, an image display device constituting the image display device is denoted by reference numeral 3. An exit pupil for the right eye is denoted by 4R, and an exit pupil for the left eye is denoted by 4L. A decentered prism member placed in front of the right eye as an optical system for the right eye is denoted by 2R, and a decentered prism member placed in front of the left eye as an optical system for the left eye is denoted by 2L. In addition, an optical path distributing prism formed from a decentered prism member, which is placed at the middle between the two eyes, is denoted by 10. The decentered prism members 2R, 2L and 10 are made of a transparent medium having a refractive index larger than 1. In the following description, surfaces stated to be reflecting surfaces are mirror surfaces formed by providing mirror coatings on the relevant surfaces of the decentered prism members except totally reflecting surfaces.

Examples 29 and 30 are arranged as shown in FIG. 29, which shows a horizontal section (YZ-section) thereof. First, the arrangement will be described in regard to the optical path for the right eye. The triangular prism-shaped optical path distributing prism 10 at the middle between the two eyes has a symmetric configuration with respect to a plane 20 of symmetry between the two eyes (i.e. a plane passing through the center of a line segment connecting the respective centers of the exit pupil 4R for the right eye and the exit pupil 4L for the left eye at right angles to the line segment). The optical path distributing prism 10 has three surfaces: a first surface 11 as a transmitting surface located on the observer side of the image display device 3; a second surface 12R as a reflecting surface for the right optical path and a second surface 12L as a reflecting surface for the left optical path, which are located at both sides of the first surface 11 on the observer side thereof to function as totally reflecting surfaces; a transmitting surface 13L for the left optical path that is the identical with the second surface 12R as a reflecting surface for the right optical path; and a transmitting surface 13R for the right optical path that is the identical with the second surface 12L as a reflecting surface for the left optical path. The first surface 11 has a symmetric configuration with respect to the plane 20 of symmetry between the two eyes. The second surfaces 12R (13L) and 12L (13R) have configurations that are symmetric with respect to the plane 20 of symmetry between the two eyes. The image display device 3 is placed to face the first surface 11 of the optical path distributing prism 10 on the side of the optical path distributing prism 10 remote from the observer.

The decentered prism member 2R, which constitutes an optical system for the right eye, and the decentered prism member 2L, which constitutes an optical system for the left eye, have the same configuration and are placed in symmetry with respect to the plane 20 of symmetry between the two eyes. The decentered prism member 2R and the decentered prism member 2L each have, in order in which rays pass, a first surface 21R (21L), a second surface 22R (22L), a third surface 23R (23L), and a fourth surface 24R (24L). The second surface 22R (22L) and the fourth surface 24R (24L) are the identical surface. The identical surface serves as both a totally reflecting surface and a transmitting surface.

In the above-described arrangement, the left and right optical paths are symmetric with respect to the plane 20 of symmetry between the two eyes. Therefore, the optical path for the right eye will be described representatively. Display light from a single image display device 3 common to the two eyes is, first, incident on the first surface 11 of the optical path distributing prism 10. The light is incident on the second surface 12R as a reflecting surface for the right optical path and totally reflected by the second surface 12R. The reflected light passes through the transmitting surface 13R (12L) for the right optical path and enters the decentered prism member 2R. The incident light passes through the first surface 21R to enter the prism and is incident on the second surface 22R at an incident angle not less than the critical angle, thereby being totally reflected by the second surface 22R. The reflected light is incident on the third surface 23R and back-reflected thereby so as to be incident on the fourth surface 24R at an incident angle less than the critical angle. The incident light is refracted by the fourth surface 24R to exit from the decentered prism member 2R. Then, the light is led to the exit pupil 4R for the right eye to project an enlarged image of the image display device 3 into the observer's right eye. In this case, an intermediate image is formed once in the optical path from the image display device 3 to the exit pupil 4R. The optical path for the left eye is in symmetric relation to the optical path for the right eye with respect to the plane 20 of symmetry between the two eyes as in the case of the arrangement of the optical system for the right eye.

With the above-described arrangement, in both the left and right optical paths, display light from the image display device 3 is led to the eyeball after undergoing three reflections. Therefore, images led to the left and right eyes are not in mirror-image relation to each other. Accordingly, it is possible to see images of the same orientation with the left and right eyes. Moreover, because the image of the image display device 3 is projected via reflecting and transmitting surfaces which are decentered or tilted with respect to the optical axis and at least one of which has a positive power, it is possible to project an image favorably corrected for various aberrations, e.g. curvature of field and chromatic aberration.

Further, in both the left and right optical paths, the greater part of the optical path passes through the decentered prism members 10 and 2R (2L), which are filled with a transparent medium having a refractive index larger than 1, and the optical path is folded therein. Therefore, the whole ocular optical system can be made compact.

Furthermore, the decentered prism members 2R and 2L are placed at positions that are in plane symmetry with each other and have the same configuration. It is only necessary to prepare two decentered prism members 2R and 2L having the same configuration and to place them at respective positions that are in plane symmetry with respect to the decentered prism member 10 at the middle between the two eyes.

It is premised that an image display device 3 having wide viewing angle characteristics is used in the above-described optical system. Therefore, it is desirable to use a spontaneous light-emission type organic EL (see FIG. 40) for the image display device 3. When a transmission type LCD (liquid crystal display device) is used, it is desirable to insert a DOE (diffractive optical element) between the LCD and the backlight to thereby illuminate the LCD with ±1st-order light, or to use an LCD with viewing angle characteristics widened by using such scattering film that the viewing angle is increased (the same is the case with Examples 1 to 30).

Figure 30:
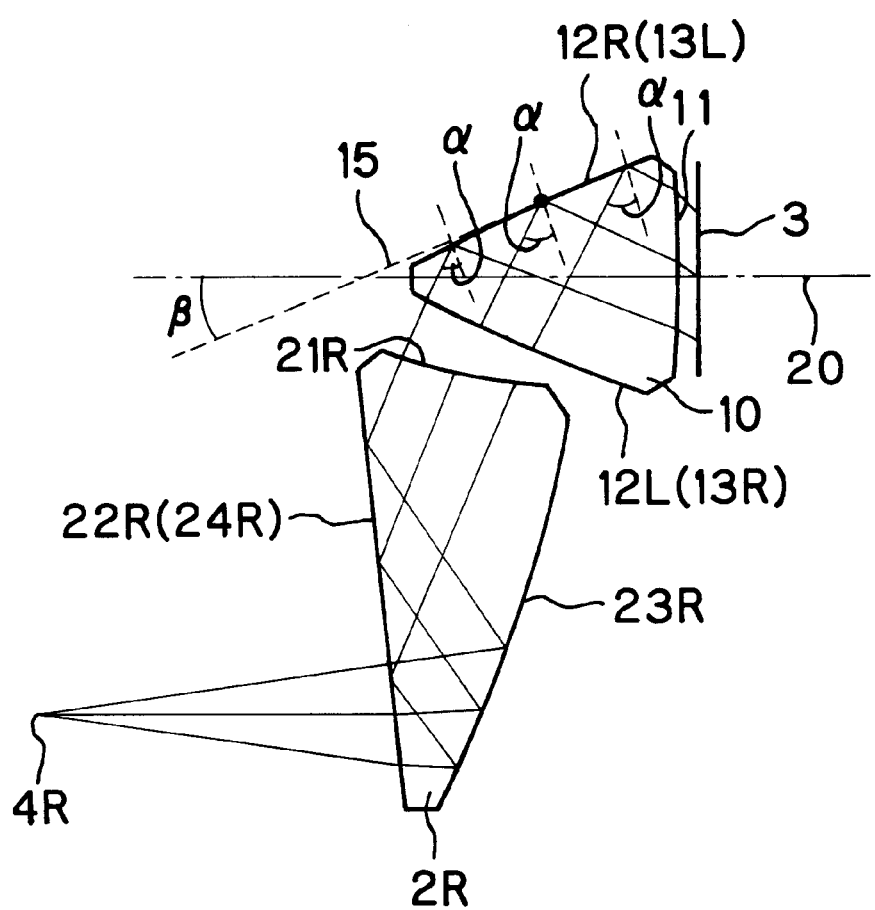
FIG. 30 is a diagram for describing the definition of parameters $\alpha$ and $\beta$.

Incidentally, it is desirable that the angle α of reflection of display light at the second surfaces 12R and 12L of the optical path distributing prism 10 for distributing the display image of the image display device 3 to the optical path for the right eye and the optical path for the left eye, as shown in FIG. 30 (only the optical path for the right eye is shown in FIG. 30, for the sake of simplicity, because the optical path for the right eye and the optical path for the left eye are in plane-symmetric relation to each other in the image display apparatus according to the present invention), satisfy the following condition:

$$33° \leq \alpha \leq 70° \quad (1)$$

If α is smaller than the lower limit of this condition, i.e. 33°, rays are not reflected by the second surfaces 12R and 12L but pass therethrough, thus failing to form an image. If α exceeds the upper limit, i.e. 70°, it is difficult for rays to travel along the above-described optical paths in the arrangement of this optical system. Consequently, the rays fail to form an image.

If is more desirable to satisfy the following condition:

$$40° \leq \alpha \leq 60° \quad (1\text{-}1)$$

The meaning of the upper and lower limits of this condition is the same as that of the above-described condition (1).

Next, it is desirable that the angle β formed between a plane 20 passing through the center of a line segment connecting the center of the exit pupil 4R for the right eye and the center of the exit pupil 4L for the left eye at right angles to the line segment (the plane of symmetry between the two eyes) and a tangent plane 15 to the second surface 12R of the optical path distributing prism 10 at a point where the optical axis of the optical path for the right eye is incident on the second surface 12R and the angle β formed between the plane 20 and a tangent plane to the second surface 12L of the optical path distributing prism 10 at a point where the optical axis of the optical path for the left eye is incident on the second surface 12L satisfy the following condition:

$$13° \leq \beta \leq 24° \quad (2)$$

If β is smaller than the lower limit of this condition, i.e. 13°, some of the reflected rays do not pass through the third surface 13R but are undesirably reflected thereby, or rays are not reflected by the second surface 22R of the decentered prism member 2R but pass therethrough, undesirably. Consequently, it is difficult for rays to travel along the above-described optical paths, and the rays fail to form an image. If β exceeds the upper limit, i.e. 24°, some rays are not reflected by the second surface 12R but pass therethrough, undesirably. Consequently, it is difficult for rays to travel along the above-described optical paths, and the rays fail to form an image.

If is more desirable to satisfy the following condition:

$$15° \leq \beta \leq 22° \quad (2\text{-}1)$$

The meaning of the upper and lower limits of this condition is the same as that of the above-described condition (2).

If is even more desirable to satisfy the following condition:

$$17° \leq \beta \leq 20° \quad (2\text{-}2)$$

The meaning of the upper and lower limits of this condition is the same as that of the above-described condition (2).

Figure 31:
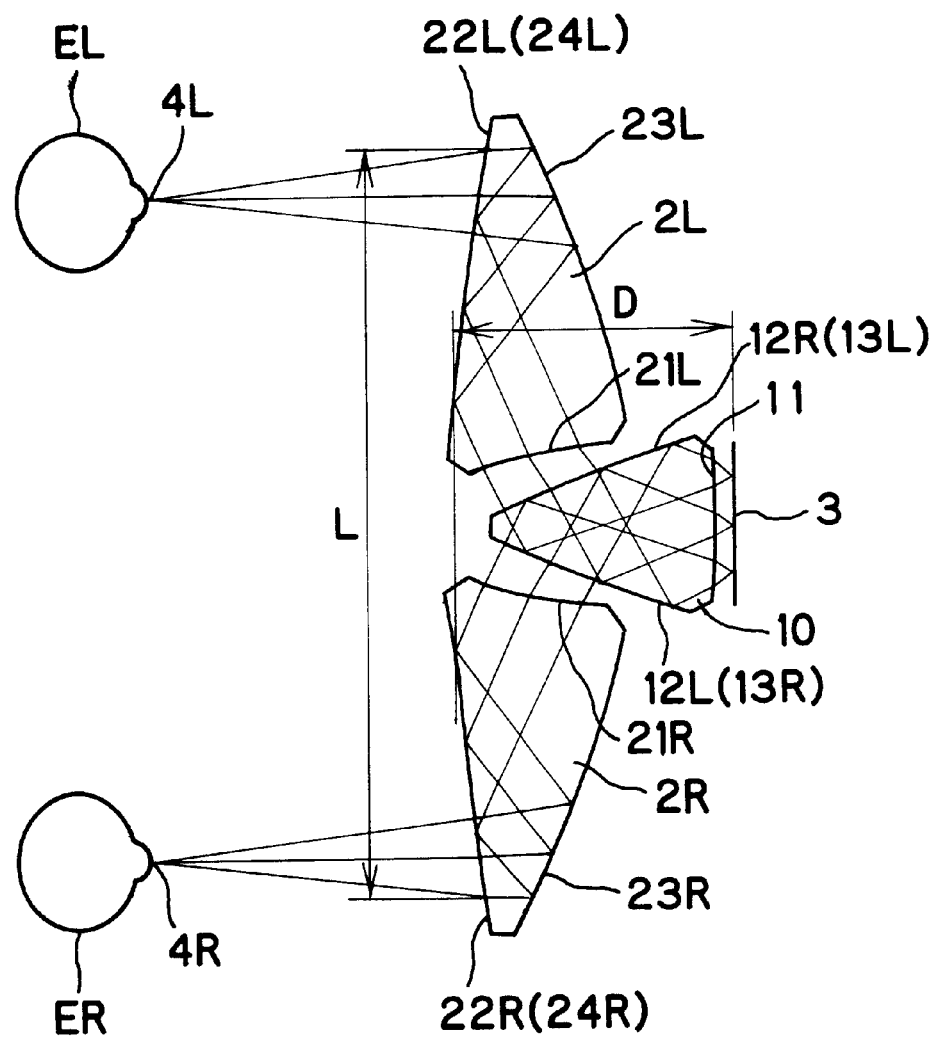
FIG. 31 is a diagram for describing the definition of parameters L and D.

Next, let us assume that, in backward ray tracing from the pupil side, the distance between the intersection of the ray passing through the center of the exit pupil 4R for the right eye at the maximum field angle on the right-hand side and the fourth surface 24R of the decentered prism member 2R for the right eye and the intersection of the ray passing through the center of the exit pupil 4L for the left eye at the maximum field angle on the left-hand side and the fourth surface 24L of the decentered prism member 2L for the left eye is a width L, as shown in FIG. 31, and the distance between the point closest to the left and right exit pupils among points at which bundles of rays passing through the centers of the left and right exit pupils within the overall field angle pass through or are reflected by the fourth surface 24R of the decentered prism member 2R for the right eye ER or the fourth surface 24L of the decentered prism member 2L for the left eye EL and the display surface of the image display device 3 in a direction perpendicular to the display surface is a depth D. In this case, it is desirable that the ratio of the depth D to the width L, i.e. D/L, satisfy the following condition:

$$0.3 \leq D/L \leq 0.5 \quad (3)$$

If D/L is smaller than the lower limit, i.e. 0.3, a wide field angle cannot be obtained. Consequently, the image field becomes unfavorably small in size. If D/L exceeds the upper limit, i.e. 0.5, the depth assumes a large value, and the optical system becomes unfavorably large in size.

It is more desirable to satisfy the following condition:

$$0.35 \leq D/L \leq 0.45 \quad (3\text{-}1)$$

The meaning of the upper and lower limits of this condition is the same as that of the above-described condition (3).

Figure 32:
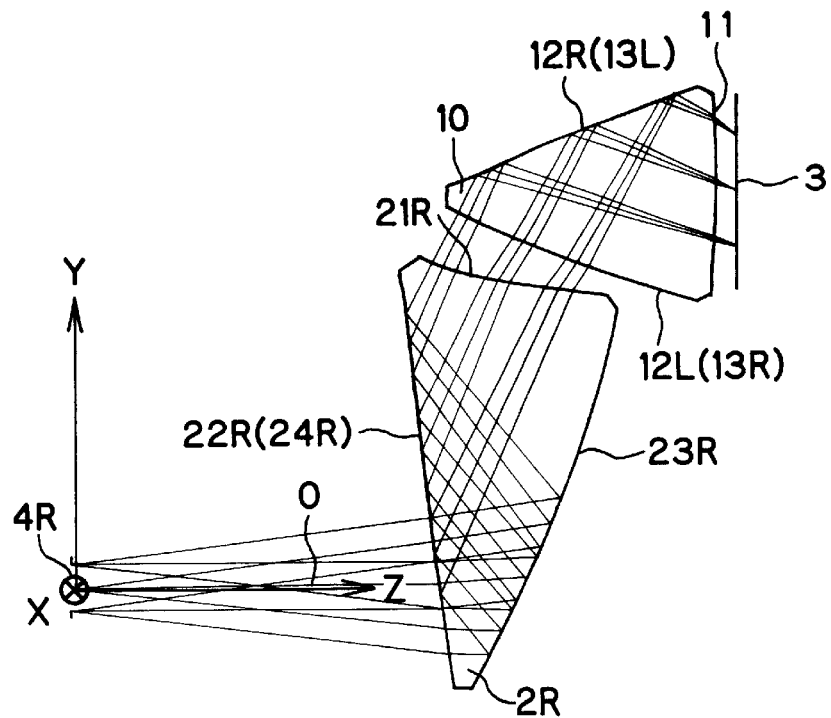
FIG. 32 is a horizontal sectional view of an optical system for a right eye according to Example 29.
Figure 33:
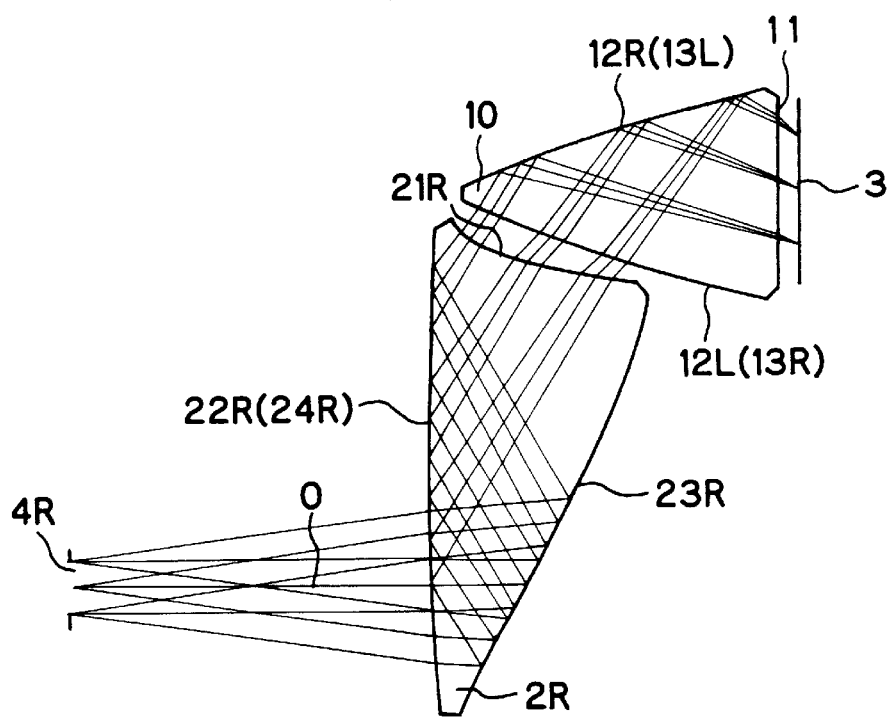
FIG. 33 is a horizontal sectional view of an optical system for a right eye according to Example 30.
Figure 34:
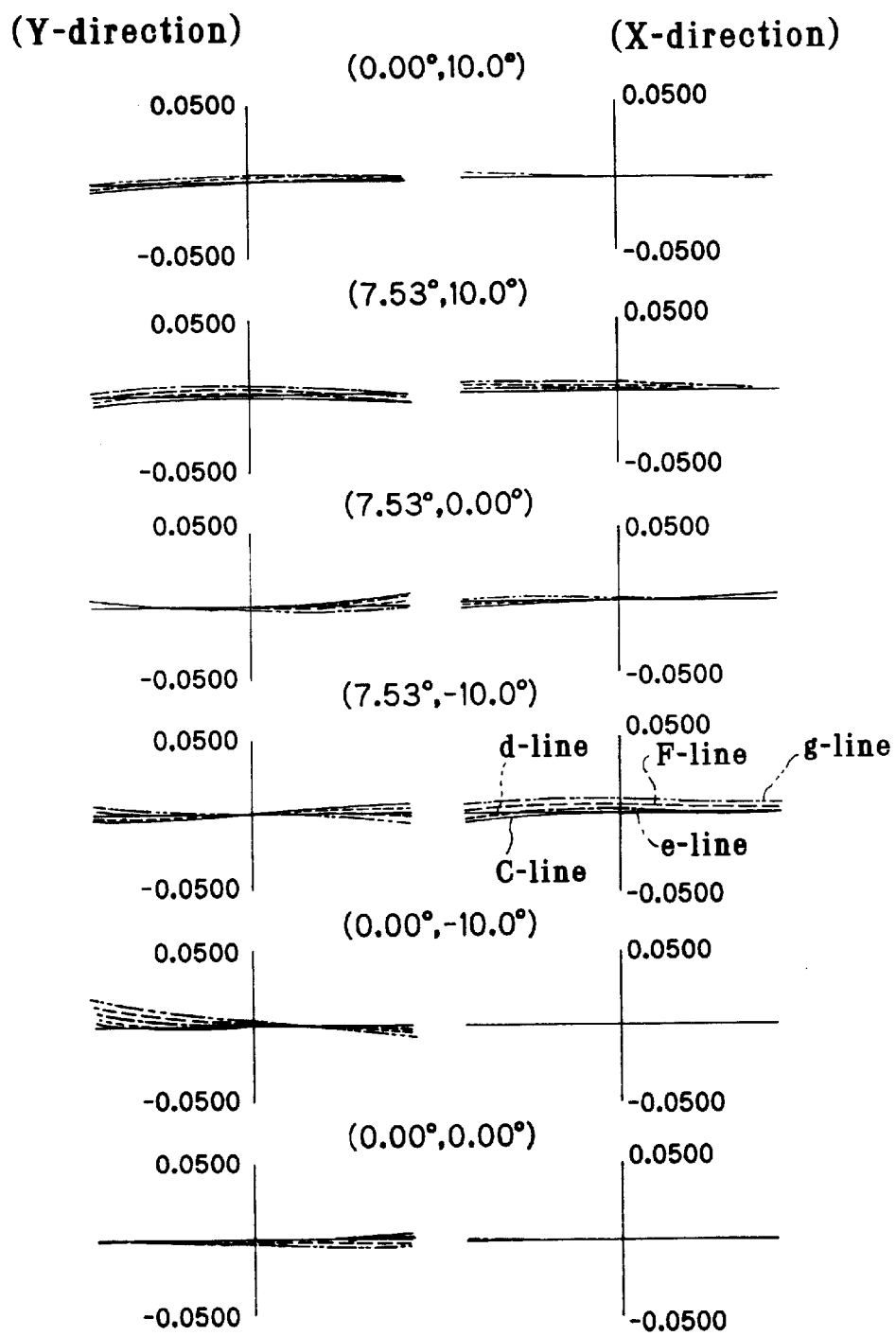
FIG. 34 is an aberrational diagram showing lateral aberrations in the optical system of Example 16.
Figure 35:
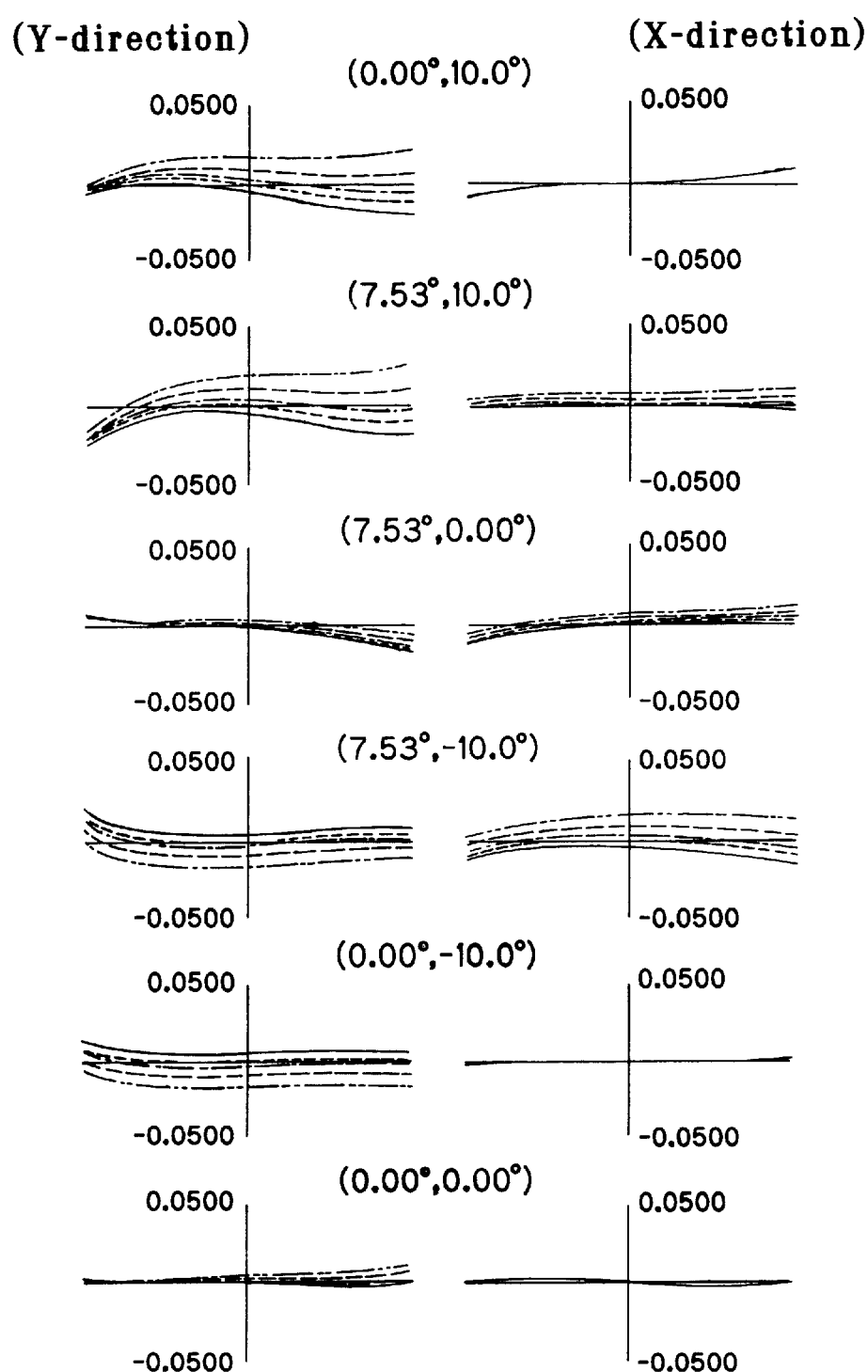
FIG. 35 is an aberrational diagram showing lateral aberrations in the optical system of Example 20.
Figure 36:
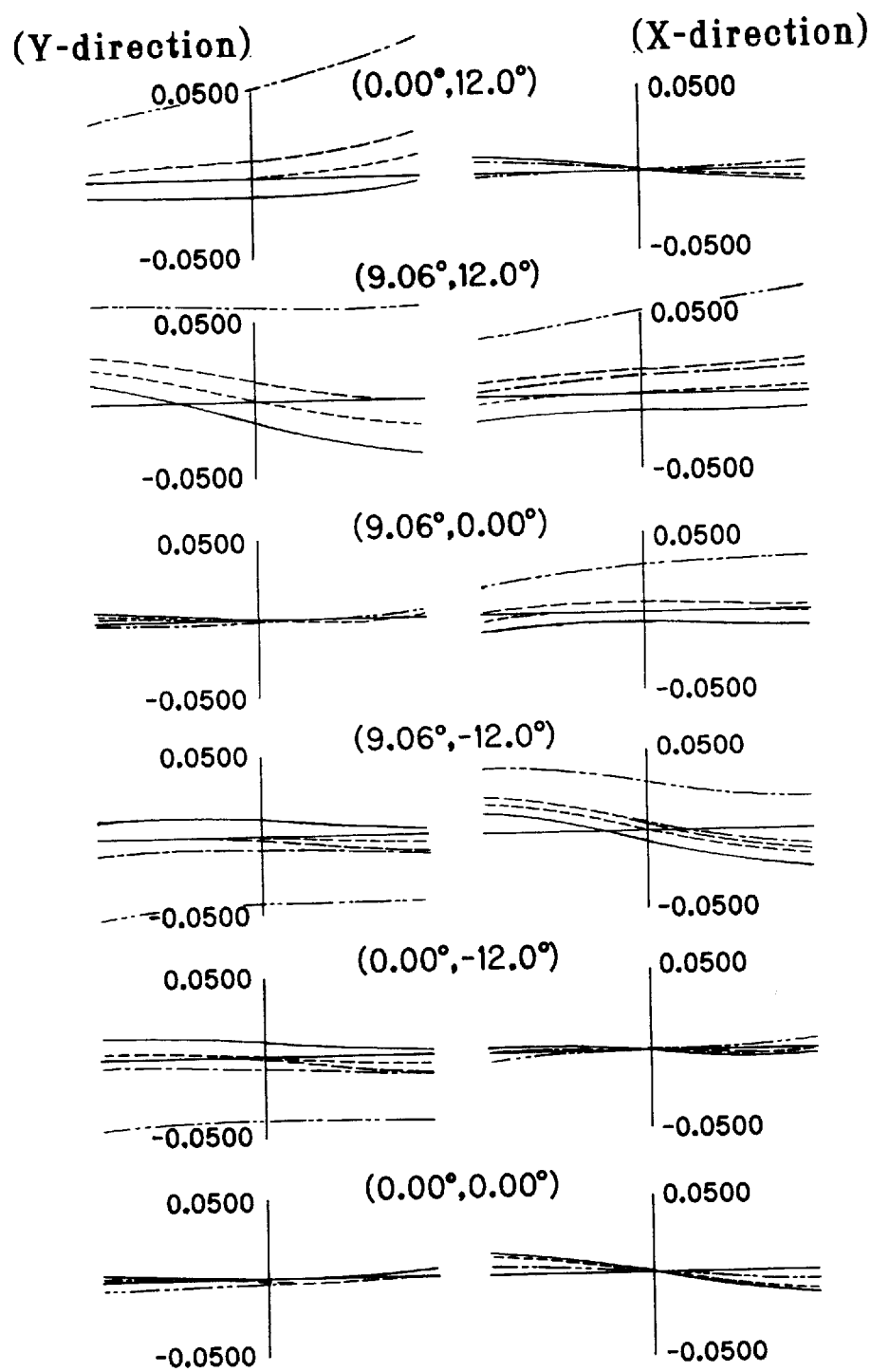
FIG. 36 is an aberrational diagram showing lateral aberrations in the optical system of Example 22.
Figure 37:
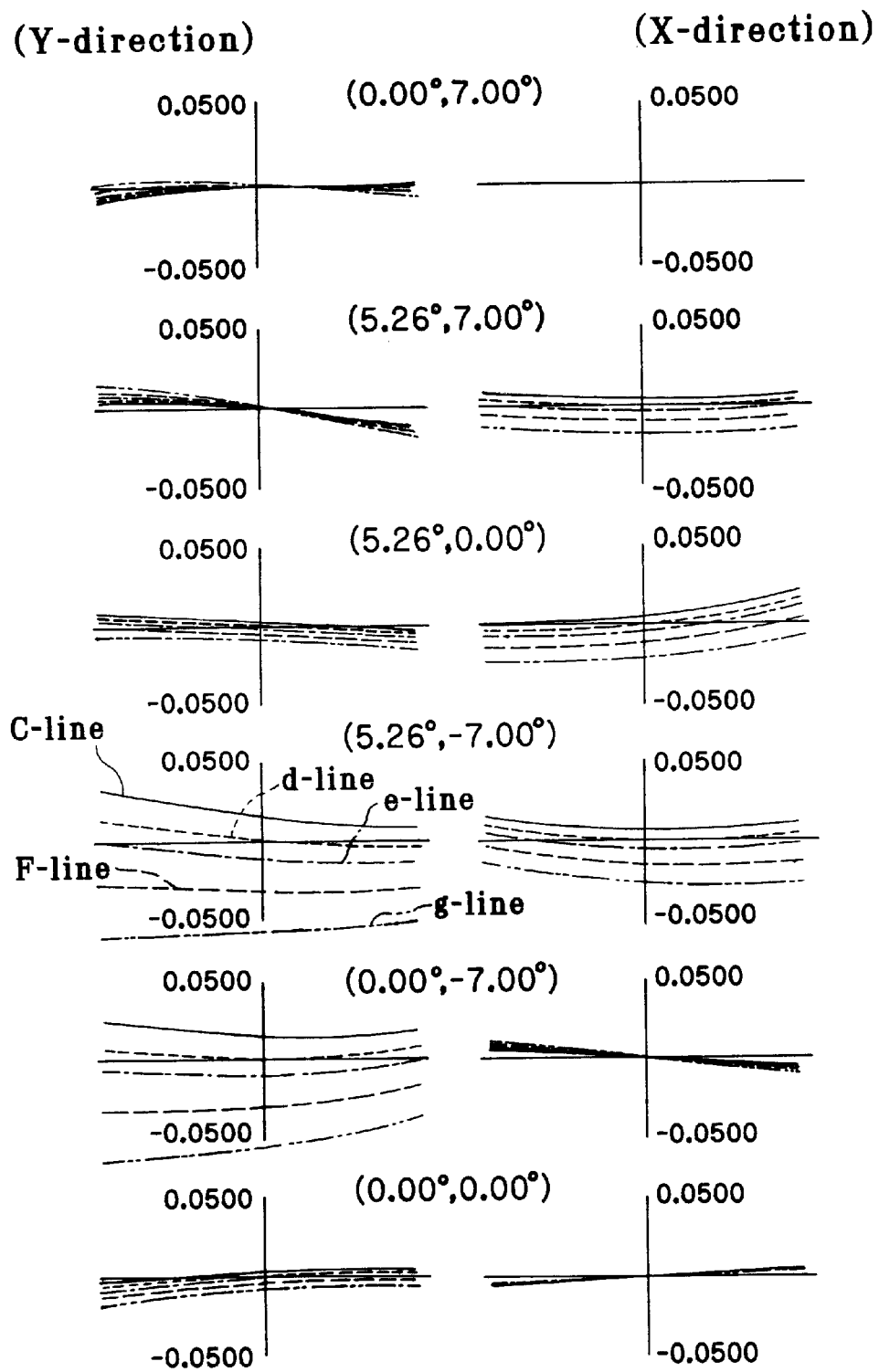
FIG. 37 is an aberrational diagram showing lateral aberrations in the optical system of Example 29.
Figure 38:
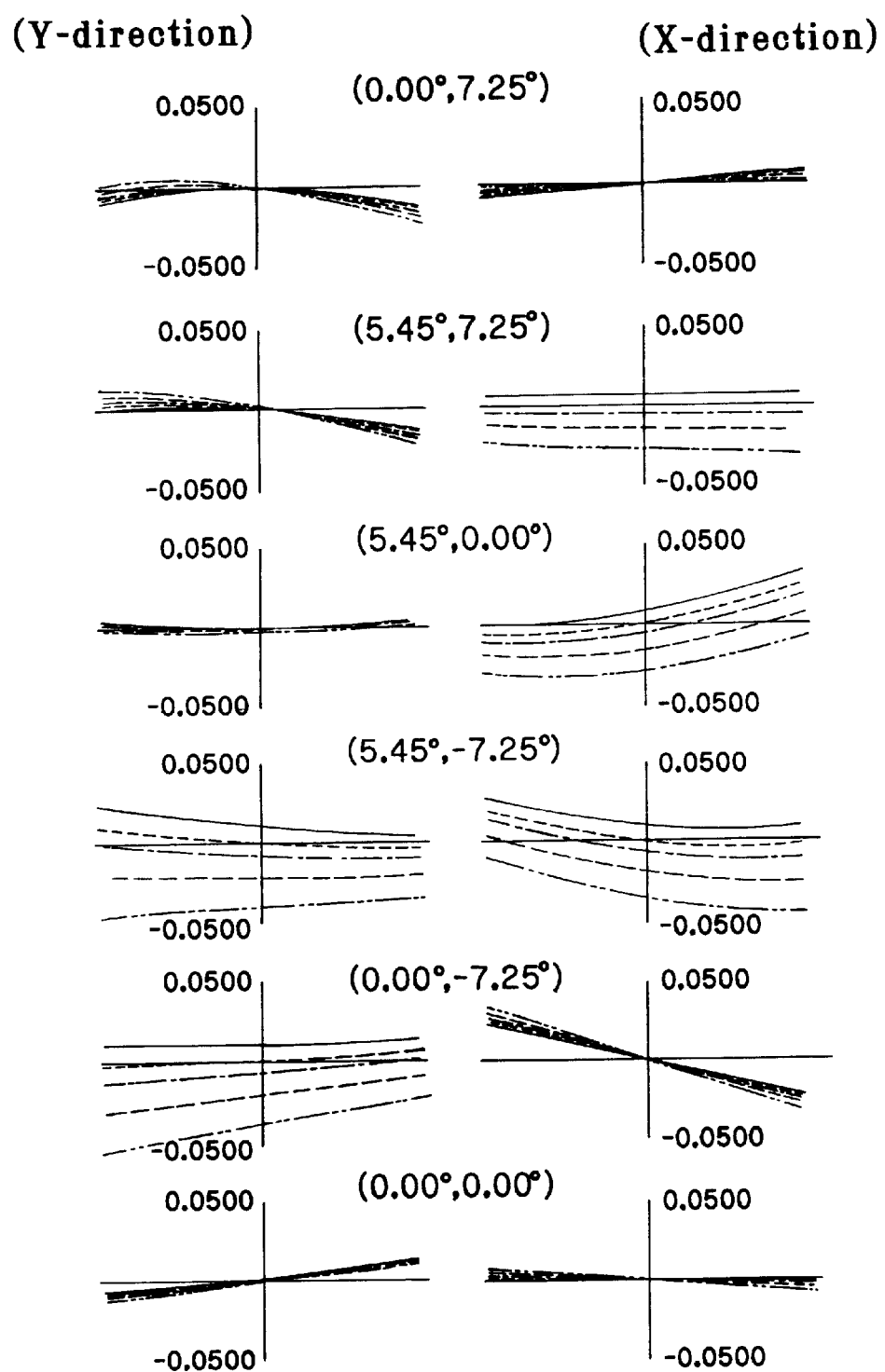
FIG. 38 is an aberrational diagram showing lateral aberrations in the optical system of Example 30.

Regarding Examples 29 and 30, horizontal sectional views illustrating only optical systems for the right eye in these examples are shown in FIGS. 32 and 33 because the optical system and optical path for the right eye and the optical system and optical path for the left eye are in plane-symmetric relation to each other as stated above. Regarding the optical system for the left eye, it is only necessary to place the surfaces of the optical system for the left eye in symmetric relation to the optical system for the right eye with respect to the plane 20 of symmetry between the two eyes (FIG. 29).

Constituent parameters in the backward ray tracing of the optical systems for the right eye in the above-described Examples 16 to 30 will be shown below. The observation field angles in these examples when arranged in the form of a viewing optical system are as follows: in Examples 16 to 21 and 23 to 28, the horizontal half field angle is 10°, and the vertical half field angle is 7.5°; in Example 22, the horizontal half field angle is 12°, and the vertical half field angle is 9.1°; in Example 29, the horizontal half field angle is 7°, and the vertical half field angle is 5.26°; and in Example 30, the horizontal half field angle is 7.5°, and the vertical half field angle is 5.64°. In Examples 16 to 28, the size of the image display device is 8.9×6.7 mm. In Example 29, the image display device size is 8.94×6.71 mm. In Example 30, the image display device size is 8.94×6.71 mm. In all Examples 16 to 30, the pupil diameter is 4 mm. It should be noted that when arranged in the form of a viewing optical system, Example 29 is equivalent to an optical system with a focal length of 36 mm, and Example 30 is equivalent to an optical system with a focal length of 34 mm.

It should be noted that in the tables below, "FFS" denotes a free-form surface, and "ASS" denotes an aspherical surface, and further "RE" denotes a reflecting surface.

Example 16

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | | | | |
| 2 | ASS① | | (1) | 1.5254 | 56.2 |
| 3 | FFS① (RE) | | (2) | 1.5254 | 56.2 |
| 4 | ASS① (RE) | | (1) | 1.5254 | 56.2 |
| 5 | FFS② | | (3) | | |
| 6 | FFS③ | | (4) | 1.5254 | 56.2 |
| 7 | FFS④ (RE) | | (5) | 1.5254 | 56.2 |
| 8 | FFS⑤ (RE) | | (6) | 1.5254 | 56.2 |
| 9 | ∞ | | (7) | | |
| Image plane | ∞ | | (8) | | |

ASS①
R   −61.00
K   0.0000
A   −2.8485 × 10$^{-6}$
B   8.9070 × 10$^{-9}$

FFS①
$C_4$ −1.2212 × 10$^{-2}$   $C_6$ −1.2499 × 10$^{-2}$   $C_8$ −7.2115 × 10$^{-6}$
$C_{10}$ 3.6893 × 10$^{-5}$   $C_{11}$ −2.8593 × 10$^{-6}$   $C_{13}$ −3.0073 × 10$^{-6}$
$C_{15}$ −3.4462 × 10$^{-6}$   $C_{17}$ −1.6344 × 10$^{-9}$   $C_{19}$ −4.1364 × 10$^{-8}$
$C_{21}$ −2.0345 × 10$^{-8}$

FFS②
$C_4$ 1.0330 × 10$^{-2}$   $C_6$ −2.2053 × 10$^{-2}$   $C_8$ −8.5243 × 10$^{-5}$
$C_{10}$ −1.3497 × 10$^{-3}$   $C_{11}$ 1.1148 × 10$^{-4}$   $C_{13}$ −2.6040 × 10$^{-4}$
$C_{15}$ 3.9230 × 10$^{-4}$

FFS③
$C_4$ −8.5360 × 10$^{-3}$   $C_6$ −8.8071 × 10$^{-3}$   $C_8$ 7.1801 × 10$^{-5}$
$C_{10}$ 7.6086 × 10$^{-5}$   $C_{11}$ 6.3213 × 10$^{-7}$   $C_{13}$ 8.2333 × 10$^{-6}$
$C_{15}$ 1.9455 × 10$^{-6}$

FFS④
$C_4$ 8.5360 × 10$^{-3}$   $C_6$ 8.8071 × 10$^{-3}$   $C_8$ −7.1801 × 10$^{-5}$
$C_{10}$ −7.6086 × 10$^{-5}$   $C_{11}$ −6.3213 × 10$^{-7}$   $C_{13}$ −8.2333 × 10$^{-6}$
$C_{15}$ −1.9455 × 10$^{-6}$

FFS⑤
$C_4$ 1.2329 × 10$^{-2}$   $C_6$ 6.7124 × 10$^{-3}$   $C_8$ −3.9501 × 10$^{-5}$
$C_{10}$ −1.3809 × 10$^{-4}$   $C_{11}$ −1.6628 × 10$^{-6}$   $C_{13}$ 3.6302 × 10$^{-6}$
$C_{15}$ −3.8832 × 10$^{-6}$

| Displacement and tilt(1) | | | | | |
|---|---|---|---|---|---|
| X | 0.00 | Y | 9.84 | Z | 32.73 |
| α | −0.88 | β | 0.00 | γ | 0.00 |

| Displacement and tilt(2) | | | | | |
|---|---|---|---|---|---|
| X | 0.00 | Y | −0.48 | Z | 39.28 |
| α | −30.61 | β | 0.00 | γ | 0.00 |

| Displacement and tilt(3) | | | | | |
|---|---|---|---|---|---|
| X | 0.00 | Y | 16.17 | Z | 37.03 |
| α | 35.52 | β | 0.00 | γ | 0.00 |

| Displacement and tilt(4) | | | | | |
|---|---|---|---|---|---|
| X | 0.00 | Y | 19.39 | Z | 46.79 |
| α | −91.71 | β | 0.00 | γ | 0.00 |

| Displacement and tilt(5) | | | | | |
|---|---|---|---|---|---|
| X | 0.00 | Y | 44.61 | Z | 46.79 |
| α | −88.29 | β | 0.00 | γ | 0.00 |

| Displacement and tilt(6) | | | | | |
|---|---|---|---|---|---|
| X | 0.00 | Y | 22.62 | Z | 55.56 |
| α | 136.79 | β | 0.00 | γ | 0.00 |

-continued

| Displacement and tilt(7) | | | | | |
|---|---|---|---|---|---|
| X | 0.00 | Y | 32.00 | Z | 33.76 |
| α | −180.00 | β | 0.00 | γ | 0.00 |

| Displacement and tilt(8) | | | | | |
|---|---|---|---|---|---|
| X | 0.00 | Y | 32.00 | Z | 29.64 |
| α | −180.00 | β | 0.00 | γ | 0.00 |

Example 17

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | | | | |
| 2 | ASS① | | (1) | 1.5254 | 56.2 |
| 3 | FFS① (RE) | | (2) | 1.5254 | 56.2 |
| 4 | ASS① (RE) | | (1) | 1.5254 | 56.2 |
| 5 | FFS② | | (3) | | |
| 6 | FFS③ | | (4) | 1.5254 | 56.2 |
| 7 | FFS④ (RE) | | (5) | 1.5254 | 56.2 |
| 8 | FFS③ | | (4) | | |
| Image plane | ∞ | | (6) | | |

ASS①
R   −95.45
K   0.0000
A   −6.5740 × 10$^{-8}$
B   1.3849 × 10$^{-9}$

FFS①
$C_4$ −1.0306 × 10$^{-2}$   $C_6$ −1.0412 × 10$^{-2}$   $C_8$ 2.0096 × 10$^{-5}$
$C_{10}$ 2.8787 × 10$^{-5}$   $C_{11}$ −7.7967 × 10$^{-7}$   $C_{13}$ −2.3996 × 10$^{-6}$
$C_{15}$ −2.6208 × 10$^{-6}$   $C_{17}$ −6.0108 × 10$^{-8}$   $C_{19}$ 1.1907 × 10$^{-8}$
$C_{21}$ 1.4876 × 10$^{-8}$

FFS②
$C_4$ −7.5538 × 10$^{-3}$   $C_6$ 6.2696 × 10$^{-4}$   $C_8$ 1.3858 × 10$^{-3}$
$C_{10}$ 2.0287 × 10$^{-3}$   $C_{11}$ 8.0303 × 10$^{-5}$   $C_{13}$ −1.5350 × 10$^{-4}$
$C_{15}$ −6.5070 × 10$^{-5}$

FFS③
$C_4$ −7.6923 × 10$^{-2}$   $C_6$ −9.3217 × 10$^{-3}$   $C_8$ 3.8760 × 10$^{-3}$
$C_{10}$ −9.4736 × 10$^{-4}$   $C_{11}$ −7.2844 × 10$^{-4}$   $C_{13}$ 6.5675 × 10$^{-4}$
$C_{15}$ −4.9359 × 10$^{-5}$

FFS④
$C_4$ −1.1587 × 10$^{-2}$   $C_6$ 1.1772 × 10$^{-2}$   $C_8$ 1.0849 × 10$^{-3}$
$C_{10}$ −1.8206 × 10$^{-4}$   $C_{11}$ −5.4651 × 10$^{-4}$   $C_{13}$ 1.7195 × 10$^{-4}$
$C_{15}$ −1.3202 × 10$^{-5}$

| Displacement and tilt(1) | | | | | |
|---|---|---|---|---|---|
| X | 0.00 | Y | 9.05 | Z | 39.11 |
| α | 10.70 | β | 0.00 | γ | 0.00 |

| Displacement and tilt(2) | | | | | |
|---|---|---|---|---|---|
| X | 0.00 | Y | 0.24 | Z | 48.07 |
| α | −21.35 | β | 0.00 | γ | 0.00 |

| Displacement and tilt(3) | | | | | |
|---|---|---|---|---|---|
| X | 0.00 | Y | 19.03 | Z | 43.57 |
| α | 92.98 | β | 0.00 | γ | 0.00 |

| Displacement and tilt(4) | | | | | |
|---|---|---|---|---|---|
| X | 0.00 | Y | 35.65 | Z | 58.02 |
| α | −145.94 | β | 0.00 | γ | 0.00 |

| Displacement and tilt(5) | | | | | |
|---|---|---|---|---|---|
| X | 0.00 | Y | 39.28 | Z | 61.80 |
| α | −147.29 | β | 0.00 | γ | 0.00 |

| Displacement and tilt(6) | | | | | |
|---|---|---|---|---|---|
| X | 0.00 | Y | 32.00 | Z | 38.00 |
| α | 0.00 | β | 0.00 | γ | 0.00 |

| | Example 18 | | | | |
|---|---|---|---|---|---|
| Surface No. | Radius of curvature | Surface separation | Displacement and tilt | Refractive index | Abbe's No. |
| Object plane | ∞ | −1000.00 | | | |
| 1 | ∞ (Stop) | | | | |
| 2 | ASS① | | (1) | 1.5254 | 56.2 |
| 3 | FFS① (RE) | | (2) | 1.5254 | 56.2 |
| 4 | ASS① (RE) | | (1) | 1.5254 | 56.2 |
| 5 | FFS② | | (3) | | |
| 6 | FFS③ | | (4) | 1.5254 | 56.2 |
| 7 | FFS④ (RE) | | (5) | 1.5254 | 56.2 |
| 8 | FFS⑤ | | (6) | | |
| Image plane | ∞ | | (7) | | |

ASS①
R    −99.17
K    0.0000
A    −5.1344 × $10^{-6}$
B    5.4560 × $10^{-9}$

FFS①
$C_4$  −1.3402 × $10^{-2}$   $C_6$  −1.1018 × $10^{-2}$   $C_8$   2.9828 × $10^{-6}$
$C_{10}$ −4.6829 × $10^{-6}$  $C_{11}$ −2.4079 × $10^{-6}$  $C_{13}$ −3.1115 × $10^{-6}$
$C_{15}$ −2.2505 × $10^{-6}$  $C_{17}$ 1.0452 × $10^{-7}$   $C_{19}$ 1.1084 × $10^{-7}$
$C_{21}$ 2.6833 × $10^{-8}$

FFS②
$C_4$  −1.9489 × $10^{-2}$   $C_6$  −3.8808 × $10^{-3}$   $C_8$   4.8522 × $10^{-3}$
$C_{10}$ 4.8858 × $10^{-3}$   $C_{11}$ 1.8575 × $10^{-4}$   $C_{13}$ −7.7300 × $10^{-4}$
$C_{15}$ −6.0291 × $10^{-4}$

FFS③
$C_4$  −8.6443 × $10^{-2}$   $C_6$  −3.9460 × $10^{-2}$   $C_8$   8.0248 × $10^{-3}$
$C_{10}$ 9.1640 × $10^{-3}$   $C_{11}$ −6.2318 × $10^{-5}$  $C_{13}$ 1.4493 × $10^{-3}$
$C_{15}$ 1.6706 × $10^{-3}$

FFS④
$C_4$  1.9984 × $10^{-2}$    $C_6$  1.7719 × $10^{-2}$    $C_8$   2.2720 × $10^{-4}$
$C_{10}$ 2.2345 × $10^{-4}$   $C_{11}$ 6.1407 × $10^{-6}$   $C_{13}$ 2.3412 × $10^{-5}$
$C_{15}$ −1.4916 × $10^{-6}$

FFS⑤
$C_4$  −1.0029 × $10^{-2}$   $C_6$  4.6836 × $10^{-3}$

Displacement and tilt(1)
X  0.00    Y  12.74   Z  36.00
α  2.52    β  0.00    γ  0.00

Displacement and tilt(2)
X  0.00    Y  −0.37   Z  45.03
α  −28.87  β  0.00    γ  0.00

Displacement and tilt(3)
X  0.00    Y  20.71   Z  40.51
α  74.60   β  0.00    γ  0.00

Displacement and tilt(4)
X  0.00    Y  22.61   Z  41.95
α  −113.38 β  0.00    γ  0.00

Displacement and tilt(5)
X  0.00    Y  38.54   Z  52.07
α  −144.30 β  0.00    γ  0.00

Displacement and tilt(6)
X  0.00    Y  32.00   Z  36.77
α  0.00    β  0.00    γ  0.00

Displacement and tilt(7)
X  0.00    Y  32.00   Z  30.00
α  0.00    β  0.00    γ  0.00

| | Example 19 | | | | |
|---|---|---|---|---|---|
| Surface No. | Radius of curvature | Surface separation | Displacement and tilt | Refractive index | Abbe's No. |
| Object plane | ∞ | −1000.00 | | | |
| 1 | ∞ (Stop) | | | | |
| 2 | ASS① | | (1) | 1.5254 | 56.2 |
| 3 | FFS① (RE) | | (2) | 1.5254 | 56.2 |
| 4 | ASS① (RE) | | (1) | 1.5254 | 56.2 |
| 5 | FFS② | | (3) | | |
| 6 | FFS③ | | (4) | 1.5254 | 56.2 |
| 7 | FFS④ (RE) | | (5) | 1.5254 | 56.2 |
| 8 | FFS⑤ | | (6) | | |
| Image plane | ∞ | | (7) | | |

ASS①
R    371.46
K    0.0000
A    −8.4688 × $10^{-7}$
B    2.9089 × $10^{-10}$

FFS①
$C_4$  −6.3820 × $10^{-3}$   $C_6$  −8.9287 × $10^{-3}$   $C_8$   −7.5189 × $10^{-5}$
$C_{10}$ −2.7485 × $10^{-6}$  $C_{11}$ −5.1745 × $10^{-6}$  $C_{13}$ −6.0033 × $10^{-7}$
$C_{15}$ 2.8823 × $10^{-6}$   $C_{17}$ 3.2184 × $10^{-7}$   $C_{19}$ 8.6382 × $10^{-8}$
$C_{21}$ −1.5498 × $10^{-8}$

FFS②
$C_4$  −4.0226 × $10^{-2}$   $C_6$  −3.3297 × $10^{-2}$   $C_8$   2.4201 × $10^{-3}$
$C_{10}$ 6.0781 × $10^{-3}$   $C_{11}$ 7.4789 × $10^{-4}$   $C_{13}$ −3.2635 × $10^{-4}$
$C_{15}$ 2.1572 × $10^{-4}$

FFS③
$C_4$  −2.0127 × $10^{-2}$   $C_6$  −1.4009 × $10^{-2}$   $C_8$   −1.3093 × $10^{-3}$
$C_{10}$ −1.0645 × $10^{-4}$  $C_{11}$ −2.3099 × $10^{-4}$  $C_{13}$ −2.8818 × $10^{-5}$
$C_{15}$ −1.4532 × $10^{-6}$

FFS④
$C_4$  2.0127 × $10^{-2}$    $C_6$  1.4009 × $10^{-2}$    $C_8$   1.3093 × $10^{-3}$
$C_{10}$ 1.0645 × $10^{-4}$   $C_{11}$ 2.3099 × $10^{-4}$   $C_{13}$ 2.8818 × $10^{-5}$
$C_{15}$ 1.4532 × $10^{-6}$

FFS⑤
$C_4$  2.3952 × $10^{-1}$    $C_6$  6.3371 × $10^{-4}$

Displacement and tilt(1)
X  0.00    Y  20.12   Z  35.02
α  6.83    β  0.00    γ  0.00

Displacement and tilt(2)
X  0.00    Y  0.52    Z  47.68
α  −27.07  β  0.00    γ  0.00

Displacement and tilt(3)
X  0.00    Y  27.52   Z  37.59
α  76.08   β  0.00    γ  0.00

Displacement and tilt(4)
X  0.00    Y  29.00   Z  40.96
α  −118.18 β  0.00    γ  0.00

Displacement and tilt(5)
X  0.00    Y  35.00   Z  40.96
α  −61.82  β  0.00    γ  0.00

Displacement and tilt(6)
X  0.00    Y  32.00   Z  50.73
α  −180.00 β  0.00    γ  0.00

Displacement and tilt(7)
X  0.00    Y  32.00   Z  58.00
α  −180.00 β  0.00    γ  0.00

Example 20

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | | | | |
| 2 | ASS① | | (1) | 1.5254 | 56.2 |
| 3 | FFS① (RE) | | (2) | 1.5254 | 56.2 |
| 4 | ASS① (RE) | | (1) | 1.5254 | 56.2 |
| 5 | FFS② | | (3) | | |
| 6 | FFS③ | | (4) | 1.5254 | 56.2 |
| 7 | FFS④ (RE) | | (5) | 1.5254 | 56.2 |
| 8 | FFS⑤ (RE) | | (6) | 1.5254 | 56.2 |
| 9 | FFS⑥ | | (7) | | |
| Image plane | ∞ | | (8) | | |

ASS①
R   −78.87
K    0.0000
A    $6.3888 \times 10^{-6}$
B    $-6.7614 \times 10^{-9}$ FFS①
$C_4$  $-1.3820 \times 10^{-2}$  $C_6$  $-1.2744 \times 10^{-2}$  $C_8$  $-5.9146 \times 10^{-5}$
$C_{10}$  $-8.6079 \times 10^{-5}$  $C_{11}$  $-1.5009 \times 10^{-6}$  $C_{13}$  $-3.9389 \times 10^{-6}$
$C_{15}$  $-3.9837 \times 10^{-6}$  $C_{17}$  $9.5456 \times 10^{-8}$  $C_{19}$  $2.5646 \times 10^{-7}$
$C_{21}$  $8.4257 \times 10^{-8}$ FFS②
$C_4$  $-4.8112 \times 10^{-2}$  $C_6$  $2.2437 \times 10^{-3}$  $C_8$  $1.2629 \times 10^{-2}$
$C_{10}$  $-1.4147 \times 10^{-3}$  $C_{11}$  $1.1201 \times 10^{-3}$  $C_{13}$  $-4.2802 \times 10^{-3}$
$C_{15}$  $-1.8265 \times 10^{-5}$ FFS③
$C_4$  $-2.4894 \times 10^{-2}$  $C_6$  $1.7719 \times 10^{-3}$  $C_8$  $1.3030 \times 10^{-2}$
$C_{10}$  $8.7223 \times 10^{-3}$  $C_{11}$  $-2.5693 \times 10^{-3}$  $C_{13}$  $2.0937 \times 10^{-3}$
$C_{15}$  $-1.7955 \times 10^{-4}$ FFS④
$C_4$  $1.4510 \times 10^{-2}$  $C_6$  $1.4974 \times 10^{-2}$  $C_8$  $6.3447 \times 10^{-5}$
$C_{10}$  $-3.3021 \times 10^{-5}$  $C_{11}$  $6.7340 \times 10^{-6}$  $C_{13}$  $1.3268 \times 10^{-5}$
$C_{15}$  $5.6476 \times 10^{-6}$ FFS⑤
$C_4$  $-5.0177 \times 10^{-3}$  $C_6$  $4.2398 \times 10^{-3}$  $C_{11}$  $1.3297 \times 10^{-5}$
$C_{13}$  $1.7182 \times 10^{-5}$  $C_{15}$  $7.8122 \times 10^{-6}$ FFS⑥
$C_4$  $6.6144 \times 10^{-2}$  $C_6$  $3.1372 \times 10^{-2}$  $C_{11}$  $5.4070 \times 10^{-4}$
$C_{13}$  $-2.1336 \times 10^{-4}$  $C_{15}$  $-4.3706 \times 10^{-4}$

| | Displacement and tilt(1) | | | | | |
|---|---|---|---|---|---|---|
| X | 0.00 | Y | 13.06 | Z | 30.44 | |
| α | 4.48 | β | 0.00 | γ | 0.00 | |

| | Displacement and tilt(2) | | | | | |
|---|---|---|---|---|---|---|
| X | 0.00 | Y | −0.13 | Z | 38.51 | |
| α | −29.74 | β | 0.00 | γ | 0.00 | |

| | Displacement and tilt(3) | | | | | |
|---|---|---|---|---|---|---|
| X | 0.00 | Y | 17.85 | Z | 32.43 | |
| α | 74.33 | β | 0.00 | γ | 0.00 | |

| | Displacement and tilt(4) | | | | | |
|---|---|---|---|---|---|---|
| X | 0.00 | Y | 19.17 | Z | 33.07 | |
| α | −102.30 | β | 0.00 | γ | 0.00 | |

| | Displacement and tilt(5) | | | | | |
|---|---|---|---|---|---|---|
| X | 0.00 | Y | 44.66 | Z | 43.01 | |
| α | −133.87 | β | 0.00 | γ | 0.00 | |

| | Displacement and tilt(6) | | | | | |
|---|---|---|---|---|---|---|
| X | 0.00 | Y | 32.00 | Z | 30.30 | |
| α | −180.00 | β | 0.00 | γ | 0.00 | |

| | Displacement and tilt(7) | | | | | |
|---|---|---|---|---|---|---|
| X | 0.00 | Y | 32.00 | Z | 48.57 | |
| α | 0.00 | β | 0.00 | γ | 0.00 | |

| | Displacement and tilt(8) | | | | | |
|---|---|---|---|---|---|---|
| X | 0.00 | Y | 32.00 | Z | 53.57 | |
| α | 0.00 | β | 0.00 | γ | 0.00 | |

Example 21

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | | (1) | | |
| 2 | ASS① | | (2) | 1.5254 | 56.2 |
| 3 | FFS① (RE) | | (3) | 1.5254 | 56.2 |
| 4 | ASS① (RE) | | (2) | 1.5254 | 56.2 |
| 5 | FFS② | | (4) | | |
| 6 | FFS③ | | (5) | 1.5254 | 56.2 |
| 7 | FFS④ (RE) | | (6) | 1.5254 | 56.2 |
| 8 | FFS⑤ (RE) | | (7) | 1.5254 | 56.2 |
| 9 | FFS⑥ | | (8) | | |
| Image plane | ∞ | | (9) | | |

ASS①
R   −93.13
K    0.0000
A    $-7.3153 \times 10^{-6}$
B    $1.0465 \times 10^{-8}$ FFS①
$C_4$  $-1.2530 \times 10^{-2}$  $C_6$  $-1.0935 \times 10^{-2}$  $C_8$  $4.3572 \times 10^{-5}$
$C_{10}$  $5.6790 \times 10^{-5}$  $C_{11}$  $-4.6759 \times 10^{-6}$  $C_{13}$  $-5.7024 \times 10^{-6}$
$C_{15}$  $-2.5865 \times 10^{-6}$  $C_{17}$  $5.1708 \times 10^{-8}$  $C_{19}$  $4.7739 \times 10^{-8}$
$C_{21}$  $4.8274 \times 10^{-8}$ FFS②
$C_4$  $2.1276 \times 10^{-2}$  $C_6$  $-1.3001 \times 10^{-2}$  $C_8$  $1.2698 \times 10^{-2}$
$C_{10}$  $-4.0940 \times 10^{-3}$  $C_{11}$  $6.8259 \times 10^{-4}$  $C_{13}$  $-1.1193 \times 10^{-3}$
$C_{15}$  $-4.9525 \times 10^{-5}$ FFS③
$C_4$  $-7.7818 \times 10^{-2}$  $C_6$  $-1.3978 \times 10^{-2}$  $C_8$  $8.2943 \times 10^{-3}$
$C_{10}$  $-3.6125 \times 10^{-3}$  $C_{11}$  $-2.1473 \times 10^{-3}$  $C_{13}$  $1.6422 \times 10^{-3}$
$C_{15}$  $2.1472 \times 10^{-4}$ FFS④
$C_4$  $1.7708 \times 10^{-2}$  $C_6$  $9.8479 \times 10^{-3}$  $C_8$  $4.2747 \times 10^{-5}$
$C_{10}$  $1.4710 \times 10^{-6}$  $C_{11}$  $6.0476 \times 10^{-6}$  $C_{13}$  $9.5455 \times 10^{-6}$
$C_{15}$  $7.9647 \times 10^{-6}$ FFS⑤
$C_4$  $-3.2083 \times 10^{-3}$  $C_6$  $-1.1682 \times 10^{-2}$  $C_8$  $-3.8379 \times 10^{-4}$
$C_{10}$  $-4.7983 \times 10^{-4}$  $C_{11}$  $3.2203 \times 10^{-5}$  $C_{13}$  $2.4146 \times 10^{-5}$
$C_{15}$  $1.5623 \times 10^{-5}$ FFS⑥
$C_4$  $-1.2690 \times 10^{-2}$  $C_6$  $1.2046 \times 10^{-2}$

| | Displacement and tilt(1) | | | | | |
|---|---|---|---|---|---|---|
| X | 0.00 | Y | 0.00 | Z | 0.00 | |
| α | 0.00 | β | 0.00 | γ | 0.00 | |

| | Displacement and tilt(2) | | | | | |
|---|---|---|---|---|---|---|
| X | 0.00 | Y | 11.12 | Z | 31.05 | |
| α | 6.41 | β | 0.00 | γ | 0.00 | |

| | Displacement and tilt(3) | | | | | |
|---|---|---|---|---|---|---|
| X | 0.00 | Y | −0.11 | Z | 39.90 | |
| α | −26.24 | β | 0.00 | γ | 0.00 | |

| | Displacement and tilt(4) | | | | | |
|---|---|---|---|---|---|---|
| X | 0.00 | Y | 19.37 | Z | 34.98 | |
| α | 52.37 | β | 0.00 | γ | 0.00 | |

| | Displacement and tilt(5) | | | | | |
|---|---|---|---|---|---|---|
| X | 0.00 | Y | 19.70 | Z | 35.09 | |
| α | −124.03 | β | 0.00 | γ | 0.00 | |

-continued

| | | Displacement and tilt(6) | | | |
|---|---|---|---|---|---|
| X | 0.00 | Y | 41.67 | Z | 44.93 |
| α | −137.82 | β | 0.00 | γ | 0.00 |
| | | Displacement and tilt(7) | | | |
| X | 0.00 | Y | 36.67 | Z | 30.00 |
| α | −176.69 | β | 0.00 | γ | 0.00 |
| | | Displacement and tilt(8) | | | |
| X | 0.00 | Y | 32.00 | Z | 48.79 |
| α | 0.00 | β | 0.00 | γ | 0.00 |
| | | Displacement and tilt(9) | | | |
| X | 0.00 | Y | 32.00 | Z | 51.01 |
| α | 0.00 | β | 0.00 | γ | 0.00 |

Example 22

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | | (1) | | |
| 2 | ∞ | | (2) | 1.4924 | 107.9 |
| 3 | A S S ① | | (3) | | |
| 4 | A S S ② | | (4) | 1.5254 | 56.2 |
| 5 | F F S ① (R E) | | (5) | 1.5254 | 56.2 |
| 6 | A S S ② (R E) | | (4) | 1.5254 | 56.2 |
| 7 | F F S ② | | (6) | | |
| 8 | F F S ③ | | (7) | 1.5254 | 56.2 |
| 9 | F F S ④ (R E) | | (8) | 1.5254 | 56.2 |
| 10 | F F S ⑤ (R E) | | (9) | 1.5254 | 56.2 |
| 11 | F F S ⑥ | | (10) | | |
| Image plane | ∞ | | (11) | | |

A S S ①
R  −31.17
K   0.0000
A  −2.3392 × $10^{-6}$
B   1.4417 × $10^{-8}$

A S S ②
R  −104.32
K   0.0000
A  −1.1160 × $10^{-5}$
B   1.3866 × $10^{-8}$

F F S ①
$C_4$  −1.1076 × $10^{-2}$   $C_6$  −9.7026 × $10^{-3}$   $C_8$  1.2453 × $10^{-4}$
$C_{10}$  8.6331 × $10^{-5}$

F F S ②
$C_4$  −2.6908 × $10^{-2}$   $C_6$  −2.2030 × $10^{-2}$   $C_8$  3.0544 × $10^{-3}$
$C_{10}$  −2.0443 × $10^{-3}$

F F S ③
$C_4$  −4.7273 × $10^{-2}$   $C_6$  −2.9318 × $10^{-2}$   $C_8$  4.8533 × $10^{-4}$
$C_{10}$  −2.1511 × $10^{-3}$

F F S ④
$C_4$  1.3337 × $10^{-2}$   $C_6$  7.7917 × $10^{-3}$   $C_8$  5.2903 × $10^{-6}$
$C_{10}$  3.2236 × $10^{-5}$

F F S ⑤
$C_4$  −7.4443 × $10^{-3}$   $C_6$  −1.1004 × $10^{-2}$   $C_8$  −3.4435 × $10^{-4}$
$C_{10}$  −2.7416 × $10^{-4}$

F F S ⑥
$C_4$  8.1792 × $10^{-3}$   $C_6$  7.4722 × $10^{-3}$

| | | Displacement and tilt(1) | | | |
|---|---|---|---|---|---|
| X | 0.00 | Y | 0.00 | Z | 0.00 |
| α | 0.00 | β | 0.00 | γ | 0.00 |
| | | Displacement and tilt(2) | | | |
| X | 0.00 | Y | 0.00 | Z | 25.00 |
| α | 0.00 | β | 0.00 | γ | 0.00 |
| | | Displacement and tilt(3) | | | |
| X | 0.00 | Y | 0.00 | Z | 29.43 |
| α | 0.00 | β | 0.00 | γ | 0.00 |
| | | Displacement and tilt(4) | | | |
| X | 0.00 | Y | 10.49 | Z | 30.94 |
| α | 6.19 | β | 0.00 | γ | 0.00 |
| | | Displacement and tilt(5) | | | |
| X | 0.00 | Y | −0.10 | Z | 40.19 |
| α | −24.76 | β | 0.00 | γ | 0.00 |
| | | Displacement and tilt(6) | | | |
| X | 0.00 | Y | 18.51 | Z | 35.34 |
| α | 55.35 | β | 0.00 | γ | 0.00 |
| | | Displacement and tilt(7) | | | |
| X | 0.00 | Y | 19.05 | Z | 35.60 |
| α | −111.46 | β | 0.00 | γ | 0.00 |
| | | Displacement and tilt(8) | | | |
| X | 0.00 | Y | 41.39 | Z | 45.63 |
| α | −142.01 | β | 0.00 | γ | 0.00 |
| | | Displacement and tilt(9) | | | |
| X | 0.00 | Y | 38.56 | Z | 29.81 |
| α | 177.05 | β | 0.00 | γ | 0.00 |
| | | Displacement and tilt(10) | | | |
| X | 0.00 | Y | 32.00 | Z | 49.26 |
| α | 0.00 | β | 0.00 | γ | 0.00 |
| | | Displacement and tilt(11) | | | |
| X | 0.00 | Y | 32.00 | Z | 51.37 |
| α | 0.00 | β | 0.00 | γ | 0.00 |

Example 23

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞(Stop) | | | | |
| 2 | A S S ① | | (1) | 1.5254 | 56.2 |
| 3 | F F S ① (R E) | | (2) | 1.5254 | 56.2 |
| 4 | A S S ① (R E) | | (1) | 1.5254 | 56.2 |
| 5 | F F S ② | | (3) | | |
| 6 | F F S ③ (R E) | | (4) | | |
| 7 | 9.36 | | (5) | 1.5254 | 56.2 |
| 8 | A S S ② | | (6) | | |
| Image plane | ∞ | | (7) | | |

A S S ①
R  −112.57
K   0.000
A  1.2804 × $10^{-7}$
B  1.9023 × $10^{-9}$

A S S ②

-continued

| | | | | | | |
|---|---|---|---|---|---|---|
| R | 17.18 | | | | | |
| K | 0.0000 | | | | | |
| A | $-1.1585 \times 10^{-4}$ | | | | | |
| B | $4.5485 \times 10^{-6}$ | | | | | |
| | FFS①  | | | | | |
| $C_4$ | $-1.0758 \times 10^{-2}$ | $C_6$ | $-1.0721 \times 10^{-2}$ | $C_8$ | $7.6154 \times 10^{-5}$ | |
| $C_{10}$ | $-1.9106 \times 10^{-5}$ | $C_{11}$ | $4.9749 \times 10^{-6}$ | $C_{13}$ | $-5.3415 \times 10^{-6}$ | |
| $C_{15}$ | $-2.8610 \times 10^{-6}$ | $C_{17}$ | $1.3623 \times 10^{-7}$ | $C_{19}$ | $2.9234 \times 10^{-8}$ | |
| $C_{21}$ | $-5.0012 \times 10^{-9}$ | | | | | |
| | FFS②  | | | | | |
| $C_4$ | $-4.2973 \times 10^{-2}$ | $C_6$ | $3.8451 \times 10^{-2}$ | $C_8$ | $3.6896 \times 10^{-3}$ | |
| $C_{10}$ | $5.7252 \times 10^{-3}$ | $C_{11}$ | $1.4826 \times 10^{-4}$ | $C_{13}$ | $-1.1264 \times 10^{-3}$ | |
| $C_{15}$ | $4.7888 \times 10^{-4}$ | | | | | |
| | FFS③  | | | | | |
| $C_4$ | $2.0862 \times 10^{-2}$ | $C_6$ | $1.8162 \times 10^{-2}$ | $C_8$ | $1.4311 \times 10^{-4}$ | |
| $C_{10}$ | $-2.1971 \times 10^{-5}$ | $C_{11}$ | $1.3347 \times 10^{-5}$ | $C_{13}$ | $2.3775 \times 10^{-5}$ | |
| $C_{15}$ | $7.6542 \times 10^{-6}$ | | | | | |

| Displacement and tilt(1) | | | | | | |
|---|---|---|---|---|---|---|
| X | 0.00 | Y | 12.30 | Z | 38.14 | |
| α | −1.09 | β | 0.00 | γ | 0.00 | |

| Displacement and tilt(2) | | | | | | |
|---|---|---|---|---|---|---|
| X | 0.00 | Y | −0.33 | Z | 45.00 | |
| α | −31.99 | β | 0.00 | γ | 0.00 | |

| Displacement and tilt(3) | | | | | | |
|---|---|---|---|---|---|---|
| X | 0.00 | Y | 19.10 | Z | 42.18 | |
| α | 78.03 | β | 0.00 | γ | 0.00 | |

| Displacement and tilt(4) | | | | | | |
|---|---|---|---|---|---|---|
| X | 0.00 | Y | 39.78 | Z | 60.30 | |
| α | −147.16 | β | 0.00 | γ | 0.00 | |

| Displacement and tilt(5) | | | | | | |
|---|---|---|---|---|---|---|
| X | 0.00 | Y | 32.00 | Z | 40.06 | |
| α | 0.00 | β | 0.00 | γ | 0.00 | |

| Displacement and tilt(6) | | | | | | |
|---|---|---|---|---|---|---|
| X | 0.00 | Y | 32.00 | Z | 37.55 | |
| α | 0.00 | β | 0.00 | γ | 0.00 | |

| Displacement and tilt(7) | | | | | | |
|---|---|---|---|---|---|---|
| X | 0.00 | Y | 32.00 | Z | 31.96 | |
| α | 0.00 | β | 0.00 | γ | 0.00 | |

Example 24

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | | | | |
| 2 | ASS① | | (1) | 1.5254 | 56.2 |
| 3 | FFS① (RE) | | (2) | 1.5254 | 56.2 |
| 4 | ASS① (RE) | | (1) | 1.5254 | 56.2 |
| 5 | FFS② | | (3) | | |
| 6 | FFS③ (RE) | | (4) | | |
| 7 | 10.00 | | (5) | 1.7400 | 45.0 |
| 8 | −30.00 | | (6) | 1.4875 | 70.2 |
| 9 | 20.00 | | (7) | | |

| | | | | | | |
|---|---|---|---|---|---|---|
| Image plane | ∞ | | (8) | | | |
| | ASS① | | | | | |
| R | −755.72 | | | | | |
| K | 0.0000 | | | | | |
| A | $-3.0223 \times 10^{-6}$ | | | | | |
| B | $3.6982 \times 10^{-9}$ | | | | | |
| | FFS① | | | | | |
| $C_4$ | $-1.3291 \times 10^{-2}$ | $C_6$ | $-9.1362 \times 10^{-3}$ | $C_8$ | $1.3010 \times 10^{-5}$ | |
| $C_{10}$ | $-4.7998 \times 10^{-5}$ | $C_{11}$ | $3.8631 \times 10^{-6}$ | $C_{13}$ | $1.2388 \times 10^{-6}$ | |
| $C_{15}$ | $-1.7387 \times 10^{-6}$ | $C_{17}$ | $4.1889 \times 10^{-7}$ | $C_{19}$ | $3.3450 \times 10^{-8}$ | |
| $C_{21}$ | $1.5434 \times 10^{-8}$ | | | | | |
| | FFS② | | | | | |
| $C_4$ | $-4.9441 \times 10^{-2}$ | $C_6$ | $5.0481 \times 10^{-2}$ | $C_8$ | $-1.8555 \times 10^{-3}$ | |
| $C_{10}$ | $1.1867 \times 10^{-3}$ | $C_{11}$ | $-1.0276 \times 10^{-3}$ | $C_{13}$ | $2.6209 \times 10^{-3}$ | |
| $C_{15}$ | $1.5800 \times 10^{-4}$ | | | | | |
| | FFS③ | | | | | |
| $C_4$ | $2.1838 \times 10^{-2}$ | $C_6$ | $2.0822 \times 10^{-2}$ | $C_8$ | $1.5599 \times 10^{-4}$ | |
| $C_{10}$ | $2.2274 \times 10^{-5}$ | $C_{11}$ | $1.7287 \times 10^{-5}$ | $C_{13}$ | $3.1039 \times 10^{-5}$ | |
| $C_{15}$ | $1.7347 \times 10^{-5}$ | | | | | |

| Displacement and tilt(1) | | | | | | |
|---|---|---|---|---|---|---|
| X | 0.00 | Y | 15.24 | Z | 38.77 | |
| α | 2.68 | β | 0.00 | γ | 0.00 | |

| Displacement and tilt(2) | | | | | | |
|---|---|---|---|---|---|---|
| X | 0.00 | Y | 0.01 | Z | 47.98 | |
| α | −29.39 | β | 0.00 | γ | 0.00 | |

| Displacement and tilt(3) | | | | | | |
|---|---|---|---|---|---|---|
| X | 0.00 | Y | 22.36 | Z | 42.21 | |
| α | 83.11 | β | 0.00 | γ | 0.00 | |

| Displacement and tilt(4) | | | | | | |
|---|---|---|---|---|---|---|
| X | 0.00 | Y | 38.88 | Z | 54.46 | |
| α | −145.16 | β | 0.00 | γ | 0.00 | |

| Displacement and tilt(5) | | | | | | |
|---|---|---|---|---|---|---|
| X | 0.00 | Y | 32.00 | Z | 34.24 | |
| α | 0.00 | β | 0.00 | γ | 0.00 | |

| Displacement and tilt(6) | | | | | | |
|---|---|---|---|---|---|---|
| X | 0.00 | Y | 32.00 | Z | 33.17 | |
| α | 0.00 | β | 0.00 | γ | 0.00 | |

| Displacement and tilt(7) | | | | | | |
|---|---|---|---|---|---|---|
| X | 0.00 | Y | 32.00 | Z | 30.48 | |
| α | 0.00 | β | 0.00 | γ | 0.00 | |

| Displacement and tilt(8) | | | | | | |
|---|---|---|---|---|---|---|
| X | 0.00 | Y | 32.00 | Z | 28.00 | |
| α | 0.00 | β | 0.00 | γ | 0.00 | |

Example 25

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | | | | |
| 2 | ASS① | | (1) | 1.5254 | 56.2 |
| 3 | FFS① (RE) | | (2) | 1.5254 | 56.2 |
| 4 | ASS① | | (1) | 1.5254 | 56.2 |

-continued

| | | | | |
|---|---|---|---|---|
| | (R E) | | | |
| 5 | F F S ② | (3) | | |
| 6 | F F S ③ (R E) | (4) | | |
| 7 | F F S ④ (R E) | (5) | | |
| Image plane | ∞ | (6) | | |

| | ASS ① | | | |
|---|---|---|---|---|
| R | −142.30 | | | |
| K | 0.0000 | | | |
| A | −7.9459 × 10$^{-6}$ | | | |
| B | 4.5193 × 10$^{-9}$ | | | |
| | F F S ① | | | |
| $C_4$ | −1.5782 × 10$^{-2}$ | $C_6$ | −9.2595 × 10$^{-3}$ | $C_8$ | 8.4720 × 10$^{-5}$ |
| $C_{10}$ | 4.5249 × 10$^{-5}$ | $C_{11}$ | 1.0602 × 10$^{-5}$ | $C_{13}$ | −8.7497 × 10$^{-6}$ |
| $C_{15}$ | −4.4525 × 10$^{-6}$ | $C_{17}$ | −5.8969 × 10$^{-8}$ | $C_{19}$ | 1.8760 × 10$^{-7}$ |
| $C_{21}$ | 1.2837 × 10$^{-7}$ | | | |
| | F F S ② | | | |
| $C_4$ | −4.8446 × 10$^{-2}$ | $C_6$ | −8.3829 × 10$^{-3}$ | | |
| | F F S ③ | | | |
| $C_4$ | 1.6543 × 10$^{-2}$ | $C_6$ | 9.5400 × 10$^{-3}$ | $C_8$ | −1.0953 × 10$^{-4}$ |
| $C_{10}$ | −1.8587 × 10$^{-5}$ | $C_{11}$ | 5.3062 × 10$^{-6}$ | $C_{13}$ | 7.9992 × 10$^{-6}$ |
| $C_{15}$ | 5.7816 × 10$^{-6}$ | | | |
| | F F S ④ | | | |
| $C_4$ | −4.2215 × 10$^{-3}$ | $C_6$ | 1.0692 × 10$^{-2}$ | $C_8$ | −3.6896 × 10$^{-4}$ |
| $C_{10}$ | −2.5259 × 10$^{-4}$ | $C_{11}$ | 5.9277 × 10$^{-6}$ | $C_{13}$ | −1.3516 × 10$^{-5}$ |
| $C_{15}$ | −7.8520 × 10$^{-6}$ | | | |

| Displacement and tilt(1) | | | | | |
|---|---|---|---|---|---|
| X | 0.00 | Y | 11.67 | Z | 32.96 |
| α | −1.41 | β | 0.00 | γ | 0.00 |

| Displacement and tilt(2) | | | | | |
|---|---|---|---|---|---|
| X | 0.00 | Y | −0.45 | Z | 40.56 |
| α | −30.45 | β | 0.00 | γ | 0.00 |

| Displacement and tilt(3) | | | | | |
|---|---|---|---|---|---|
| X | 0.00 | Y | 18.56 | Z | 37.77 |
| α | 33.95 | β | 0.00 | γ | 0.00 |

| Displacement and tilt(4) | | | | | |
|---|---|---|---|---|---|
| X | 0.00 | Y | 43.39 | Z | 48.16 |
| α | −135.03 | β | 0.00 | γ | 0.00 |

| Displacement and tilt(5) | | | | | |
|---|---|---|---|---|---|
| X | 0.00 | Y | 36.28 | Z | 31.09 |
| α | 6.39 | β | 0.00 | γ | 0.00 |

| Displacement and tilt(6) | | | | | |
|---|---|---|---|---|---|
| X | 0.00 | Y | 32.00 | Z | 55.72 |
| α | 0.00 | β | 0.00 | γ | 0.00 |

Example 26

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | | | | |
| 2 | F F S ① | | (1) | 1.5254 | 56.2 |
| 3 | F F S ② (R E) | | (2) | 1.5254 | 56.2 |
| 4 | F F S ③ | | (3) | | |
| 5 | F F S ④ | | (4) | 1.5254 | 56.2 |
| 6 | F F S ⑤ (R E) | | (5) | 1.5254 | 56.2 |
| 7 | F F S ⑥ | | (6) | | |
| Image plane | ∞ | | (7) | | |

| | F F S ① | | | | |
|---|---|---|---|---|---|
| $C_4$ | −6.2629 × 10$^{-3}$ | $C_6$ | 3.3796 × 10$^{-4}$ | $C_8$ | 3.9666 × 10$^{-4}$ |
| $C_{10}$ | −1.2581 × 10$^{-4}$ | $C_{11}$ | 2.6158 × 10$^{-6}$ | $C_{13}$ | 3.2906 × 10$^{-5}$ |
| $C_{15}$ | 1.4501 × 10$^{-6}$ | | | | |
| | F F S ② | | | | |
| $C_4$ | −1.3276 × 10$^{-2}$ | $C_6$ | −9.4693 × 10$^{-3}$ | $C_8$ | −8.4725 × 10$^{-5}$ |
| $C_{10}$ | −1.3499 × 10$^{-4}$ | $C_{11}$ | −2.9102 × 10$^{-6}$ | $C_{13}$ | −2.0112 × 10$^{-6}$ |
| $C_{15}$ | −2.4589 × 10$^{-6}$ | $C_{17}$ | −4.4244 × 10$^{-9}$ | $C_{19}$ | −4.8328 × 10$^{-8}$ |
| $C_{21}$ | −1.8143 × 10$^{-8}$ | | | | |
| | F F S ③ | | | | |
| $C_4$ | −2.1469 × 10$^{-2}$ | $C_6$ | −3.3694 × 10$^{-2}$ | $C_8$ | −1.6179 × 10$^{-3}$ |
| $C_{10}$ | −3.2678 × 10$^{-3}$ | $C_{11}$ | −7.9899 × 10$^{-5}$ | $C_{13}$ | −1.7505 × 10$^{-4}$ |
| $C_{15}$ | −3.5647 × 10$^{-4}$ | | | | |
| | F F S ④ | | | | |
| $C_4$ | −1.1648 × 10$^{-1}$ | $C_6$ | −4.0332 × 10$^{-2}$ | $C_8$ | −1.1348 × 10$^{-3}$ |
| $C_{10}$ | 1.9930 × 10$^{-3}$ | $C_{11}$ | 8.3579 × 10$^{-4}$ | $C_{13}$ | 8.0595 × 10$^{-4}$ |
| $C_{15}$ | 9.9925 × 10$^{-4}$ | | | | |
| | F F S ⑤ | | | | |
| $C_4$ | 1.9541 × 10$^{-2}$ | $C_6$ | 1.6255 × 10$^{-2}$ | $C_8$ | −1.0516 × 10$^{-5}$ |
| $C_{10}$ | −5.5991 × 10$^{-5}$ | $C_{11}$ | 4.5526 × 10$^{-6}$ | $C_{13}$ | 1.2743 × 10$^{-5}$ |
| $C_{15}$ | 3.8394 × 10$^{-6}$ | | | | |
| | F F S ⑥ | | | | |
| $C_4$ | 1.9172 × 10$^{-2}$ | $C_6$ | 3.2175 × 10$^{-2}$ | $C_{11}$ | 9.6401 × 10$^{-5}$ |
| $C_{13}$ | −2.6951 × 10$^{-5}$ | $C_{15}$ | −1.6440 × 10$^{-4}$ | | |

| Displacement and tilt(1) | | | | | |
|---|---|---|---|---|---|
| X | 0.00 | Y | 0.00 | Z | 32.45 |
| α | −13.66 | β | 0.00 | γ | 0.00 |

| Displacement and tilt(2) | | | | | |
|---|---|---|---|---|---|
| X | 0.00 | Y | −1.36 | Z | 48.79 |
| α | −33.83 | β | 0.00 | γ | 0.00 |

| Displacement and tilt(3) | | | | | |
|---|---|---|---|---|---|
| X | 0.00 | Y | 12.70 | Z | 41.59 |
| α | −50.46 | β | 0.00 | γ | 0.00 |

| Displacement and tilt(4) | | | | | |
|---|---|---|---|---|---|
| X | 0.00 | Y | 19.62 | Z | 39.02 |
| α | −65.04 | β | 0.00 | γ | 0.00 |

| Displacement and tilt(5) | | | | | |
|---|---|---|---|---|---|
| X | 0.00 | Y | 42.00 | Z | 30.00 |
| α | −44.81 | β | 0.00 | γ | 0.00 |

| Displacement and tilt(6) | | | | | |
|---|---|---|---|---|---|
| X | 0.00 | Y | 32.00 | Z | 45.53 |
| α | 0.00 | β | 0.00 | γ | 0.00 |

| Displacement and tilt(7) | | | | | |
|---|---|---|---|---|---|
| X | 0.00 | Y | 32.00 | Z | 53.23 |
| α | 0.00 | β | 0.00 | γ | 0.00 |

Example 27

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | | | | |
| 2 | A S S ① | | (1) | 1.5254 | 56.2 |
| 3 | F F S ① (R E) | | (2) | 1.5254 | 56.2 |
| 4 | A S S ① (R E) | | (1) | 1.5254 | 56.2 |
| 5 | F F S ① (R E) | | (2) | 1.5254 | 56.2 |
| 6 | F F S ② | | (3) | | |
| 7 | F F S ③ | | (4) | 1.5254 | 56.2 |
| 8 | F F S ④ (R E) | | (5) | 1.5254 | 56.2 |
| 9 | F F S ⑤ | | (6) | | |
| Image plane | ∞ | | (7) | | |

A S S ①
R     −109.37
K      0.0000
A      $2.7422 \times 10^{-5}$
B      $-4.1869 \times 10^{-8}$

F F S ①

| $C_4$ | $-1.1126 \times 10^{-2}$ | $C_6$ | $-1.0227 \times 10^{-2}$ | $C_8$ | $-6.0588 \times 10^{-5}$ |
| $C_{10}$ | $-3.0318 \times 10^{-5}$ | $C_{11}$ | $7.9055 \times 10^{-6}$ | $C_{13}$ | $1.1105 \times 10^{-5}$ |
| $C_{15}$ | $1.0604 \times 10^{-6}$ | $C_{17}$ | $2.8597 \times 10^{-7}$ | $C_{19}$ | $1.5498 \times 10^{-7}$ |
| $C_{21}$ | $1.4283 \times 10^{-7}$ | | | | |

F F S ②

| $C_4$ | $3.6878 \times 10^{-2}$ | $C_6$ | $3.5702 \times 10^{-2}$ | $C_8$ | $-2.0106 \times 10^{-2}$ |
| $C_{10}$ | $-9.8201 \times 10^{-3}$ | $C_{11}$ | $2.1010 \times 10^{-3}$ | $C_{13}$ | $-1.9983 \times 10^{-3}$ |
| $C_{15}$ | $9.8827 \times 10^{-4}$ | | | | |

F F S ③

| $C_4$ | $-1.0254 \times 10^{-1}$ | $C_6$ | $-2.5575 \times 10^{-2}$ | $C_8$ | $-2.0239 \times 10^{-2}$ |
| $C_{10}$ | $-5.8721 \times 10^{-3}$ | $C_{11}$ | $1.0962 \times 10^{-3}$ | $C_3$ | $-3.3381 \times 10^{-3}$ |
| $C_{15}$ | $4.7815 \times 10^{-4}$ | | | | |

F F S ④

| $C_4$ | $2.3287 \times 10^{-2}$ | $C_6$ | $1.8127 \times 10^{-2}$ | $C_8$ | $-4.0703 \times 10^{-4}$ |
| $C_{10}$ | $-2.4676 \times 10^{-4}$ | $C_{11}$ | $1.9470 \times 10^{-5}$ | $C_{13}$ | $3.1178 \times 10^{-5}$ |
| $C_{15}$ | $-3.0929 \times 10^{-7}$ | | | | |

F F S ⑤

| $C_4$ | $-1.9980 \times 10^{-2}$ | $C_6$ | $-1.9644 \times 10^{-2}$ | $C_{11}$ | $1.8913 \times 10^{-4}$ |
| $C_{13}$ | $4.0095 \times 10^{-4}$ | $C_{15}$ | $5.1524 \times 10^{-4}$ | | |

Displacement and tilt(1)

| X | 0.00 | Y | 6.56 | Z | 32.12 |
| α | −2.57 | β | 0.00 | γ | 0.00 |

Displacement and tilt(2)

| X | 0.00 | Y | −0.19 | Z | 38.74 |
| α | −23.54 | β | 0.00 | γ | 0.00 |

Displacement and tilt(3)

| X | 0.00 | Y | 20.79 | Z | 39.32 |
| α | −71.99 | β | 0.00 | γ | 0.00 |

Displacement and tilt(4)

| X | 0.00 | Y | 21.54 | Z | 38.60 |
| α | −84.73 | β | 0.00 | γ | 0.00 |

Displacement and tilt(5)

| X | 0.00 | Y | 36.81 | Z | 30.00 |
| α | −35.69 | β | 0.00 | γ | 0.00 |

Displacement and tilt(6)

| X | 0.00 | Y | 32.00 | Z | 44.11 |
| α | 0.00 | β | 0.00 | γ | 0.00 |

Displacement and tilt(7)

| X | 0.00 | Y | 32.00 | Z | 50.34 |
| α | 0.00 | β | 0.00 | γ | 0.00 |

Example 28

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | | | | |
| 2 | FFS ① | | (1) | 1.5254 | 56.2 |
| 3 | FFS ② (RE) | | (2) | 1.5254 | 56.2 |
| 4 | FFS ③ (RE) | | (3) | 1.5254 | 56.2 |
| 5 | FFS ④ | | (4) | | |
| 6 | FFS ⑤ | | (5) | 1.5254 | 56.2 |
| 7 | FFS ⑥ (RE) | | (6) | 1.5254 | 56.2 |
| 8 | FFS ⑦ (RE) | | (7) | 1.5254 | 56.2 |
| 9 | FFS ⑨ | | (8) | | |
| Image plane | ∞ | | (9) | | |

FFS ①

| $C_4$ | $-8.4040 \times 10^{-3}$ | $C_6$ | $-8.5943 \times 10^{-3}$ | | |

FFS ②

| $C_4$ | $-4.8109 \times 10^{-3}$ | $C_6$ | $-3.4151 \times 10^{-3}$ | $C_8$ | $7.6983 \times 10^{-6}$ |
| $C_{10}$ | $5.9643 \times 10^{-6}$ | | | | |

FFS ③

| $C_4$ | $8.5504 \times 10^{-4}$ | $C_6$ | $2.0899 \times 10^{-3}$ | $C_8$ | $3.9710 \times 10^{-6}$ |
| $C_{10}$ | $1.2427 \times 10^{-5}$ | | | | |

FFS ④

| $C_4$ | $-4.1338 \times 10^{-3}$ | $C_6$ | $4.6863 \times 10^{-3}$ | | |

FFS ⑤

| $C_4$ | $1.8948 \times 10^{-2}$ | $C_6$ | $7.8112 \times 10^{-3}$ | | |

FFS ⑥

| $C_4$ | $-2.9136 \times 10^{-3}$ | $C_6$ | $-2.6792 \times 10^{-3}$ | | |

FFS ⑦

| $C_4$ | $1.0066 \times 10^{-2}$ | $C_6$ | $1.0913 \times 10^{-2}$ | | |

FFS ⑧

| $C_4$ | $-2.2044 \times 10^{-2}$ | $C_6$ | $-1.6909 \times 10^{-2}$ | | |

Displacement and tilt (1)

| X | 0.00 | Y | 0.00 | Z | 30.00 |
| α | 0.00 | β | 0.00 | γ | 0.00 |

Displacement and tilt (2)

| X | 0.00 | Y | 7.73 | Z | 66.05 |
| α | 18.69 | β | 0.00 | γ | 0.00 |

Displacement and tilt (3)

| X | 0.00 | Y | −17.85 | Z | 38.62 |
| α | 46.96 | β | 0.00 | γ | 0.00 |

Displacement and tilt (4)

| X | 0.00 | Y | 20.71 | Z | 58.27 |
| α | 70.85 | β | 0.00 | γ | 0.00 |

-continued

| Displacement and tilt (5) | | | | | | |
|---|---|---|---|---|---|---|
| X | 0.00 | Y | 21.56 | Z | 58.79 |
| α | 72.18 | β | 0.00 | γ | 0.00 |
| Displacement and tilt (6) | | | | | | |
| X | 0.00 | Y | 41.10 | Z | 68.55 |
| α | 46.38 | β | 0.00 | γ | 0.00 |
| Displacement and tilt (7) | | | | | | |
| X | 0.00 | Y | 28.64 | Z | 46.33 |
| α | 17.45 | β | 0.00 | γ | 0.00 |
| Displacement and tilt (8) | | | | | | |
| X | 0.00 | Y | 32.02 | Z | 71.98 |
| α | 0.00 | β | 0.00 | γ | 0.00 |
| Displacement and tilt (9) | | | | | | |
| X | 0.00 | Y | 32.00 | Z | 76.97 |
| α | 0.00 | β | 0.00 | γ | 0.00 |

Example 29

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | | | | |
| 2 | ASS ① | | (1) | 1.5254 | 56.2 |
| 3 | FFS ① (RE) | | (2) | 1.5254 | 56.2 |
| 4 | ASS ① (RE) | | (1) | 1.5254 | 56.2 |
| 5 | FFS ② | | (3) | | |
| 6 | FFS ③ | | (4) | 1.5254 | 56.2 |
| 7 | FFS ④ (RE) | | (5) | 1.5254 | 56.2 |
| 8 | FFS ⑤ | | (6) | | |
| Image plane | ∞ | | (7) | | |

ASS ①

R    1285.39
K    0.0000
A    $6.4599 \times 10^{-7}$
B    $-3.7861 \times 10^{-10}$

FFS ①

$C_4$ $-3.6795 \times 10^{-3}$   $C_6$ $-2.1319 \times 10^{-3}$   $C_8$ $-5.8405 \times 10^{-5}$
$C_{10}$ $-6.5664 \times 10^{-5}$   $C_{11}$ $8.2431 \times 10^{-7}$   $C_{13}$ $1.4603 \times 10^{-6}$
$C_{15}$ $1.4571 \times 10^{-6}$   $C_{17}$ $-5.6374 \times 10^{-8}$   $C_{19}$ $-3.7292 \times 10^{-8}$
$C_{21}$ $-4.3730 \times 10^{-8}$

FFS ②

$C_4$ $-3.1489 \times 10^{-4}$   $C_6$ $5.2538 \times 10^{-3}$   $C_8$ $1.2817 \times 10^{-3}$
$C_{10}$ $1.2156 \times 10^{-3}$   $C_{11}$ $5.1327 \times 10^{-6}$   $C_{13}$ $-1.0362 \times 10^{-5}$
$C_{15}$ $4.7618 \times 10^{-5}$

FFS ③

$C_4$ $-2.2969 \times 10^{-3}$   $C_6$ $-4.7767 \times 10^{-4}$   $C_8$ $3.1569 \times 10^{-4}$
$C_{10}$ $1.9939 \times 10^{-4}$   $C_{11}$ $4.1969 \times 10^{-7}$   $C_{13}$ $1.3660 \times 10^{-5}$
$C_{15}$ $4.6817 \times 10^{-6}$

FFS ④

$C_4$ $2.2969 \times 10^{-3}$   $C_6$ $4.7767 \times 10^{-4}$   $C_8$ $-3.1569 \times 10^{-4}$
$C_{10}$ $-1.9939 \times 10^{-4}$   $C_{11}$ $-4.1969 \times 10^{-7}$   $C_{13}$ $-1.3660 \times 10^{-5}$
$C_{15}$ $-4.6817 \times 10^{-6}$

FFS ⑤

$C_4$ $2.5793 \times 10^{-2}$   $C_6$ $-4.2457 \times 10^{-3}$   $C_{11}$ $-4.8745 \times 10^{-4}$
$C_{13}$ $-1.7443 \times 10^{-4}$   $C_{15}$ $-3.6717 \times 10^{-5}$ Displacement and tilt (1)

| X | 0.00 | Y | 10.19 | Z | 29.40 |
|---|---|---|---|---|---|
| α | 7.35 | β | 0.00 | γ | 0.00 |

Displacement and tilt (2)

| X | 0.00 | Y | −3.29 | Z | 36.33 |
|---|---|---|---|---|---|
| α | −25.35 | β | 0.00 | γ | 0.00 |

Displacement and tilt (3)

| X | 0.00 | Y | 24.99 | Z | 36.53 |
|---|---|---|---|---|---|
| α | 82.49 | β | 0.00 | γ | 0.00 |

Displacement and tilt (4)

| X | 0.00 | Y | 18.12 | Z | 7.32 |
|---|---|---|---|---|---|
| α | −18.71 | β | 0.00 | γ | 0.00 |

Displacement and tilt (5)

| X | 0.00 | Y | 18.12 | Z | −7.32 |
|---|---|---|---|---|---|
| α | 18.71 | β | 0.00 | γ | 0.00 |

Displacement and tilt (6)

| X | 0.00 | Y | 24.00 | Z | 0.00 |
|---|---|---|---|---|---|
| α | 90.00 | β | 0.00 | γ | 0.00 |

Displacement and tilt (7)

| X | 0.00 | Y | 0.00 | Z | 1.73 |
|---|---|---|---|---|---|
| α | 0.00 | β | 0.00 | γ | 0.00 |

Example 30

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) | | | | |
| 2 | ASS ① | | (1) | 1.5254 | 56.2 |
| 3 | FFS ① (RE) | | (2) | 1.5254 | 56.2 |
| 4 | ASS ① (RE) | | (1) | 1.5254 | 56.2 |
| 5 | FFS ② | | (3) | | |
| 6 | FFS ③ | | (4) | 1.5254 | 56.2 |
| 7 | FFS ④ (RE) | | (5) | 1.5254 | 56.2 |
| 8 | FFS ⑤ | | (6) | | |
| Image plane | ∞ | | (7) | | |

ASS ①

R    368.58
K    0.0000
A    $7.6841 \times 10^{-7}$
B    $-3.6756 \times 10^{-11}$

FFS ①

$C_4$ $-2.7696 \times 10^{-3}$   $C_6$ $-1.4546 \times 10^{-3}$   $C_8$ $-5.7608 \times 10^{-5}$
$C_{10}$ $-9.2334 \times 10^{-5}$   $C_{11}$ $5.8163 \times 10^{-7}$   $C_{13}$ $3.5074 \times 10^{-6}$
$C_{15}$ $2.2152 \times 10^{-6}$   $C_{17}$ $-1.8054 \times 10^{-7}$   $C_{19}$ $-1.1334 \times 10^{-7}$
$C_{21}$ $-1.0782 \times 10^{-7}$

FFS ②

$C_4$ $3.3609 \times 10^{-4}$   $C_6$ $8.4179 \times 10^{-2}$   $C_8$ $-3.1419 \times 10^{-5}$
$C_{10}$ $3.1128 \times 10^{-3}$   $C_{11}$ $3.4030 \times 10^{-5}$   $C_{13}$ $-1.1634 \times 10^{-4}$
$C_{15}$ $3.9570 \times 10^{-5}$

FFS ③

$C_4$ $-3.7622 \times 10^{-3}$   $C_6$ $-3.6532 \times 10^{-3}$   $C_8$ $1.5526 \times 10^{-4}$
$C_{10}$ $-5.4887 \times 10^{-6}$   $C_{11}$ $7.4035 \times 10^{-6}$   $C_{13}$ $1.0763 \times 10^{-5}$
$C_{15}$ $-6.6288 \times 10^{-7}$

FFS ④

$C_4$ $3.7622 \times 10^{-3}$   $C_6$ $3.6532 \times 10^{-3}$   $C_8$ $-1.5526 \times 10^{-4}$
$C_{10}$ $5.4887 \times 10^{-6}$   $C_{11}$ $7.4035 \times 10^{-6}$   $C_{13}$ $-1.0763 \times 10^{-5}$
$C_{15}$ $6.6288 \times 10^{-7}$

FFS ⑤

$C_4$ $2.8169 \times 10^{-2}$   $C_6$ $4.5388 \times 10^{-4}$   $C_{11}$ $-4.5848 \times 10^{-4}$
$C_{13}$ $-8.7689 \times 10^{-5}$   $C_{15}$ $-8.8053 \times 10^{-6}$ -continued

| Displacement and tilt (1) | | | | | |
|---|---|---|---|---|---|
| X | 0.00 | Y | 17.47 | Z | 30.07 |
| α | −1.32 | β | 0.00 | γ | 0.00 |
| Displacement and tilt (2) | | | | | |
| X | 0.00 | Y | 0.39 | Z | 38.40 |
| α | −28.76 | β | 0.00 | γ | 0.00 |
| Displacement and tilt (3) | | | | | |
| X | 0.00 | Y | 30.09 | Z | 31.35 |
| α | 36.81 | β | 0.00 | γ | 0.00 |
| Displacement and tilt (4) | | | | | |
| X | 0.00 | Y | 19.88 | Z | 6.67 |
| α | −15.86 | β | 0.00 | γ | 0.00 |
| Displacement and tilt (5) | | | | | |
| X | 0.00 | Y | 19.88 | Z | −6.67 |
| α | 15.86 | β | 0.00 | γ | 0.00 |
| Displacement and tilt (6) | | | | | |
| X | 0.00 | Y | 29.00 | Z | 0.00 |
| α | 90.00 | β | 0.00 | γ | 0.00 |
| Displacement and tilt (7) | | | | | |
| X | 0.00 | Y | 0.00 | Z | 1.82 |
| α | 0.00 | β | 0.00 | γ | 0.00 |

FIGS. 34, 35, 36, 37 and 38 are aberrational diagrams showing lateral aberrations in the above-described Examples 16, 20, 22, 29 and 30. In the diagrams showing lateral aberrations, the numerals in the parentheses denote (horizontal field angle, vertical field angle), and lateral aberrations at the field angles are shown.

It should be noted that the values of the conditions (4) and (6), which will be described later, in the above-described Examples 16 to 28 are as follows:

| | Condition (4) $\theta_1$ (°) | Condition (6) $\Sigma D_1$ (mm) |
|---|---|---|
| Example 16 | 22.5 | 119.4 |
| Example 17 | 41.0 | 57.7 |
| Example 18 | 37.2 | 62.5 |
| Example 19 | 22.0 | 33.4 |
| Example 20 | 26.1 | 99.4 |
| Example 21 | 18.8 | 92.7 |
| Example 22 | 25.6 | 95.7 |
| Example 23 | 41.2 | 58.3 |
| Example 24 | 36.6 | 50.1 |
| Example 25 | 22.7 | 70.4 |
| Example 26 | 20.4 | 78.5 |
| Example 27 | 43.8 | 56.2 |
| Example 28 | 31.2 | 117.5 |

Next, the values concerning the conditions (1) to (3) in the above-described Examples 29 and 30 are as follows:

| | | Example 29 | Example 30 |
|---|---|---|---|
| Condition (1) | α | 43° ≦ α ≦ 54° | 43° ≦ α ≦ 58° |
| Condition (2) | β | 19° | 18° |
| Condition (3) | D | 27.5 mm | 31 mm |
| | L | 72 mm | 72 mm |
| | D/L | 0.38 | 0.43 |

It should be noted that the free-form surfaces in the above-described Examples 16 to 30 may be replaced with spherical surfaces including plane surfaces, aspherical surfaces, anamorphic surfaces, or anamorphic aspherical surfaces.

Regarding the optical system of the image display apparatus according to the present invention as stated above, when a ray passing through the center of the image displayed by the image display device 3 and further passing through the center of a right-hand pupil 4R formed by the ocular prism 2R for the right eye is defined as a right-hand optical axis, and a ray passing through the center of the image displayed by the image display device 3 and further passing through the center of a left-hand pupil 4L formed by the ocular prism 2L for the left eye is defined as a left-hand optical axis, it is desirable to satisfy the following condition:

$$10° < \theta_1 < 60° \quad (4)$$

where $\theta_1$ is the absolute value of the angle formed between each of the right-hand optical axis and the left-hand optical axis, which enter the ocular prism 2R for the right eye and the ocular prism 2L for the left eye from the optical path distributing mirror 1 or the optical path distributing prism 10, and the display surface of the image display device 3.

The condition (4) limits the angle formed between the axial principal ray entering the ocular prisms 2R and 2L from the optical path distributing means, which comprises the optical path distributing mirror 1 or the optical path distributing prism 10, and the image display device 3.

If $\theta_1$ is not larger than the lower limit of the above condition (4), i.e. 10°, the axial principal ray entering the ocular prisms from the optical path distributing means undesirably forms an optical path approximately parallel to the image display device. Consequently, it becomes difficult to ensure the left and right optical paths. Accordingly, it becomes necessary to use a half-mirror in order to distribute the optical path from a single image display device, e.g. an LCD, to the left and right ocular prisms. The use of a half-mirror results in an unfavorably dark image. If $\theta_1$ is not smaller than the upper limit of the condition (4), i.e. 60°, it is necessary to tilt each ocular prism to a considerable extent or to increase the size of the prism itself. Consequently, it becomes impossible to attain a compact and lightweight optical system.

It is more desirable for the above condition to be the following condition (5):

$$15° < \theta_1 < 50° \quad (5)$$

If the angle $\theta_1$ is within the range defined by the above condition, it is possible to attain a further reduction in size of the apparatus while ensuring the left and right optical paths.

Further, when the distance from the image display device 3 to each of the entrance surface 21R of the ocular prism 2R for the right eye and the entrance surface 21L of the ocular prism 2L for the left eye along the optical axis is denoted by $\Sigma D_1$, it is desirable to satisfy the following condition:

$$20 \text{ mm} < \Sigma D_1 < 150 \text{ mm} \quad (6)$$

The above condition (6) is a condition for attaining a reduction in size of the apparatus, which defines the optical path length of the axial principal ray from the image display device 3 to each of the ocular prisms 2R and 2L.

If $\Sigma D_1$ is not larger than the lower limit of the above condition (6), i.e. 20 mm, the power of each surface of the optical path distributing means becomes extremely strong. Consequently, it becomes impossible to favorably correct decentration aberrations, particularly decentration comatic aberration. In addition, the angle between the image display device 3 and the rays (principal ray tilt angle) becomes extremely large, which is unfavorable. If $\Sigma D_1$ is not smaller than the upper limit of the condition (6), i.e. 150 mm, the optical path distributing means becomes large in size and projects to a considerable extent in comparison to the ocular prisms, unfavorably.

It is more desirable for the above condition to be the following condition (7):

$$30 \text{ mm} < \Sigma D_1 < 130 \text{ mm} \quad (7)$$

If $\Sigma D_1$ is within the range defined by the above condition, it is possible to attain a further reduction in size of the apparatus while maintaining the favorable performance.

It is even more desirable for the above condition to be the following condition (8):

$$45 \text{ mm} < \Sigma D_1 < 120 \text{ mm} \quad (8)$$

If $\Sigma D_1$ is within the range defined by the above condition, it is possible to attain a further reduction in size of the apparatus while maintaining the favorable performance.

Figure 39:
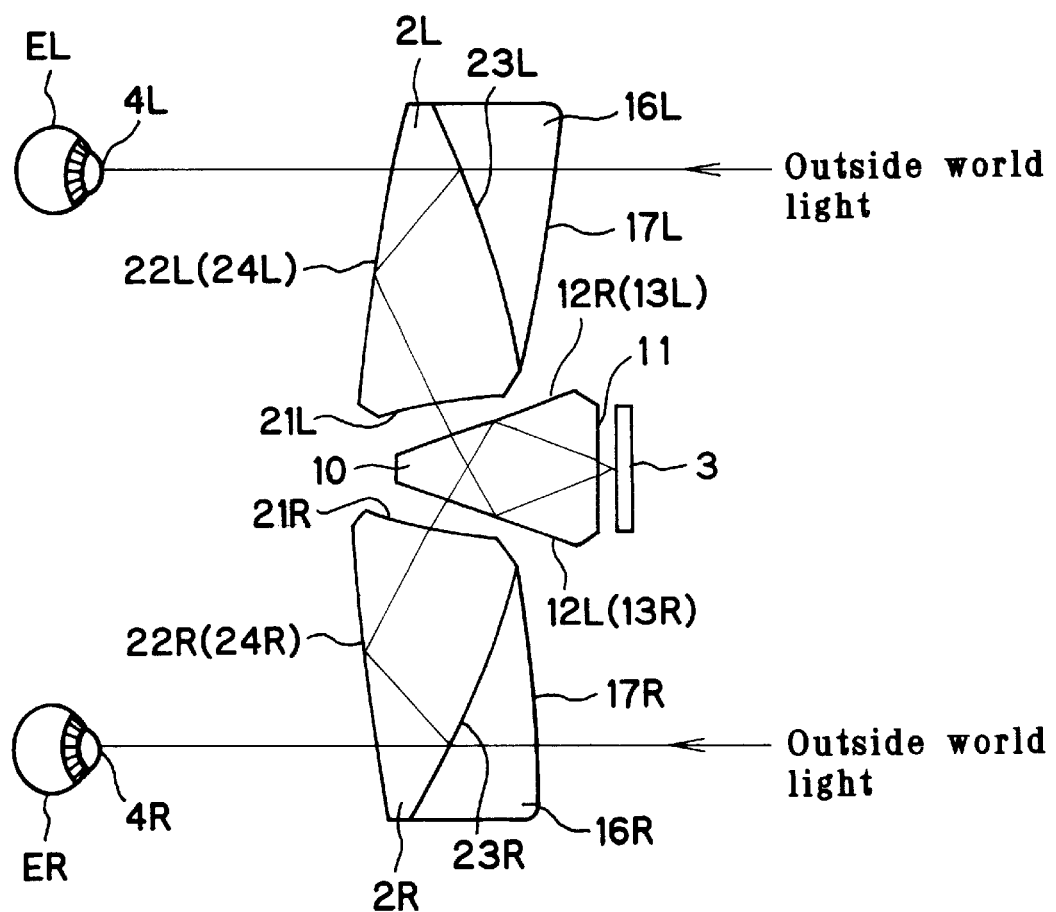
FIG. 39 is a diagram for describing an arrangement of the image display apparatus according to the present invention when arranged to allow see-through observation.

In the above-described optical system of the image display apparatus according to the present invention, it is possible to perform see-through observation of the outside world by bonding, as shown for example in FIG. 39, compensating prisms 16L and 16R to the reflecting surfaces 23L and 23R (in the case of FIG. 26, the reflecting surfaces 22L and 22R; in the case of FIG. 27, 22L, 22R, 24R and 24R; and in the case of FIG. 28, 23L and 23R) of the decentered prism members 2L and 2R for the left and right eyes on the outside-world sides thereof (on the sides thereof remote from the observer's face) or placing the compensating prisms 16L and 16R at a slight distance from the reflecting surfaces 23L and 23R as half-mirror surfaces for compensating for bending of the optical paths and further forming the outside world-side surfaces 17L and 17R of the compensating prisms 16L and 16R so that the surfaces 17L and 17R have approximately the same configurations as those of the observer's face-side transmitting surfaces 24L and 24R, respectively (in the case of FIG. 26, the transmitting surfaces 23L and 23R; in the case of FIG. 27, 25L and 25R; and in the case of FIG. 28, 24L and 24R) of the decentered prism members 2L and 2R for the left and right eyes, thereby allowing light from the outside world to pass approximately in straight lines. In this case, superimposing function or see-through function can be added by placing means for changing the transmittance of light from the outside world, e.g. a liquid crystal shutter, on the outside world side of the compensating prisms 16L and 16R.

In the present invention, a transmission type or reflection type LCD (liquid crystal display device) can be used as the image display device 3, as stated above. However, the use of a self-emission type panel makes it possible to simplify the structure and hence possible to construct a lightweight image display apparatus. The use of an LCD as the image display device 3 involves the problem that an illuminating light source, e.g. a backlight, is needed, and the problem that an LCD invariably needs a polarizer, and only a half of illuminating light can be used for display.

Therefore, it is desirable to use a self-emission type panel (display). Examples of self-emission panels include OLEDs (Organic Light Emitting Diodes), LEDs (Light Emitting Diodes), and an EL (Electroluminescence) panel having a structure such as that illustrated in FIG. 40.

Figure 40:
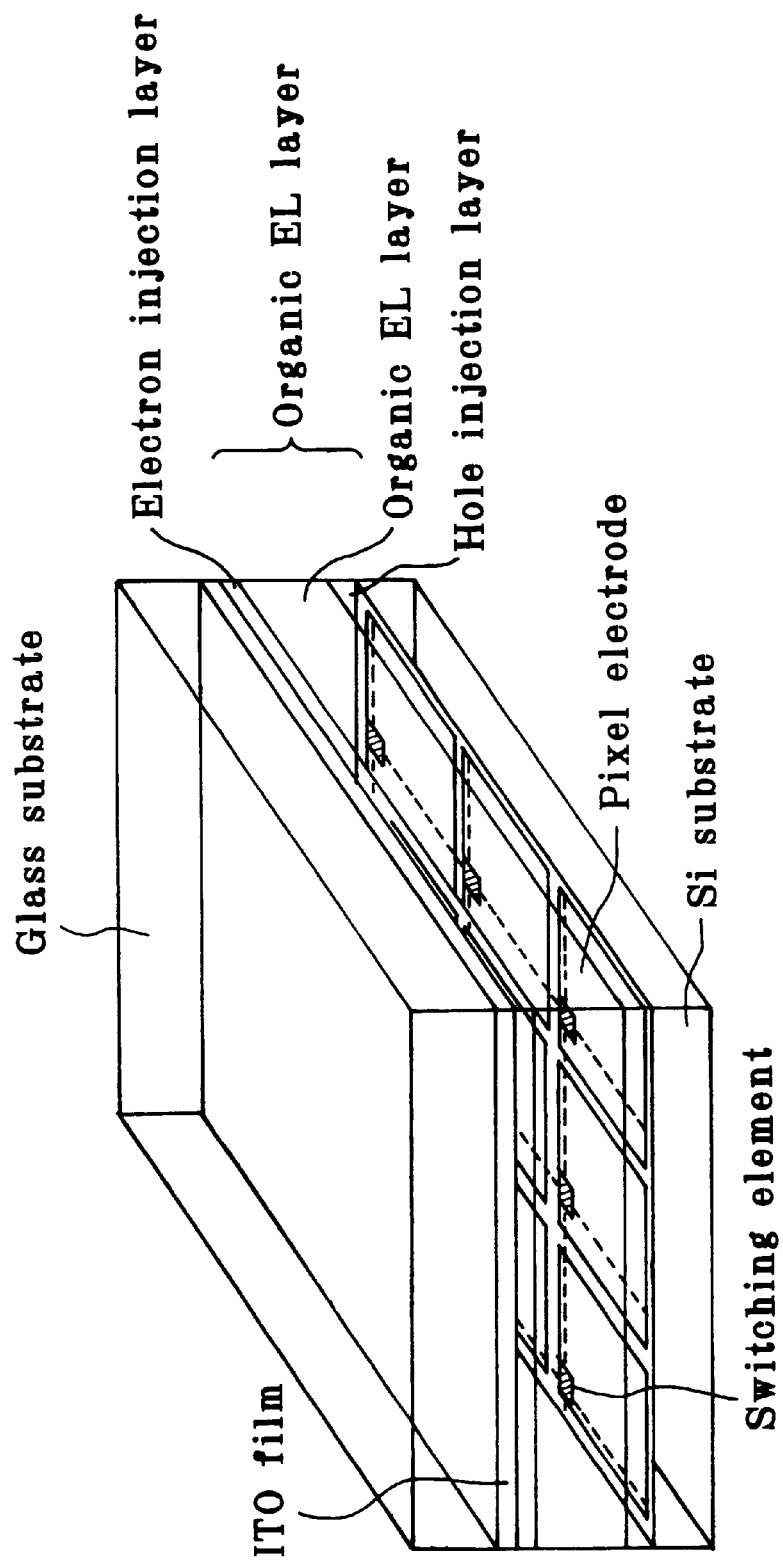
FIG. 40 is a perspective view illustrating the structure of an organic EL image display device.

FIG. 40 shows the structure of an organic EL comprising three layers. An organic EL layer comprising three layers, i.e. a hole injection layer, an organic EL layer, and an electron injection layer, is sandwiched between pixel electrodes provided on an Si substrate and having a switching element placed for each pixel and an ITO film provided on the lower surface of a glass substrate as a common electrode. When a voltage is applied between the ITO film and the pixel electrodes by the action of the switching elements, holes are injected into the organic EL layer from the hole injection layer and electrons are injected into the organic EL layer from the electron injection layer. The holes and the electrons recombine in the organic EL layer, causing the portions of the organic EL layer corresponding to the pixels to emit light. Thus, the desired image is displayed.

The advantage of the use of such a light-emission type display in the image display apparatus lies in its excellent viewing angle characteristics. In particular, in a head-mounted image display apparatus (HMD) designed for observation with two eyes, the pupils of the optical systems and the observer's pupils may be displaced with respect to each other owing to a difference in interpupillary distance among observers or displacement of the HMD body. In order to prevent the image for observation from darkening even when the observer's pupils are displaced, it is important to make the pupils of the optical systems free from aberrations over a wide range. Even if the optical systems are designed so that the pupils are widened, when the pupils are displaced, the observer is placed under conditions where he or she views the image display device obliquely through the ocular optical systems. In general, image display devices using LCD are inferior in viewing angle characteristics when viewed obliquely. That is, it is possible to view only an image for observation that is reduced in contrast or undesirably tone-reversed. Accordingly, the brightness and contrast of the image field undesirably vary according to the fitting position of the HMD, and it is difficult to view the image with stable image quality. With a light-emission type image display device, such problems are unlikely to occur, and it is therefore favorable for use as an image display device for an HMD.

Figure 41:
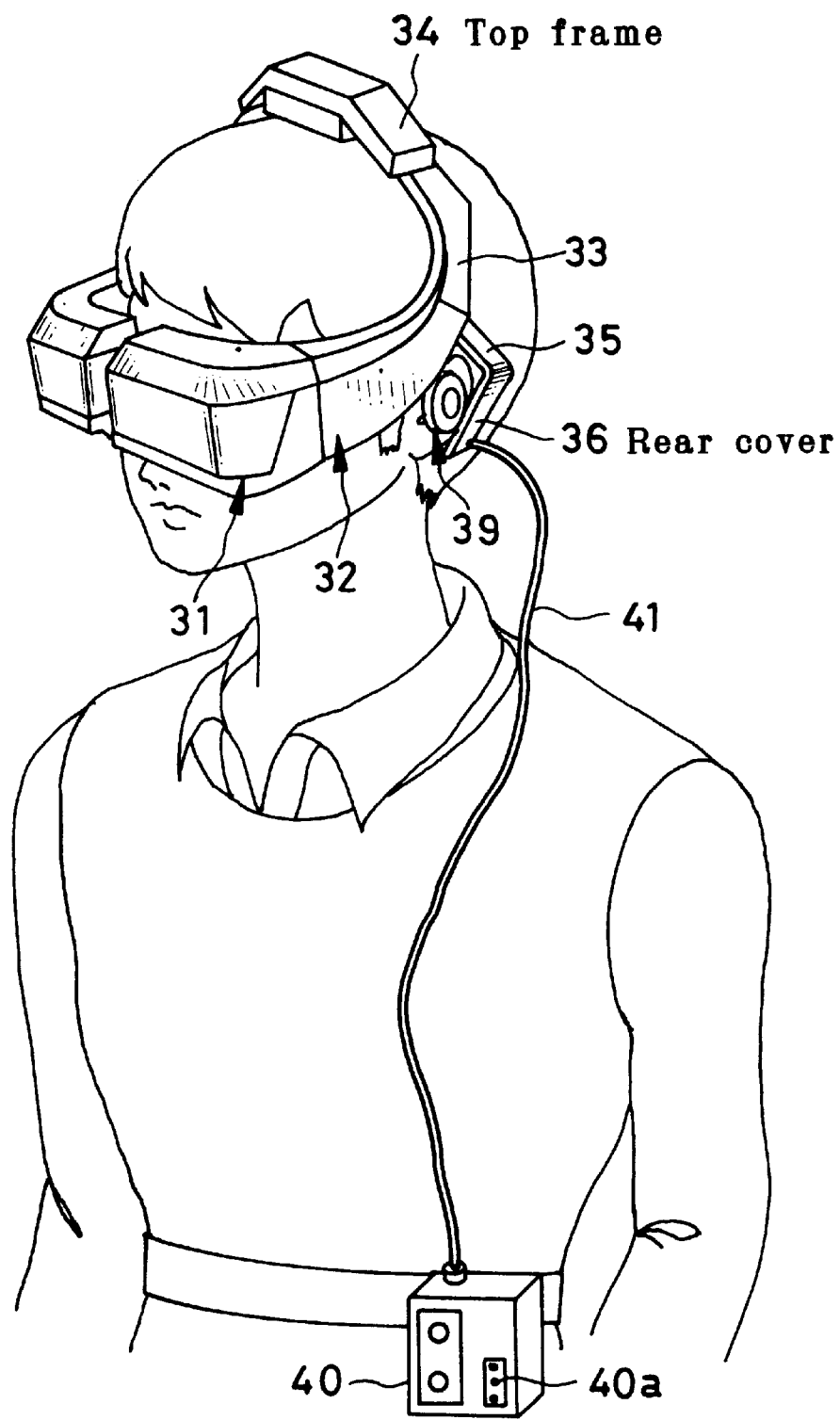
FIG. 41 is a view showing the way in which the image display apparatus according to the present invention is fitted on an observer's head.

Incidentally, it is possible to form a stationary or portable image display apparatus by preparing and supporting one set of image display apparatus according to the present invention arranged as stated above. FIG. 41 shows the image display apparatus. In FIG. 41, reference numeral 31 denotes a display apparatus body unit, which is fixed by a support member through the observer's head so that the display apparatus body unit 31 is held in front of both the observer's eyes. The support member has a pair of front frames 32 (left and right) each joined at one end thereof to the display apparatus body unit 31. The left and right front frames 32 extend from the observer's temples to the upper portions of his/her ears, respectively. A pair of rear frames 33 (left and right) are joined to the other ends of the front frames 32, respectively, and extend over the side portions of the observer's head. Alternatively, the support member further has a top frame 34 joined at both ends thereof to the other ends of the left and right rear frames 33, respectively, so that the top frame 34 supports the top of the observer's head.

A rear plate 35 is joined to one front frame 32 near the joint to the rear frame 33. The rear plate 35 is formed from an elastic member, e.g. a metal leaf spring. A rear cover 36, which constitutes a part of the support member, is joined to the rear plate 35 so that the rear cover 36 can support the apparatus at a position behind the observer's ear in a region extending from the back part of the head to the base of the neck. A speaker 39 is mounted inside the rear plate 35 or the rear cover 36 at a position corresponding to the observer's ear.

A cable 41 for transmitting external image and sound signals is led out from the display apparatus body unit 31.

The cable 41 extends through the top frame 34, the rear frames 33, the front frames 32 and the rear plate 35 and projects to the outside from the rear end of the rear plate 35 or the rear cover 36. The cable 41 is connected to a video-replaying unit 40. It should be noted that reference numeral 40a in the figure denotes a switch and volume control part of the video-replaying unit 40.

The cable 41 may have a jack and plug arrangement attached to the distal end thereof so that the cable 41 can be connected to an existing video deck or the like. The cable 41 may also be connected to a TV signal-receiving tuner so as to enable the user to enjoy watching TV. Alternatively, the cable 41 may be connected to a computer to receive computer graphic images or message images or the like from the computer. To eliminate the bothersome cord, the apparatus may be arranged to receive external radio signals through an antenna connected thereto.

As will be clear from the foregoing description, it is possible according to the present invention to provide an image display apparatus, e.g. a head-mounted image display apparatus, in which an image from a single image display device is led to two eyes without using a half-mirror, thereby allowing observation of a bright image, and in which an optical path distributing mirror or an optical path distributing prism placed at the middle between the two eyes facilitates the correction of various aberrations. In addition, it is possible to obtain an illuminating arrangement which is the most suitable for observation of a single panel with two eyes and which can be used without the need to switch the display image for the left and right.

What we claim is:

1. An image display apparatus comprising
   an image display device for displaying an image to be observed by an observer, an optical path distributing mirror for distributing said image to an optical path for a right eye and an optical path for a left eye, an ocular prism for the right eye that is placed on the right-hand side of said optical path distributing mirror, and an ocular prism for the left eye that is placed on a left-hand side of said optical path distributing mirror,
   said optical path distributing mirror having a mirror surface placed to face said image display device to reflect a display light beam emanating from said image display device so as to distribute the display light beam to said ocular prism for the right eye and to said ocular prism for the left eye, said mirror surface having a rotationally asymmetric curved surface configuration that corrects decentration aberrations,
   said ocular prism for the right eye having a first surface through which the light beam of the optical path for the right eye reflected by said optical path distributing mirror enters the prism, a second surface which reflects the light beam of the optical path for the right eye within the prism, and a third surface through which the light beam of the optical path for the right eye exits from the prism,
   said ocular prism for the left eye having a first surface through which the light beam of the optical path for the left eye reflected by said optical path distributing mirror enters the prism, a second surface which reflects the light beam of the optical path for the left eye within the prism, and a third surface through which the light beam of the optical path for the left eye exits from the prism, and
   said optical path distributing mirror being constructed and arranged such that upon being reflected at the mirror surface of said optical path distributing mirror, a light beam incident on said ocular prism for the right eye and a light beam incident on said ocular prism for the left eye cross each other before entering said ocular prisms from said mirror surface,
   wherein at least the second surface of said ocular prism for the right eye, which is a reflecting surface, and the second surface of said ocular prism for the left eye, which is a reflecting surface, have rotationally asymmetric curved surface configuration that corrects decentration aberrations, and
   wherein said ocular prism for the right eye and said ocular prism for the left eye: are disposed symmetrically with respect to a plane of symmetry, and said mirror surface of said optical path-distributing mirror is symmetric with respect to said plane of symmetry.

2. An image display apparatus according to claim 1, wherein the rotationally asymmetric curved surface configuration of said optical path distributing mirror is a free-form surface having only one plane of symmetry.

3. An image display apparatus according to claim 2, wherein the free-form surface of said optical path distributing mirror has said only one plane of symmetry in a plane (YZ plane) connecting a center of the image displayed by said image display device and a center of a right hand pupil formed by said ocular prism for the right eye and further a center of a left hand pupil formed by said ocular prism for the left eye.

4. An image display apparatus according to any one of claims 1 to 3, wherein said image display device is placed between said optical path distributing mirror and said observer in a longitudinal direction (Z-direction) and between said ocular prism for the right eye and said ocular prism for the left eye in a lateral direction (Y-direction).

5. An image display apparatus according to any one of claims 1 to 3, wherein a negative lens that gives a negative power to a light beam is placed between said image display device and said optical path distributing mirror.

6. An image display apparatus according to any one of claims 1 to 3, wherein said ocular prism for the right eye is arranged so that a light beam exiting from said optical path distributing mirror and entering the prism through said first surface is made incident on said third surface at an angle larger than a total reflection critical angle so as to be reflected toward said second surface within the prism by total reflection, and the light beam reflected from said second surface is made incident on said third surface at an angle smaller than the total reflection critical angle so as to pass through said third surface to exit from the prism, and
   wherein said ocular prism for the left eye is arranged so that a light beam exiting from said optical path distributing mirror and entering the prism through said first surface is made incident on said third surface at an angle larger than a total reflection critical angle so as to be reflected toward said second surface within the prism by total reflection, and the light beam reflected from said second surface is made incident on said third surface at an angle smaller than the total reflection critical angle so as to pass through said third surface to exit from the prism.

7. An image display apparatus according to any one of claims 1 to 3, wherein said first surface of said ocular prism for the right eye has a rotationally asymmetric curved surface configuration that corrects decentration aberrations, and
   wherein said first surface of said ocular prism for the left eye has a rotationally asymmetric curved surface configuration that corrects decentration aberrations.

8. An image display apparatus according to claim 7, wherein the rotationally asymmetric curved surface configuration of said first surface of said ocular prism for the right eye is a free-form surface having only one plane of symmetry, and wherein the rotationally asymmetric curved surface configuration of said first surface of said ocular prism for the left eye is a free form surface having only one plane of symmetry.

9. An image display apparatus according to claim 8, wherein when a light ray passing through a center of the image displayed by said image display device and further passing through a center of a right-hand pupil formed by said ocular prism for the right eye is defined as an optical axis, the free form surface of said first surface of said ocular prism for the right eye has said only one plane of symmetry in a plane (YZ-plane) containing the optical axis in a folded optical path within the prism, and wherein when a light ray passing through the center of the image displayed by said image display device and further passing through a center of a right-hand pupil formed by said ocular prism for the left eye is defined as an optical axis, the free-form surface of said first surface of said ocular prism for the left eye has said only one plane of symmetry in a plane (YZ-plane) containing the optical axis in a folded optical path within the prism.

10. An image display apparatus according to any one of claims 1 to 3, wherein said third surface of said ocular prism for the right eye has a rotationally asymmetric curved surface configuration that corrects decentration aberrations, and wherein said third surface of said ocular prism for the left eye has a rotationally asymmetric curved surface configuration that corrects decentration aberrations.

11. An image display apparatus according to claim 10, wherein the rotationally asymmetric curved surface configuration of said third surface of said ocular prism for the right eye is a free form surface having only one plane of symmetry, and wherein the rotationally asymmetric curved surface configuration of said third surface of said ocular prism for the left eye is a free form surface having only one plane of symmetry.

12. An image display apparatus according to claim 11, wherein when a light ray passing through a center of the image displayed by said image display device and further passing through a center of a right hand pupil formed by said ocular prism for the right eye is defined as an optical axis, the free form surface of said third surface of said ocular prism for the right eye has said only one plane of symmetry in a plane (YZ plane) containing the optical axis in a folded optical path within the prism, and wherein when a light ray passing through the center of the image displayed by said image display device and further passing through a center of a right-hand pupil formed by said ocular prism for the left eye is defined as an optical axis, the free-form surface of said third surface of said ocular prism for the left eye has said only one plane of symmetry in a plane (YZ-plane) containing the optical axis in a folded optical path within the prism.

13. An image display apparatus according to any one of claims 1 to 3, wherein said third surface of said ocular prism for the right eye is a rotationally symmetric aspherical surface, and wherein said third surface of said ocular prism for the left eye is a rotationally symmetric aspherical surface.

14. An image display apparatus comprising an image display device for displaying an image to be observed by an observer, an optical path distributing prism for distributing said image to an optical path for a right eye and an optical path for a left eye, an ocular prism for the right eye that is placed on a right-hand side of said optical path distributing prism, and an ocular prism for the left eye that is placed on a left-hand side of said optical path distributing prism, said optical path distributing prism having at least a first surface placed to face said image display device so that a display light beam emanating from said image display device enters the prism through the first surface, a second-first surface which reflects said optical path for the right eye entering through said first surface, a second-second surface which reflects said optical path for the left eye entering through said first surface, a third-first surface through which the light beam of said optical path for the right eye exits from the prism, and a third-second surface through which the light beam of said optical path for the left eye exits from the prism, said optical path distributing prism being arranged so that at least said second-first surface and said second-second surface have a curved surface configuration that gives a power to a light beam to form a relay image for the right eye from the image displayed by said image display device in said optical path for the right eye and to form a relay image for the left eye from the image displayed by said image display device in said optical path for the left eye, and said second-first surface and said second-second surface having the same surface configuration, said ocular prism for the right eye having a first surface through which the light beam of the optical path for the right eye exiting from said third-first surface of said optical path distributing prism enters the prism, a second surface which reflects the light beam of the optical path for the right eye within the prism, and a third surface through which the light beam of the optical path for the right eye exits from the prism, said ocular prism for the left eye having a first surface through which the light beam of the optical path for the left eye exiting from said third-second surface of said optical path distributing prism enters the prism, a second surface which reflects the light beam of the optical path for the left eye within the prism, and a third surface through which the light beam of the optical path for the left eye exits from the prism, and said optical path distributing prism being constructed and arranged such that upon being reflected at said second-first surface and said second-second surface of said optical path distributing prism, respectively, a light beam incident on said ocular prism for the right eye and a light beam incident on said ocular prism for the left eve cross each other before entering said ocular prisms from said second-first and said second-second surfaces, wherein at least said second surface of said ocular prism for the right eye, which is a reflecting surface, and said second surface of said ocular prism for the left eye, which is a reflecting surface, have a rotationally asymmetric curved surface configuration that corrects decentration aberrations, and wherein said ocular prism for the right eye and said ocular prism for the left eye are located symmetrically with respect to a plane of symmetry, and said second-first surface and said second-second surface of said optical path-distributing prism are symmetrical with respect to the plane of symmetry.

15. An image display apparatus according to claim 14, wherein the third-first surface and third-second surface of said optical path distributing prism are curved surfaces of a same configuration.

16. An image display apparatus according to claim 14, wherein the first surface, second-first surface, second-second surface, third-first surface and third-second surface of said optical path distributing prism form optical surfaces of the prism as surfaces which are independent of each other, and wherein the second-first surface, second-second surface, third-first surface and third-second surface of said optical path distributing prism have a rotationally asymmetric curved surface configuration that corrects decentration aberrations.

17. An image display apparatus according to claim 15, wherein the curved surface configuration of the third-first surface and third second surface of said optical path distributing prism is a rotationally asymmetric curved surface configuration that corrects decentration aberrations.

18. An image display apparatus according to claim 15, wherein the curved surface configuration of each of the second-first surface, second-second surface, third-first surface and third-second surface of said optical path distributing prism is a rotationally asymmetric curved surface configuration that corrects decentration aberrations.

19. An image display apparatus according to any one of claims 15 to 18, wherein said image display device and said optical path distributing prism are placed to face each other, said optical path distributing prism being arranged so that, according as a distance from said image display device increases in a longitudinal direction (Z-direction), said first surface is located first, and then said second-first surface and said second-second surface are disposed at left and right positions facing each other across a medium, and then said third-first surface and said third-second surface are located, wherein said third-first surface is disposed at a position facing the first surface of said ocular prism for the right eye across an air spacing, and said third-second surface is disposed at a position facing the first surface of said ocular prism for the left eye across an air spacing.

20. An image display apparatus according to any one of claims 15 to 18, wherein said image display device and said optical path distributing prism are placed to face each other, said optical path distributing prism being arranged so that,
according as a distance from said image display device increases in a longitudinal direction (Z direction), said first surface is located first, and then said third-first surface and said third-second surface are disposed at right and left positions facing each other across a medium, and then said second first surface and said second second surface are located, wherein said third-first surface is disposed at a position facing the first surface of said ocular prism for the right eye across an air spacing, and said third second surface is disposed at a position facing the first surface of said ocular prism for the left eye across an air spacing.

21. An image display apparatus according to claim 14, wherein a single surface is used as both said second-first surface and third-second surface of said optical path distributing prism, and a single surface is used as both said second-second surface and third-first surface of said optical path distributing prism, wherein said optical path for the right eye is made incident on the surface used as both said second-first surface and said third-second surface at an angle larger than a total reflection critical angle to reflect the light beam of the optical path for the right eye within the prism by total reflection, and said optical path for the right eye is made incident on the surface used as both said second-second surface and said third-first surface at an angle smaller than the total reflection critical angle to allow the light beam of the optical path for the right eye to exit from the prism, wherein said optical path for the left eye is made incident on the surface used as both the second-second surface and the third-first surface at an angle larger than the total reflection critical angle to reflect the light beam of the optical path for the left eye within the prism by total reflection, and said optical path for the left eye is made incident on the surface used as both the second first surface and the third second surface at an angle smaller than the total reflection critical angle to allow the light beam of the optical path for the left eye to exit from the prism, and wherein the surface used as both said second-first surface and third-second surface has a rotationally asymmetric curved surface configuration that corrects decentration aberrations, and the surface used as both said second-second surface and third-first surface has a rotationally asymmetric curved surface configuration that corrects decentration aberrations.

22. An image display apparatus according to any one of claims 14 to 18, wherein said optical path distributing prism has a fourth surface with a curved surface configuration that reflects light beams of right and left images entering through the first surface toward the second-first surface and the second-second surface, respectively, wherein the first surface, second-first surface, second-second surface, third-first surface, third-second surface and fourth surface of said optical path distributing prism form optical surfaces of the prism as surfaces which are independent of each other.

23. An image display apparatus according to claim 22, wherein the curved surface configuration of the fourth surface of said optical path distributing prism is a rotationally asymmetric curved surface configuration that corrects decentration aberrations.

24. An image display apparatus according to claim 23, wherein said image display device and said optical path distributing prism are placed to face each other, said optical path distributing prism being arranged so that, according as a distance from said image display device increases in a longitudinal direction (Z-direction), said first surface is located first, and then said second-first surface and said second-second surface are disposed at left and right positions facing each other across a medium, and then said third-first surface and said third-second surface are located, said fourth surface being disposed at a position facing said first surface across the medium, wherein said third-first surface is disposed at a position facing the first surface of said ocular prism for the right eye across an air spacing, and said third-second surface is disposed at a position facing the first surface of said ocular prism for the left eye across an air spacing.

25. An image display apparatus according to any one of claims 14 to 18, wherein said optical path distributing prism has a fourth-first surface which reflects the optical path for the right eye entering through the first surface toward the second-first surface, and a fourth-second surface which reflects the optical path for the left eye entering through the first surface toward the second-second surface, wherein the first surface, second-first surface, second-second surface, third-first surface, third-second surface, fourth-first surface and fourth-second surface of said optical path distributing prism form optical surfaces of the prism as surfaces which are independent of each other.

26. An image display apparatus according to claim 25, wherein the fourth-first surface and fourth-second surface of said optical path distributing prism are curved surfaces of a same configuration.

27. An image display apparatus according to claim 26, wherein the curved surface configuration of the fourth-first surface and fourth-second surface of said optical path distributing prism is a rotationally asymmetric curved surface configuration that corrects decentration aberrations.

28. An image display apparatus according to claim 27, wherein said image display device and said optical path distributing prism are placed to face each other, said optical path distributing prism being arranged so that, according as a distance from said image display device increases in a longitudinal direction (Z-direction), said first surface is located first, and then said second-first surface and said second-second surface are disposed at left and right positions, respectively, facing each other across a medium, and then said third-second surface and said third-first surface are disposed at left and right positions, respectively, facing each other across the medium, and then the fourth-first surface and the fourth-second surface are disposed adjacently to each other at respective positions facing said first surface across the medium.

29. An image display apparatus according to any one of claims 14 to 18, wherein said first surface of said optical path distributing prism has a rotationally asymmetric curved surface configuration that corrects decentration aberrations.

30. An image display apparatus according to any one of claims 14 to 18, wherein the rotationally asymmetric curved surface of said optical path distributing prism is a free-form surface having only one plane of symmetry.

31. An image display apparatus according to claim 30, wherein the free-form surface of said optical path distributing prism has said only one plane of symmetry in a plane (YZ-plane) connecting a center of the image displayed by said image display device and a center of a pupil.

32. An image display apparatus according to any one of claims 14 to 18, wherein said ocular prism for the right eye is arranged so that a light beam exiting from said optical path distributing prism and entering the prism through said first surface is made incident on said third surface at an angle larger than a total reflection critical angle so as to be reflected toward said second surface within the prism by total reflection, and the light beam reflected from said second surface is made incident on said third surface at an angle smaller than the total reflection critical angle so as to pass through said third surface to exit from the prism, and wherein said ocular prism for the left eye is arranged so that a light beam exiting from said optical path distributing prism and entering the prism through said first surface is made incident on said third surface at an angle larger than a total reflection critical angle so as to be reflected toward said second surface within the prism by total reflection, and the light beam reflected from said second surface is made incident on said third surface at an angle smaller than the total reflection critical angle so as to pass through said third surface to exit from the prism.

33. An image display apparatus according to any one of claims 14 to 18, wherein said ocular prism for the right eye is arranged so that a light beam exiting from said optical path distributing prism and entering the prism through said first surface is reflected by said second surface, and the light beam reflected from said second surface passes through said third surface to exit from the prism, and wherein said ocular prism for the left eye is arranged to that alight beam exiting from said optical path distributing prism and entering the prism through said first surface is reflected by said second surface, and the light beam reflected from said second surface passes through said third surface to exit from the prism.

34. An image display apparatus according to any one of claims 14 to 18, wherein said ocular prism for the right eye has a fourth surface which reflects a light beam within the prism, said ocular prism for the right eye being arranged so that a light beam exiting from said optical path distributing prism and entering the prism through said first surface is reflected by said fourth surface, and the light beam reflected from said fourth surface is made incident on said third surface at an angle larger than a total reflection critical angle so as to be reflected toward said second surface within the prism by total reflection, and further the light beam reflected from said second surface is made incident on said third surface at an angle smaller than the total reflection critical angle so as to pass through said third surface to exit from the prism, and wherein said ocular prism for the left eye has fourth surface which reflects a light beam within the prism, said ocular prism for the left eye being arranged so that a light beam exiting from said optical path distributing prism and entering the prism through said first surface is reflected by said fourth surface, and the light beam reflected from said fourth surface is made incident on said third surface at an angle larger than a total reflection critical angle so as to be reflected toward said second surface within the prism by total reflection, and further the light beam reflected from said second surface is made incident on said third surface at an angle smaller than the total reflection critical angle so as to pass through said third surface to exit from the prism.

35. An image display apparatus according to claim 34, wherein the fourth surface of said ocular prism for the right eye has a rotational asymmetric curved surface configuration that corrects decentration aberrations, and wherein the fourth surface of said ocular prism for the left eye has a rotationally asymmetric curved surface configuration that corrects decentration aberrations.

36. An image display apparatus according to any one of claims 14 to 18, wherein the first surface of said ocular prism for the right eye has a rotationally asymmetric curved surface configuration that corrects decentration aberrations, and wherein the first surface of said ocular prism for the left eye has a rotationally asymmetric curved surface configuration that corrects decentration aberrations.

37. An image display apparatus according to any one of claims 14 to 18, wherein the second surface of said ocular prism for the right eye has a rotationally asymmetric curved surface configuration that corrects decentration aberrations, and wherein the second surface of said ocular prism for the left eye has a rotationally asymmetric curved surface configuration that corrects decentration aberrations.

38. An image display apparatus according to any one of claims 14 to 18, wherein the third surface of said ocular prism for the right eye is a rotationally symmetric aspherical surface, and wherein said third surface of said ocular prism for the left eye is a rotationally symmetric aspherical surface.

39. An image display apparatus according to any one of claims 14 to 18, wherein the third surface of said ocular prism for the right eye has a rotationally asymmetric curved surface configuration that corrects decentration aberrations, and wherein the third surface of said ocular prism for the left eye has a rotationally asymmetric curved surface configuration that corrects decentration aberrations.

40. An image display apparatus according to any one of claims 14 to 18, wherein said optical path distributing prism has a positive power as a whole so that said relay image for the right eye is formed at a position closer to the right eye of the observer than said third-first surface on the optical path and said relay image for the left eye is formed at a position closer to the left eye of the observer than said third-second surface on the optical path.

41. An image display apparatus according to claim 40, wherein said optical path distributing prism forms said relay image for the right eye at a position between said third-first surface and the first surface of said ocular prism for the right eye and further forms said relay image for the left eye at a position between said third-second surface and the first surface of said ocular prism for the left eye.

42. An image display apparatus according to any one of claims 14 to 18, wherein an angle a of reflection of display light of the optical path for the right eye from the second-first surface of said optical path distributing prism and an angle α of reflection of display light of the optical path for the left eye from the second-second surface of said optical path distributing prism satisfy the following condition:

$$33° \leq \alpha \leq 70° \quad (1)$$

43. An image display apparatus according to any one of claims 14 to 18, wherein an angle β formed between a plane passing through a center of a line segment connecting a center of an exit pupil for the right eye and a center of an exit pupil for the left eye at right angles to the line segment and a tangent plane to the second-first surface of said optical path distributing prism at a point where the optical axis of the optical path for the right eye is incident on said second-first surface and an angle β formed between the plane passing through the center of the line segment connecting the center of the exit pupil for the right eye and the center of the exit pupil for the left eye at right angles to the line segment and a tangent plane to the second-second surface of said optical path distributing prism at a point where the optical axis of the optical path for the left eye is incident on said second second surface satisfy the following condition:

$$13° \leq \beta \leq 24° \quad (2)$$

44. An image display apparatus according to any one of claims 14 to 18, wherein, in backward ray tracing from a pupil side, a distance between an intersection of a ray passing through a center of an exit pupil for the right eye at a maximum field angle on a right-hand side and the third surface of said ocular prism for the right eye and an intersection of a ray passing through a center of an exit pupil for the left eye at a maximum field angle on a left-hand side and the third surface of said ocular prism for the left eye is defined as a width L, and a distance between a point closest to the left and right exit pupils among points at which bundles of rays passing through the centers of the left and right exit pupils within an overall field angle pass through or are reflected by the third surface of said ocular prism for the right eye or the third surface of said ocular prism for the left eye and a display surface of said image display device in a direction perpendicular to the display surface is defined as a depth D, wherein a ratio of the depth D to the width L, i.e. D/L, satisfies the following condition:

$$0.3 \leq D/L \leq 0.5 \quad (3)$$

45. An image display apparatus according to any one of claims 14 to 18, wherein the second surface of said ocular prism for the right eye is a semitransparent reflecting surface, and a see-through prism for the right eye is placed outside said second surface, and wherein the second surface of said ocular prism for the left eye is a semitransparent reflecting surface, and a see-through prism for the left eye is placed outside said second surface.

46. An image display apparatus comprising an image display device for displaying an image to be observed by an observer, an optical path distributing prism for distributing said image to an optical path for a right eye and an optical path for a left eye, an ocular prism for the right eye that is placed on a right-hand side of said optical path distributing prism, and an ocular prism for the left eye that is placed on a left-hand side of said optical path distributing prism, said optical path distributing prism having at least a first surface placed to face said image display device so that a display light beam emanating from said image display device enters the prism through the first surface, a second-first surface which reflects said optical path for the right eye entering through said first surface, a second-second surface which reflects said optical path for the left eye entering through said first surface, a third-first surface through which the light beam of said optical path for the right eye exits from the prism, and a third-second surface through which the light beam of said optical path for the left eye exits the prism, said optical path distributing prism being arranged so that at least said second-first surface, said second-second surface, said third-first surface and said third-second surface have a curved surface configuration that gives a power to a light beam, and said second-first surface and said second-second surface have a same surface configuration and said third-first surface and said third-second surface have a same surface configuration, said image display device being a reflection type image display device that displays an image by reflecting a light beam from a light source, and said optical path distributing prism being constructed and arranged such that upon being reflected at said second-first surface and said second-second surface of said optical path distributing prism, respectively, a light beam incident on said ocular prism for the right eye and a light beam incident on said ocular prism for the left eye cross each other before entering said ocular prisms from said second-first and said second-second surfaces, wherein both said second-first surface and second-second surface of said optical path distributing prism are either semitransparent reflecting surfaces or partially-transmitting and partially-reflecting surfaces, and wherein an illuminating light source for forming the optical path for the left eye is disposed at a position on a side of said second-first surface remote from a prism medium, and an illuminating light source for forming the optical path for the right eye is disposed at a position on a side of said second-second surface remote from the prism medium, and wherein said ocular prism for the right eye and said ocular prism for the left eye are located symmetrically with respect to a plane of symmetry, and said second-first and second-second surfaces of said optical path-distributing prism are symmetrical with respect to said plane of symmetry.

47. An image display apparatus according to claim 46, wherein both said second-first surface and second-second surface of said optical path distributing prism are formed from half-mirror coatings that divide transmission and reflection in terms of intensity.

48. An image display apparatus according to claim 46, wherein both said second-first surface and second second surface of said optical path distributing prism are formed from mirror coatings each having transmitting holes provided in a reflecting mirror surface.

49. An image display apparatus comprising an image display device for displaying an image to be observed by an observer, an optical path distributing prism for distributing said image to an optical path for a right eye and an optical path for a left eye, an ocular prism for the right eye that is placed on a right-hand side of said optical path distributing prism, and an ocular prism for the left eye that is placed on a left-hand side of said optical path distributing prism, said optical path distributing prism having at least a first surface placed to face said image display device so that a display light beam emanating from said image display device enters the prism through the first surface, a fourth surface placed to face said first surface across a medium so as to reflect light beams of right and left images entering through said first surface in different directions, thereby distributing the light beams to the optical path for the right eye and the optical path for the left eye, a second-first surface which reflects said optical path for the right eye reflected from said fourth surface, a second-second surface which reflects said optical path for the left eye reflected from said fourth surface, a third-first surface through which the light beam of said optical path for the right eye exits from the prism, and a third-second surface through which the light beam of said optical path for the left eye exits from the prism, said optical path distributing prism being arranged so that at least said second-first surface, said second-second surface, said third-first surface, said third-second surface and said fourth surface have a curved surface configuration that gives a power to a light beam, and said second-first surface and said second-second surface have a same surface configuration and said third-first surface and said third-second surface have a same surface configuration, said image display device being a reflection type image display device that displays an image by reflecting a light beam from a light source, and said optical path distributing prism being constructed and arranged such that upon being reflected at said second-first surface and said second-second surface of said optical path distributing prism, respectively, a light beam incident on said ocular prism for the right eye and a light beam incident on said ocular prism for the left eye cross each other before entering said ocular prisms from said second-first and said second-second surfaces, wherein said fourth surface of said optical path distributing prism is either a semitransparent reflecting surface or a partially-transmitting and partially-reflecting surface, and wherein an illuminating light source for forming the optical path for the left eye and an illuminating light source for forming the optical path for the right eye are disposed at respective positions on a side of said fourth surface remote from the prism medium, and wherein said ocular prism for the right eye and said ocular prism for the left eye are located symmetrically with respect to a plane of symmetry, and said second-first and second-second surfaces of said optical path-distributing prism are symmetrical with respect to said plane of symmetry.

50. An image display apparatus according to claim 49, wherein the fourth surface of said optical path distributing prism is formed from a half-mirror coating that divides transmission and reflection in terms of intensity.

51. An image display apparatus according to claim 49, wherein the fourth surface of said optical path distributing prism is formed from a mirror coating having transmitting holes provided in a reflecting mirror surface.

52. An image display apparatus comprising an image display device for displaying an image to be observed by an observer, an optical path distributing prism for distributing said image to an optical path for a right eye and an optical path for a left eye, an ocular prism for the right eye that is placed on a right-hand side of said optical path distributing prism, and an ocular prism for the left eye that is placed on a left-hand side of said optical path distributing prism, said optical path distributing prism having a first surface placed to face said image display device so that a display light beam emanating from said image display device enters the prism through the first surface, a second surface wherein said optical path for the right eye is made incident on an optical surface at an angle larger than a total reflection critical angle to reflect a light beam of the optical path for the right eye within the prism by total reflection and said optical path for the left eye is made incident on the optical surface at an angle smaller than the total reflection critical angle to allow a light beam of the optical path for the left eye to exit from the prism, and a third surface wherein said optical path for the left eye is made incident on an optical surface at an angle larger than a total reflection critical angle to reflect the light beam of the optical path for the left eye within the prism by total reflection and said optical path for the right eye is made incident on the optical surface at an angle smaller than the total reflection critical angle to allow the light beam of the optical path for the right eye to exit from the prism, wherein an optical element for display is placed between said image display device and a light source, said optical path distributing prism being arranged so that said second surface and said third surface are curved surfaces of a same configuration that gives a power to a light beam, and said second surface and said third surface are placed to face each other across a prism medium, said image display device being a transmission type image display device that displays an image by transmitting a light beam from a light source, and said optical path distributing prism being constructed and arranged such that upon being reflected at said second surface and said third surface of said optical path distributing prism, respectively, a light beam incident on said ocular prism for the right eye and a light beam incident on said ocular prism for the left eye cross each other before entering said ocular prisms from said second and said third surfaces, wherein an illuminating light source for forming the optical path for the left eye and an illuminating light source for forming the optical path for the right eye are disposed at respective positions on a side of said image display device remote from said optical element for display, and wherein said ocular prism for the right eye and said ocular prism for the left eye are located symmetrically with respect to a plane of symmetry, and said second and third surfaces of said optical path-distributing prism are symmetrical with respect to said plane of symmetry.

53. An image display apparatus according to claim 52, wherein said optical element for display is a Fresnel lens.

54. An image display apparatus comprising a single image display device for displaying an image to be observed by an observer, an optical path distributing mirror for simultaneously distributing said image to an optical path for a right eye and an optical path for a left eye, an ocular prism for the right eye that is placed on the right-hand side of said optical path distributing mirror, and an ocular prism for the left eye that is placed on a left-hand side of said optical path distributing mirror, said image display device being located between said ocular prism for the right eye and said ocular prism for the left eye, said optical path distributing mirror having a mirror surface placed to face said image display device to reflect a display light beam emanating from said image display device so as to distribute the display light beam to said ocular prism for the right eye and said prism for the left eye, said mirror surface having a rotationally asymmetric curved surface configuration that corrects decentration aberrations, said ocular prism for the right eye having a first surface through which the light beam of the optical path for the right eye reflected by said optical path distributing mirror enters the prism, a second surface which reflects the light beam of the optical path for the right eye within the prism, and a third surface through which the light beam of the optical path for the right eye exits from the prism, said ocular prism for the left eye having a first surface through which the light beam of the optical path for the left eye reflected by said optical path distributing mirror enters the prism, a second surface which reflects the light beam of the optical path for the left eye within the prism, and a third surface through which the light beam of the optical path for the left eye exits from the prism, wherein at least the second surface of said ocular prism for the right eye, which is a reflecting surface, and the second surface of said ocular prism for the left eye, which is a reflecting surface, have rotationally asymmetric curved surface configuration that corrects decentration aberrations, and wherein said ocular prism for the right eye and said ocular prism for the left eye are disposed symmetrically with respect to a plane of symmetry, and said mirror surface of said optical path-distributing mirror is symmetric with respect to said plane of symmetry.

55. An image display apparatus comprising a single image display device for displaying an image to be observed by an observer, an optical path distributing prism for simultaneously distributing said image to an optical path for a right eye and an optical path for a left eye, an ocular prism for the right eye that is placed on a right-hand side of said optical path distributing prism, and an ocular prism for the left eye that is placed on a left-hand side of said optical path distributing prism, said image display device being located between said ocular prism for the left eye and said ocular prism for the right eye, said optical path distributing prism having at least a first surface placed to face said image display device so that a display light beam emanating from said image display device enters the prism through the first surface, a second-first surface which reflects said optical path for the right eye entering through said first surface, a second-second surface which reflects said optical path for the left eye entering through said first surface, a third-first surface through which the light beam of said optical path for the right eye exits from the prism, and a third-second surface through which the light beam of said optical path for the left eye exits from the prism, said optical path distributing prism being arranged so that at least said second-first surface and said second-second surface have a curved surface configuration that gives a power to a light beam to form a relay image for the right eye from the image displayed by said image display device in said optical path for the right eye and to form a relay image for the left eye from the image displayed by said image display device in said optical path for the left eye, and said second-first surface and said second-second surface having the same surface configuration, said ocular prism for the right eye having a first surface through which the light beam of the optical path for the right eye exiting from said third-first surface of said optical path distributing prism enters the prism, a second surface which reflects the light beam of the optical path for the right eye within the prism, and a third surface through which the light beam of the optical path for the right eye exits from the prism, said ocular prism for the left eye having a first surface through which the light beam of the optical path for the left eye exiting from said third-second surface of said optical path distributing prism enters the prism, a second surface which reflects the light beam of the optical path for the left eye within the prism, and a third surface through which the light beam of the optical path for the left eye exits from the prism, wherein at least said second surface of said ocular prism for the right eye, which is a reflecting surface, and said second surface of said ocular prism for the left eye, which is a reflecting surface, have a rotationally asymmetric curved surface configuration that corrects decentration aberrations, and wherein said ocular prism for the right eye and said ocular prism for the left eye are located symmetrically with respect to a plane of symmetry, and said second-first surface and said second-second surface of said optical path-distributing prism are symmetrical with respect to the plane of symmetry.

56. An image display apparatus comprising a single image display device for displaying an image to be observed by an observer, an optical path distributing prism for simultaneously distributing said image to an optical path for a right eye and an optical path for a left eye, an ocular prism for the right eye that is placed on a right-hand side of said optical path distributing prism, and an ocular prism for the left eye that is placed on a left-hand side of said optical path distributing prism, said image display device being located between said ocular prism for the left eye and said ocular prism for the right eye, said optical path distributing prism having at least a first surface placed to face said image display device so that a display light beam emanating from said image display device enters the prism through the first surface, a second-first surface which reflects said optical path for the right eye entering through said first surface, a second-second surface which reflects said optical path for the left eye entering through said first surface, a third-first surface through which the light beam of said optical path for the right eye exits from the prism, and a third-second surface through which the light beam of said optical path for the left eye exits the prism, said optical path distributing prism being arranged so that at least said second-first surface, said second-second surface, said third-first surface and said third-second surface have a curved surface configuration that gives a power to a light beam, and said second-first surface and said second-second surface have a same surface configuration and said third-first surface and said third-second surface have a same surface configuration, said image display device being a reflection type image display device that displays an image by reflecting a light beam from a light source, wherein both said second-first surface and second-second surface of said optical path distributing prism are either semitransparent reflecting surfaces or partially-transmitting and partially-reflecting surfaces, and wherein an illuminating light source for forming the optical path for the left eye is disposed at a position on a side of said second-first surface remote from a prism medium, and an illuminating light source for forming the optical path for the right eye is disposed at a position on a side of said second-second surface remote from the prism medium, and wherein said ocular prism for the right eye and said ocular prism for the left eye are located symmetrically with respect to a plane of symmetry, and said second-first and second-second surfaces of said optical path-distributing prism are symmetrical with respect to said plane of symmetry.

57. An image display apparatus comprising a single image display device for simultaneously displaying an image to be observed by an observer, an optical path distributing prism for distributing said image to an optical path for a right eye and an optical path for a left eye, an ocular prism for the right eye that is placed on a right-hand side of said optical path distributing prism, and an ocular prism for the left eye that is placed on a left-hand side of said optical path distributing prism, said image display device being located between said ocular prism for the left eye and said ocular prism for the right eye, said optical path distributing prism having at least a first surface placed to face said image display device so that a display light beam emanating from said image display device enters the prism through the first surface, a fourth surface placed to face said first surface across a medium so as to reflect light beams of right and left images entering through said first surface in different directions, thereby distributing the light beams to the optical path for the right eye and the optical path for the left eye, a second-first surface which reflects said optical path for the right eye reflected from said fourth surface, a second-second surface which reflects said optical path for the left eye reflected from said fourth surface, a third-first surface through which the light beam of said optical path for the right eye exits from the prism, and a third-second surface through which the light beam of said optical path for the left eye exits from the prism, said optical path distributing prism being arranged so that at least said second-first surface, said second-second surface, said third-first surface, said third-second surface and said fourth surface have a curved surface configuration that gives a power to a light beam, and said second-first surface and said second-second surface have a same surface configuration and said third-first surface and said third-second surface have a same surface configuration, said image display device being a reflection type image display device that displays an image by reflecting a light beam from a light source, wherein said fourth surface of said optical path distributing prism is either a semitransparent reflecting surface or a partially-transmitting and partially-reflecting surface, and wherein an illuminating light source for forming the optical path for the left eye and an illuminating light source for forming the optical path for the right eye are disposed at respective positions on a side of said fourth surface remote from the prism medium, and wherein said ocular prism for the right eye and said ocular prism for the left eye are located symmetrically with respect to a plane of symmetry, and said second-first and second-second surfaces of said optical path-distributing prism are symmetrical with respect to said plane of symmetry.

58. An image display apparatus comprising a single image display device for displaying an image to be observed by an observer, an optical path distributing prism for simultaneously distributing said image to an optical path for a right eye and an optical path for a left eye, an ocular prism for the right eye that is placed on a right-hand side of said optical path distributing prism, and an ocular prism for the left eye that is placed on a left-hand side of said optical path distributing prism, said image display device being located between said ocular prism for the left eye and said ocular prism for the right eye, said optical path distributing prism having a first surface placed to face said image display device so that a display light beam emanating from said image display device enters the prism through the first surface, a second surface wherein said optical path for the right eye is made incident on an optical surface at an angle larger than a total reflection critical angle to reflect a light beam of the optical path for the right eye within the prism by total reflection and said optical path for the left eye is made incident on the optical surface at an angle smaller than the total reflection critical angle to allow a light beam of the optical path for the left eye to exit from the prism, and a third surface wherein said optical path for the left eye is made incident on an optical surface at an angle larger than a total reflection critical angle to reflect the light beam of the optical path for the left eye within the prism by total reflection and said optical path for the right eye is made incident on the optical surface at an angle smaller than the total reflection critical angle to allow the light beam of the optical path for the right eye to exit from the prism, wherein an optical element for display is placed between said image display device and a light source, said optical path distributing prism being arranged so that said second surface and said third surface are curved surfaces of a same configuration that gives a power to a light beam, and said second surface and said third surface are placed to face each other across a prism medium, said image display device being a transmission type image display device that displays an image by transmitting a light beam from a light source, wherein an illuminating light source for forming the optical path for the left eye and an illuminating light source for forming the optical path for the right eye are disposed at respective positions on a side of said image display device remote from said optical element for display, and wherein said ocular prism for the right eye and said ocular prism for the left eye are located symmetrically with respect to a plane of symmetry, and said second and third surfaces of said optical path-distributing prism are symmetrical with respect to said plane of symmetry.

* * * * *